(12) United States Patent
Ishizaki et al.

(10) Patent No.: US 6,510,914 B2
(45) Date of Patent: Jan. 28, 2003

(54) OBSTRUCTION INFERENCE APPARATUS FOR VEHICLE

(75) Inventors: Tatsuya Ishizaki, Wako (JP); Kaoru Nagatomi, Wako (JP); Kazuo Matsuda, Wako (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/912,274

(22) Filed: Jul. 24, 2001

(65) Prior Publication Data

US 2002/0043417 A1 Apr. 18, 2002

(30) Foreign Application Priority Data

| Jul. 26, 2000 | (JP) | ................................ 2000-226142 |
| Jul. 26, 2000 | (JP) | ................................ 2000-226143 |
| Oct. 20, 2000 | (JP) | ................................ 2000-322017 |
| Oct. 20, 2000 | (JP) | ................................ 2000-322023 |
| Oct. 31, 2000 | (JP) | ................................ 2000-333445 |

(51) Int. Cl.[7] .................... B60K 28/10; B60R 21/32; B60R 22/00
(52) U.S. Cl. .................... 180/274; 280/735; 701/45
(58) Field of Search .................... 180/274; 280/734, 280/735; 701/45

(56) References Cited

U.S. PATENT DOCUMENTS

| 5,899,946 A | * | 5/1999 | Iyoda ........................ 180/274 |
| 6,182,782 B1 | * | 2/2001 | Matsuura et al. ........... 180/274 |
| 6,217,108 B1 | * | 4/2001 | Sasaki ........................ 180/274 |
| 6,293,362 B1 | * | 9/2001 | Sasaki et al. ................ 180/274 |
| 6,332,115 B1 | * | 12/2001 | Nobusawa et al. ......... 180/274 |
| 6,345,679 B1 | * | 2/2002 | Sasaki ........................ 180/274 |
| 6,415,883 B1 | * | 7/2002 | Myrholt et al. ............. 180/274 |
| 6,439,330 B1 | * | 8/2002 | Paye .......................... 180/274 |

FOREIGN PATENT DOCUMENTS

| JP | 08216826 | 8/1996 |
| JP | 11028994 | 2/1999 |

* cited by examiner

Primary Examiner—Kevin Hurley
Assistant Examiner—Matthew Luby
(74) Attorney, Agent, or Firm—Merchant & Gould P.C.

(57) ABSTRACT

An obstruction inference apparatus for a vehicle, for inferring the type of an obstruction which the vehicle has hit, which comprises a member deformable in correspondence with an impact force with which the vehicle hits the obstruction, deformation rate detecting means for detecting the deformation rate of this deformable member, timer starting means for starting a timer when the deformation rate detected by the deformation rate detecting means reaches a preset first reference rate in the course of increasing, second reference rate generating means for setting as a second reference rate a value equivalent to a value obtained by multiplying the maximum deformation rate by a preset constant, elapsed time calculating means for stopping the timer when the deformation rate reaches the second reference rate and obtaining the elapsed time from the timer being started to the timer being stopped, and inference signal generating means for, when the elapsed time is within a preset time range, inferring that the obstruction is a specified obstruction.

11 Claims, 64 Drawing Sheets

| VM | 1.0 | 2.0 | 3.0 | ---------- |
|----|-----|-----|-----|------------|
| VE | 0.5 | 1.0 | 1.5 | ---------- |

| VM | 1.0 | 2.0 | 3.0 | ............ |
|---|---|---|---|---|
| VT1 | −0.1 | −0.2 | −0.3 | ............ |
| VT2 | 0.2 | 0.4 | 0.6 | ............ |
| VT3 | 0.4 | 0.8 | 1.2 | ............ |

| VM  | 1.0 | 2.0 | 3.0 | ............... |
|-----|-----|-----|-----|-----------------|
| St1 | 1.0 | 2.0 | 3.0 | ............... |
| St2 | 2.5 | 5.0 | 7.5 | ............... |
| St3 | 1.5 | 3.0 | 4.5 | ............... |

| Vm | 1.0 | 2.0 | 3.0 | ............ |
|---|---|---|---|---|
| St0 | 1.0 | 2.0 | 3.0 | ............ |

| Vm | 1.0 | 2.0 | 3.0 | ................ |
|---|---|---|---|---|
| Vt0 | 0.3 | 0.6 | 0.9 | ................ |

| Vm | 1.0 | 2.0 | 3.0 | ............ |
|---|---|---|---|---|
| St11 | 1.0 | 2.0 | 3.0 | ............ |
| St12 | 1.5 | 3.0 | 4.5 | ............ |

(a) ACCELERATION DETERMINATION TIMER (b) DEFORMATION RATE VB (km/h)

(c) RATE DETERMINATION TIMER (d) DEFORMATION RATE DETERMINATION RESULT (e) DEFORMATION SB (mm)

(f) DEFORMATION DETERMINATION TIMER (g) DEFORMATION DETERMINATION RESULT (h) OBSTRUCTION INFERENCE RESULT (i) INFERENCE TIMER (j) ADDITIONAL OBSTRUCTION INFERENCE RESULT

→ TIME Ti (ms)

| Vm | 1.0 | 2.0 | 3.0 | ................ |
|---|---|---|---|---|
| Vt1 | 0.0 | 0.0 | 0.0 | ................ |
| Vt2 | 0.3 | 0.6 | 0.9 | ................ |

_US 6,510,914 B2_

OBSTRUCTION INFERENCE APPARATUS FOR VEHICLE

BACKGROUND OF THE INVENTION

1. Field of the Invention

This invention relates to an obstruction inference apparatus for a vehicle for, when the moving vehicle has collided with an obstruction, inferring the type of the obstruction.

2. Description of the Related Art

There have been vehicles equipped with an apparatus for, when the vehicle has hit an obstruction, inferring the type of the obstruction and deploying a secondary collision countermeasure in accordance with that type.

As an apparatus of this kind for deploying a secondary collision countermeasure, an apparatus which operates an air bag located in the vicinity of the hood of the vehicle in accordance with the type of an obstruction is disclosed for example in Japanese Patent Laid-Open Publication No. HEI-8-216826. Another apparatus which operates an air bag located in the vicinity of the hood in accordance with the type of an obstruction is disclosed for example in Japanese Patent Laid-Open Publication No. HEI-11-28994.

FIG. 64 and FIG. 65 are illustrations based on FIG. 6 and FIG. 7 of Japanese Patent Laid-Open Publication No. HEI-8-216826. The names and reference numerals of the constituent elements in these figures have been changed for convenience.

FIG. 64 shows a vehicle 401 equipped with a hood air bag sensor system 400.

This hood air bag sensor system 400 has a bumper sensor 403 on the front bumper 402 of the vehicle 401 and a hood sensor 405 below the hood 404. The hood air bag sensor system 400 also has a control unit 406. The bumper sensor 403 is a sensor for detecting a substantially horizontal load. The hood sensor 405 is a sensor for detecting a substantially vertical load. Only when the bumper sensor 403 and the hood sensor 405 have both detected a load, the control unit 406 infers that an obstruction S11 with which the vehicle has collided is a specified obstruction and outputs a control signal to a hood air bag module 407.

When the vehicle 401 has hit a specified obstruction S11 such as a pedestrian, the hood air bag sensor system 400 detects loads resulting from the collision with the bumper sensor 403 and the hood sensor 405; outputs a control signal from the control unit 406, which receives detection signals from the sensors; and in accordance with this control signal inflates a hood air bag 408 located in the vicinity of the hood 404.

FIG. 65 shows the vehicle 401 having run into an obstruction S12 such as a building.

When only the bumper sensor 403 detects a load, the control unit 406 infers that the obstruction S12 is not a specified obstruction. In this case, the control unit 406 does not output a control signal to the hood air bag module 407, and the hood air bag 408 does not inflate.

Thus the hood air bag sensor system 400 is a system which employs a two-stage detection method wherein a load is detected with the hood sensor 405 after a load is detected with the bumper sensor 403, and on the basis of these two detection signals infers that the obstruction S11 is a specified obstruction and deploys a secondary collision countermeasure.

However, the elapsed time between a load being detected by the bumper sensor 403 and a load being detected by the hood sensor 405 is not fixed. And when this elapsed time is long, the time required for the control unit 406 to infer the type of the obstruction S11 or S12 inevitably becomes long. It is undesirable for it to take time for the type of the obstruction S11 or S12 to be inferred.

Also, even when the obstruction S11 is not a specified obstruction, it can happen that after the bumper sensor 403 detects a load the hood sensor 405 detects a load. In this case the control unit 406 incorrectly infers that the obstruction S11 is a specified obstruction. That is, there is a possibility of an error occurring in the determination of the type of the obstruction S11. The occurrence of this kind of error is undesirable.

FIG. 66 and FIG. 67 are illustrations based on FIG. 4, FIG. 6 and FIG. 7 of Japanese Patent Laid-Open Publication No. HEI-11-28994. In these figures also, the names and reference numerals of constituent elements have for convenience been changed.

FIG. 66 shows a vehicle 501 equipped with a pedestrian protection sensor system 500.

This pedestrian protection sensor system 500 has a load sensor 503 mounted on the front bumper 502 of the vehicle 501 and a vehicle speed sensor 504, and outputs a control signal to a spring-up mechanism 506 from a controller 505, which receives signals from the load sensor 503 and the vehicle speed sensor 504. When the vehicle 501 hits an obstruction S21 at above a certain speed, if the signal from the load sensor 503 is within a fixed range, the controller 505 infers that the obstruction S21 is a specified obstruction and outputs the control signal. In accordance with this control signal, the spring-up mechanism 506 deploys a secondary collision countermeasure by causing the rear end of the hood 507 of the vehicle 501 to spring up. The detailed operation of the controller 505 will be explained on the basis of FIG. 67.

FIG. 67 shows a load sensor output characteristic, with time on the horizontal axis and the sensor output of the load sensor on the vertical axis.

When the front bumper 502 shown in FIG. 66 hits the obstruction S21, the sensor output starts to increase from zero, reaches a peak and then starts to decrease, and again becomes zero. The curve R1 shows a sensor output characteristic of when the vehicle has hit another vehicle or a wall; the curve R2 shows a sensor output characteristic of when the vehicle has hit a tree, a telegraph pole or a sign post; and the curves R3 and R4 show sensor output characteristics of when the vehicle has hit a pedestrian.

Here, Se1 is a first threshold value for determining whether or not the front bumper 502 has hit an obstruction S21. The time at which the sensor output reaches the first threshold value Se1 is Ti1, and time is counted from this time Ti1. When the sensor output increases further and rises above a second threshold value Se2, it is inferred that the obstruction S21 is not a specified obstruction (pedestrian). When on the other hand the sensor output peaks and starts to decrease without reaching the second threshold value Se2, the time at which it falls back to the first threshold value Se1 is Ti2. When the continuation time Ti0 (Ti0=Ti2−Ti1) from time Ti1 to time Ti2 is within a predetermined fixed time, it is inferred that the obstruction S21 is a specified obstruction (pedestrian).

As is clear from FIG. 67, the curves R3 and R4 are characteristics in which the continuation time Ti0 within the range Se1 to Se2 is relatively short. Besides pedestrians, obstructions having this kind of characteristic include signposts (commonly called pylons) and rubber lane dividers.

Even when the obstruction S21 is not a specified obstruction, the controller 105 of the related art described above infers incorrectly that the obstruction S21 is a specified obstruction. That is, there is a possibility of an error occurring in the inference of the type of the obstruction S21. The occurrence of this kind of error is undesirable.

SUMMARY OF THE INVENTION

It is therefore a first object of the present invention to provide an obstruction inference apparatus for a vehicle which can infer more accurately the type of an obstruction which the vehicle has hit.

It is a second object of the present invention to provide an obstruction inference apparatus for a vehicle with which it is possible to shorten the time taken to infer the type of an obstruction which the vehicle has hit.

According to a first aspect of the present invention, there is provided an obstruction inference apparatus for a vehicle for inferring the type of an obstruction which the vehicle has hit, the apparatus comprising: a deformable member which deforms in correspondence with an impact force with which the vehicle hits the obstruction; deformation rate detecting means for detecting the deformation rate of this deformable member; timer starting means for starting a timer when the deformation rate detected by this deformation rate detecting means reaches a preset first reference rate in the course of increasing; maximum deformation rate updating means for comparing the deformation rate with a previous maximum deformation rate value detected earlier and setting the larger of the two as a maximum deformation rate; second reference rate generating means for setting as a second reference rate a value equivalent to a value obtained by multiplying the maximum deformation rate by a preset constant smaller than 1.0; elapsed time calculating means for stopping the timer when the deformation rate reaches the second reference rate and obtaining the elapsed time from the timer being started to the timer being stopped; and inference signal generating means for, when the elapsed time is within a preset time range, inferring that the obstruction is a specified obstruction and producing an inference signal.

Here, the deformation rate of the deformable member when the vehicle has hit an obstruction is detected; the elapsed time is obtained from when in the course of increasing this deformation rate reaches a preset first reference rate to when after reaching a maximum deformation rate and decreasing again it reaches a second reference rate; and when this elapsed time is within a predetermined time range it is inferred that the obstruction which the vehicle has hit is a specified obstruction.

Because only a single detecting means, namely the deformation rate detecting means, is used for this inference, the number of detecting means can be reduced. Furthermore, because all that is necessary is for an impact force in one direction to be detected with a single detecting means, the detection time can be shortened.

Also, because just the elapsed time from when the deformation rate reaches a first reference rate to when it reaches a second reference rate is obtained and the type of the obstruction is inferred on the basis of whether or not this elapsed time is with in a predetermined time range, the time needed to infer the type of the obstruction can be made extremely short and the type of the obstruction can be inferred more exactly.

And also, because by the second reference rate generating means a value equivalent to a value obtained by multiplying the maximum deformation rate, which differs according to the type of the obstruction, by a constant smaller than 1.0 is set as the second reference rate, the type of the obstruction can be inferred still more exactly, irrespective of the impact speed at which the obstruction is hit.

The inference signal generating means preferably outputs the inference signal to a secondary collision countermeasure apparatus which deploys a secondary collision countermeasure such as raising the hood of the vehicle or operating an air bag in the hood vicinity.

According to a second aspect of the present invention, there is provided an obstruction inference apparatus for a vehicle for inferring the type of an obstruction which the vehicle has hit, the apparatus comprising: a deformable member which deforms in correspondence with an impact force with which the vehicle hits the obstruction; deformation rate detecting means for detecting the deformation rate of this deformable member; deformation calculating means for obtaining the deformation of the deformable member on the basis of the deformation rate detected by this deformation rate detecting means; maximum deformation rate updating means for comparing the deformation rate with a previous maximum deformation rate value detected earlier and setting the larger of the two as a maximum deformation rate; first reference rate generating means for setting as a first reference rate a value equivalent to a value obtained by multiplying the maximum deformation rate by a preset first rate constant smaller than 1.0; second reference rate generating means for setting as a second reference rate a value equivalent to a value obtained by multiplying the maximum deformation rate by a second rate constant smaller than 1.0 but larger than the first rate constant; first reference deformation generating means for setting as a first reference deformation a value equivalent to a value obtained by multiplying the maximum deformation rate by a preset first deformation constant; second reference deformation generating means for setting as a second reference deformation a value equivalent to a value obtained by multiplying the maximum deformation rate by a preset second deformation constant larger than the first deformation constant; and inference signal generating means for, when the deformation rate is within the range of from the first reference rate to the second reference rate and the deformation is within the range of from the first reference deformation to the second reference deformation, inferring that the obstruction is a specified obstruction and producing an inference signal.

Here, (1) The deformation rate of the deformable member when the vehicle has hit an obstruction is detected; (2) the deformation of the deformable member is obtained on the basis of this deformation rate; (3) the maximum deformation rate, of when the deformation rate reaches its peak, is obtained; (4) on the basis of this maximum deformation rate, a range of from a first reference rate to a second reference rate and a range of from a first reference deformation to a second reference deformation are set; and (5) when the deformation rate is in the range between the first and second reference rates and the deformation is in the range between the first and second reference deformations, it can be inferred that the obstruction which has been hit is a specified obstruction.

Because only a single detecting means, the deformation rate detecting means, is used for this inference, the number of detecting means can be reduced. Furthermore, because all that is necessary is for a deformation rate in one direction to be detected with a single detecting means, the detection time can be shortened.

Also, this apparatus utilizes the fact that, when the deformation rate is in the course of decreasing from its maximum value, the deformation characteristic differs according to the type of the obstruction. Utilizing this characteristic, the type of the obstruction can be inferred on the basis of whether or not two conditions have been met, the first condition being that the deformation rate is in the range between the first and second reference rates and the second condition being that the deformation is in the range between the first and second reference deformations. Accordingly, the time needed to infer the type of the obstruction can be made extremely short and the type of the obstruction can be inferred more exactly.

And also, because values equivalent to values obtained by multiplying the maximum deformation rate, which differs according to the type of the obstruction, with predetermined constants are set as the first and second reference rates and the first and second reference deformations, the type of the obstruction can be inferred still more exactly, irrespective of the impact speed at which the obstruction is hit.

Preferably, the apparatus further has third reference rate generating means for setting as a third reference rate a value equivalent to a value obtained by multiplying the maximum deformation rate by a preset third rate constant smaller than 1.0 but different from the first and second rate constants and third reference deformation generating means for setting as a third reference deformation a value equivalent to a value obtained by multiplying the maximum deformation rate by a preset third deformation constant different from the first and second deformation constants, and is constructed to, when the range of deformation rate and deformation which is both within the range of from the first reference rate to the second reference rate and within the range of from the first reference deformation to the second reference deformation is written as a first reference range, set as a second reference range different from the first reference range a range of deformation rate and deformation which is both within a range based on a combination of the first, second and third reference rates and within a range based on a combination of the first, second and third reference deformations and when the deformation rate and the deformation are within either the first reference range or the second reference range to infer that the obstruction is a specified obstruction and output an inference signal with the inference signal generating means.

The inference signal generating means preferably outputs the inference signal to a secondary collision counter measure apparatus which deploys a secondary collision countermeasure such as raising the hood of the vehicle or operating an air bag in the hood vicinity.

According to a third aspect of the present invention, there is provided an obstruction inference apparatus for a vehicle for inferring the type of an obstruction which the vehicle has hit, the apparatus comprising: a deformable member which deforms in correspondence with an impact force with which the vehicle hits the obstruction; deformation rate detecting means for detecting the deformation rate of this deformable member; deformation detecting means for detecting the deformation of the deformable member; maximum deformation rate updating means for comparing the deformation rate with a previous maximum deformation rate value detected earlier and setting the larger of the two as a maximum deformation rate; reference deformation generating means for setting as a reference deformation a value equivalent to a value obtained by multiplying the maximum deformation rate by a preset deformation constant; inferring means for inferring that the obstruction is a specified obstruction when the deformation has risen above the reference deformation; and inference signal generating means for producing an inference signal on the basis of an inference of the inferring means.

Here the invention utilizes the fact that the ratio of the maximum value of the deformation to the maximum value of the deformation rate, compared with a specified obstruction such as a pedestrian, is smaller with a lighter obstruction. The deformation rate and the deformation of the deformable member when the vehicle has hit an obstruction are detected; the maximum deformation rate, of when the deformation rate reaches its peak, is obtained; a reference deformation is set on the basis of this maximum deformation rate; and when the deformation has risen above this reference deformation, it can be inferred that the obstruction which has been hit is a specified obstruction. Accordingly, a light object is not erroneously inferred to be a specified obstruction. And the type of the obstruction can be inferred more exactly.

The inference signal generating means preferably outputs the inference signal to a secondary collision countermeasure apparatus which deploys a secondary collision countermeasure such as raising the hood of the vehicle or operating an air bag in the hood vicinity.

According to a fourth aspect of the present invention, there is provided an obstruction inference apparatus for a vehicle for inferring the type of an obstruction which the vehicle has hit, the apparatus comprising: a deformable member which deforms in correspondence with an impact force with which the vehicle hits the obstruction; deformation rate detecting means for detecting the deformation rate of this deformable member; deformation detecting means for detecting the deformation of the deformable member; maximum deformation rate updating means for comparing the deformation rate with a previous maximum deformation rate value detected earlier and setting the larger of the two as a maximum deformation rate; reference rate generating means for setting as a reference rate a value equivalent to a value obtained by multiplying the maximum deformation rate by a preset rate constant smaller than 1.0; first reference deformation generating means for setting as a first reference deformation a value equivalent to a value obtained by multiplying the maximum deformation rate by a preset first deformation constant; second reference deformation generating means for setting as a second reference deformation a value equivalent to a value obtained by multiplying the maximum deformation rate by a preset second deformation constant larger than the first deformation constant; inferring means for inferring that the obstruction is a specified obstruction when within a preset inference time from when the vehicle hit the obstruction the deformation rate is smaller than the reference rate and the deformation is in the range of from the first reference deformation to the second reference deformation; and inference signal generating means for producing an inference signal on the basis an inference of this inferring means.

Here the invention utilizes the fact that the ratio of the maximum value of the deformation to the maximum value of the deformation rate, compared with a specified obstruction such as a pedestrian, is smaller with a lighter obstruction. The deformation rate and the deformation of the deformable member when the vehicle has hit an obstruction are detected; the maximum deformation rate, of when the deformation rate reaches its peak, is obtained; a reference rate and a range of from a first reference deformation to a second reference deformation are set on the basis of this maximum deformation rate; and when within a preset inference time from when the vehicle hits the obstruction the deformation rate is smaller than the reference rate and the deformation is in the range of from the first reference deformation to the second reference deformation, it can be inferred that the obstruction which has been hit is a specified obstruction. Accordingly, a light object is not erroneously inferred to be a specified obstruction.

When the vehicle hits an obstruction with a low center of gravity, such as a small animal caught by the underside of the vehicle, the deformable member deforms so as to be pulled to the lower side of the vehicle and rearward. The time from the time of impact to when the deformation rate of the deformable member reaches zero after peaking in this case is relatively long compared to when the obstruction is a specified obstruction such as a pedestrian.

In the fourth aspect of the invention, to utilize this characteristic, it is inferred that the obstruction which has been hit is a specified obstruction when within an inference time the deformation rate and the deformation satisfy the predetermined conditions set forth above. Consequently, an obstruction with a low center of gravity such as a small animal caught by the underside of the vehicle is not erroneously inferred to be a specified obstruction.

In this kind of way, the type of an obstruction can be inferred more exactly.

The inference signal generating means preferably outputs the inference signal to a secondary collision countermeasure apparatus which deploys a secondary collision countermeasure such as raising the hood of the vehicle or operating an air bag in the hood vicinity.

According to a fifth aspect of the present invention, there is provided an obstruction inference apparatus for a vehicle for inferring the type of an obstruction which the vehicle has hit, having: a deformable member which deforms in correspondence with an impact force with which the vehicle hits the obstruction; deformation rate detecting means for detecting the deformation rate of this deformable member; deformation detecting means for detecting the deformation of the deformable member; maximum deformation rate updating means for comparing the deformation rate with a previous maximum deformation rate value detected earlier and setting the larger of the two as a maximum deformation rate; first reference rate generating means for setting as a first reference rate a value equivalent to a value obtained by multiplying the maximum deformation rate by a preset first rate constant smaller than 1.0; second reference rate generating means for setting as a second reference rate a value equivalent to a value obtained by multiplying the maximum deformation rate by a second rate constant smaller than 1.0 but larger than the first rate constant; first reference deformation generating means for setting as a first reference deformation a value equivalent to a value obtained by multiplying the maximum deformation rate by a preset first deformation constant; second reference deformation generating means for setting as a second reference deformation a value equivalent to a value obtained by multiplying the maximum deformation rate by a preset second deformation constant larger than the first deformation constant; inferring means for inferring that the obstruction is a specified obstruction when the deformation rate is in the range of from the first reference rate to the second reference rate and the deformation is in the range of from the first reference deformation to the second reference deformation; deformation rate determining means for determining that the deformation rate has risen above a preset third reference rate different from the first and second reference rates; deformation determining means for determining that the deformation has risen above a preset third reference deformation different from the first and second reference deformations; additional inferring means for additionally inferring that the obstruction is a specified obstruction when receiving an inference signal from the inferring means, a determination signal from the deformation rate determining means and a determination signal from the deformation determining means; and inference signal generating means for producing an inference signal on the basis of an additional inference of this additional inferring means.

Here, the deformation rate and the deformation of the deformable member when the vehicle hits an obstruction are detected; the maximum deformation rate, of when the deformation rate of the deformable member reaches its peak, is obtained; on the basis of this maximum deformation rate a range of from a first reference rate to a second reference rate and a range of from a first reference deformation to a second reference deformation are set; and also, a third reference rate and a third reference deformation not based on the maximum deformation rate are set.

Accordingly, it can be inferred that the obstruction which has been hit is a specified obstruction when the following four conditions are satisfied: (1) a first condition of the deformation rate being in the range between the first and second reference rates; (2) a second condition of the deformation being in the range between the first and second reference deformations; (3) a third condition of the deformation rate exceeding the third reference rate; and (4) a fourth condition of the deformation exceeding the third reference deformation.

Consequently, a light object is not erroneously inferred to be a specified obstruction. And moreover an obstruction with a low center of gravity, such as a small animal caught by the underside of the vehicle, is not erroneously inferred to be a specified obstruction. Thus the type of the obstruction can be inferred more exactly.

The inference signal generating means preferably outputs the inference signal to a secondary collision countermeasure apparatus which deploys a secondary collision countermeasure such as raising the hood of the vehicle or operating an air bag in the hood vicinity.

BRIEF DESCRIPTION OF THE DRAWINGS

Certain preferred embodiments of the present invention will be described in detail below, by way of example only, with reference to the accompanying drawings, in which.

DETAILED DESCRIPTION OF THE PREFERRED EMBODIMENTS

The following description is merely exemplary in nature and in no way intended to limit the invention, its application or uses.

Figure 1:
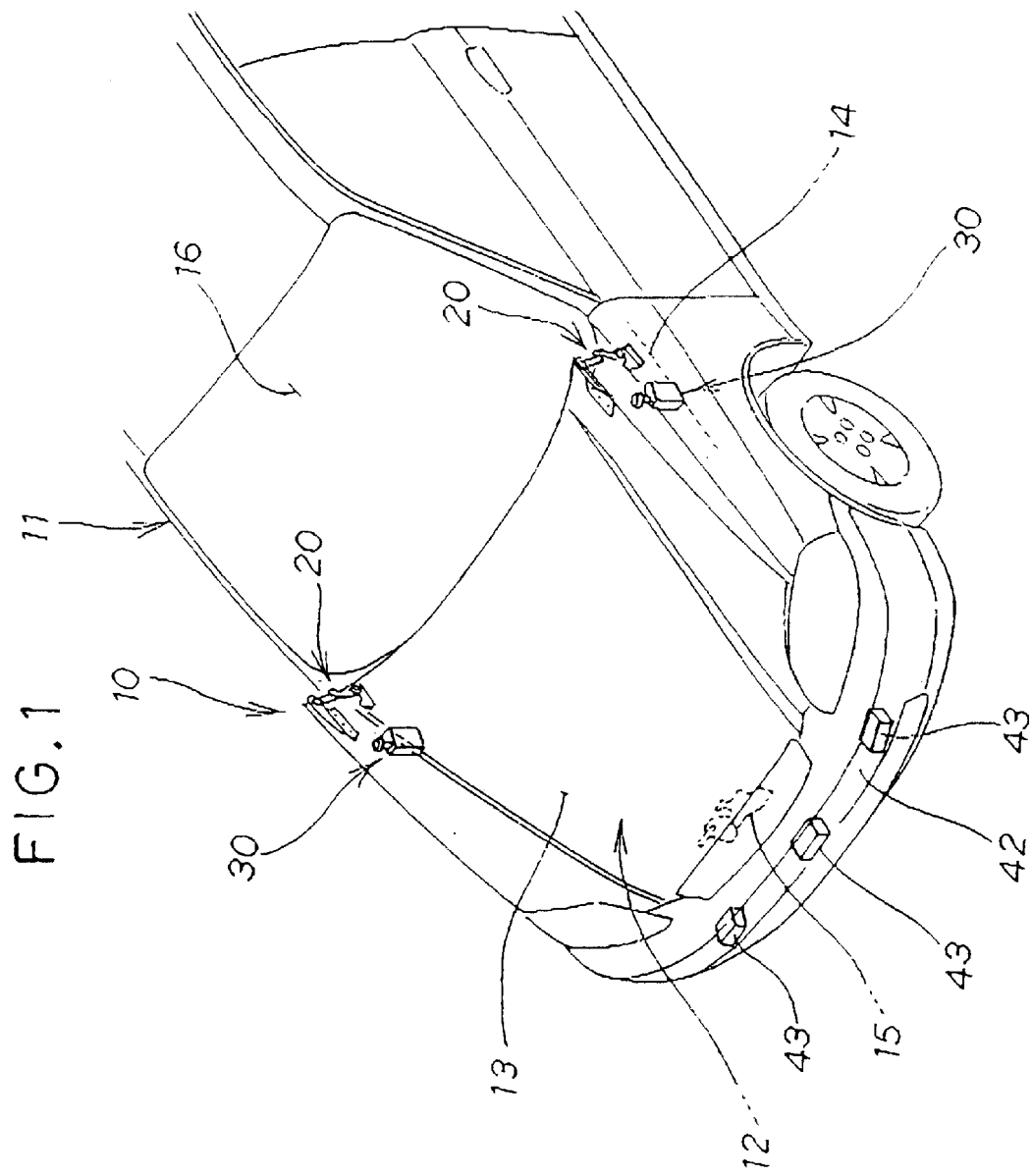
FIG. 1 is a partial perspective view of a vehicle equipped with a secondary collision countermeasure apparatus pertaining to a first preferred embodiment of the invention.
Figure 2:
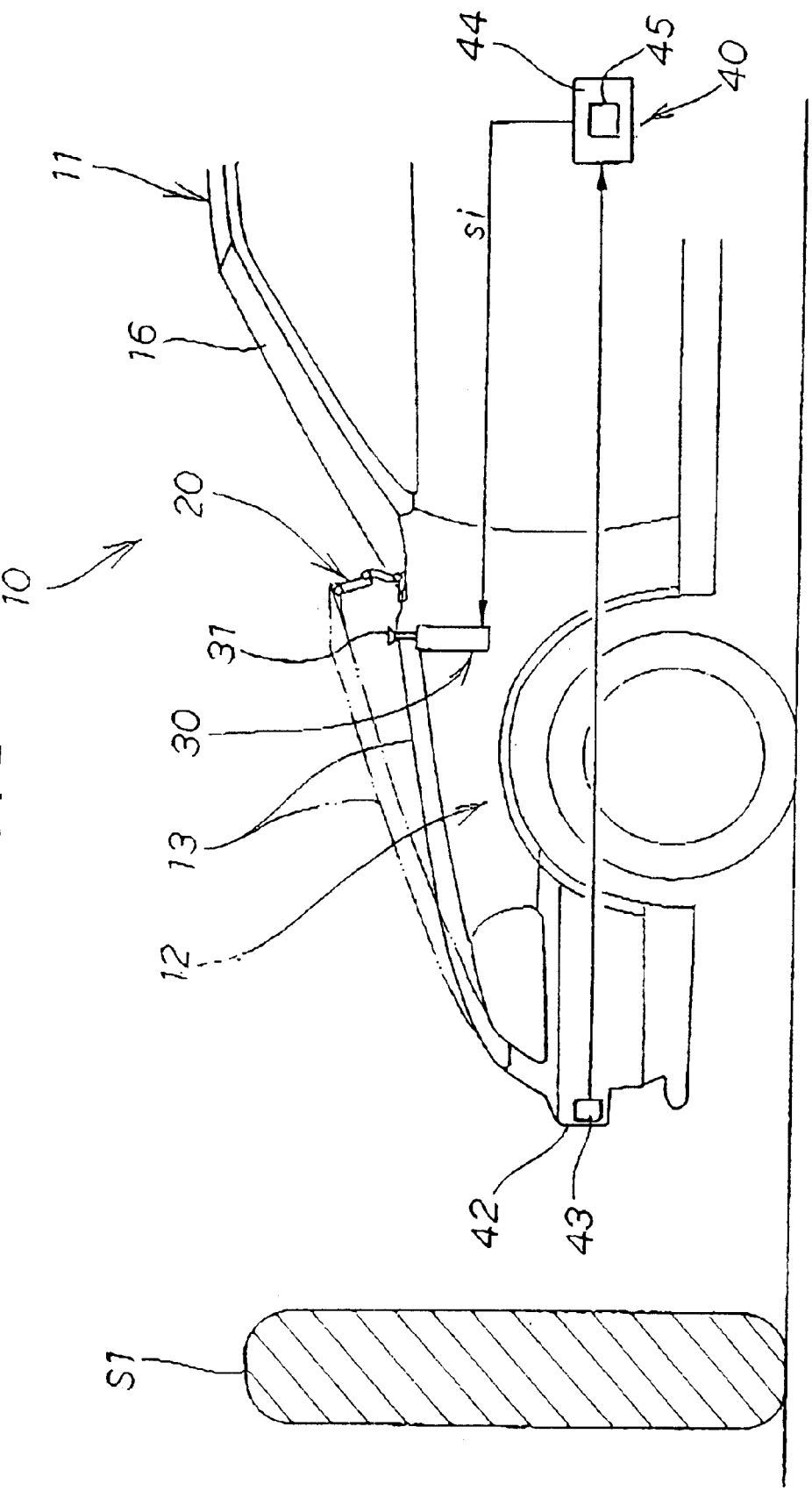
FIG. 2 is a side view of the vehicle shown in FIG. 1.

FIG. 1 and FIG. 2 show a vehicle 11 equipped with a secondary collision countermeasure apparatus 10 pertaining to a first preferred embodiment. In FIG. 1 and FIG. 2, the vehicle 11 has at its front an engine compartment 12. The opening of this engine compartment 12 is covered by a hood 13. The rear end of this hood 13 is attached so that it can open and close to a vehicle body frame 14 by left and right hood holding mechanisms 20, 20 mounted on the vehicle body frame 14. The front of the hood 13 is locked to the vehicle body frame 14 by a hood lock 15. In the figures, the reference numeral 16 denotes a front windshield.

The secondary collision countermeasure apparatus 10 is an apparatus for deploying a secondary collision countermeasure by raising the hood 13 when the vehicle 11 has hit an obstruction S1, and is made up of the left and right hood holding mechanisms 20 and left and right actuators 30 used to lift up the rear part of the closed hood 13. The secondary collision countermeasure apparatus 10 also has an obstruction inference apparatus for a vehicle 40. The obstruction inference apparatus for a vehicle 40 will be described in detail later.

The hood holding mechanisms 20 are hinges which normally function as hinges for the opening and closing of the hood 13 and double as connecting link mechanisms for determining with extended links the upper position of the rear part of the hood 13 when the vehicle 11 has hit an obstruction S1.

The actuators 30, on receiving an electrical actuator drive command signal (inference signal) si from a control part 44, which will be further discussed later, each produce a large quantity of gas by igniting a gas generant with an ignitor (not shown), and by means of a sudden increase in gas pressure lift a piston 31 and together lift up the rear part of the hood 13.

Figure 3:
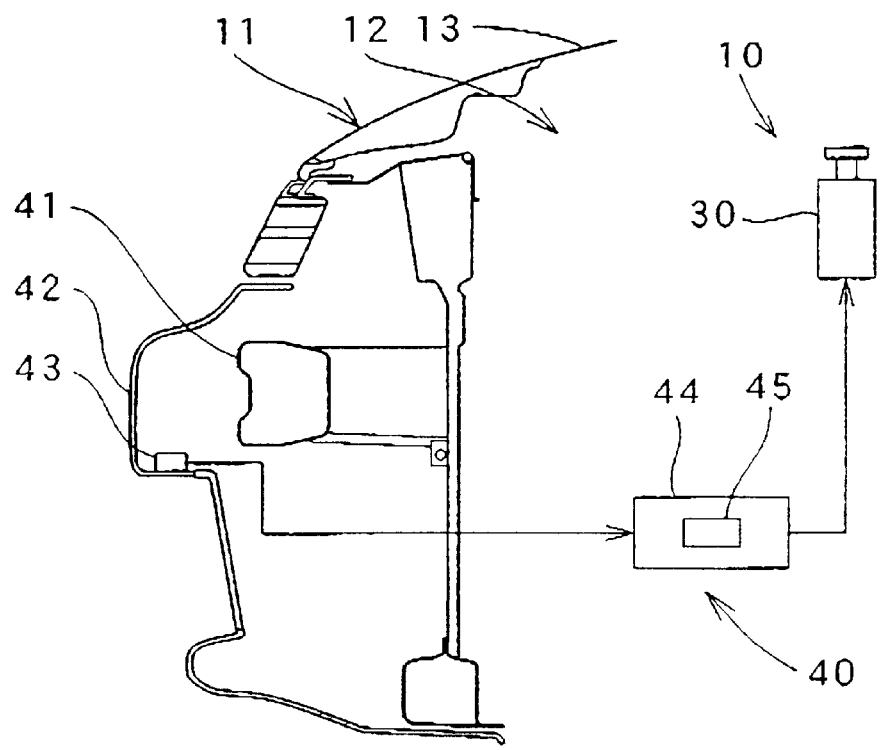
FIG. 3 is a side view of the vehicle shown in FIG. 2.
Figure 4:
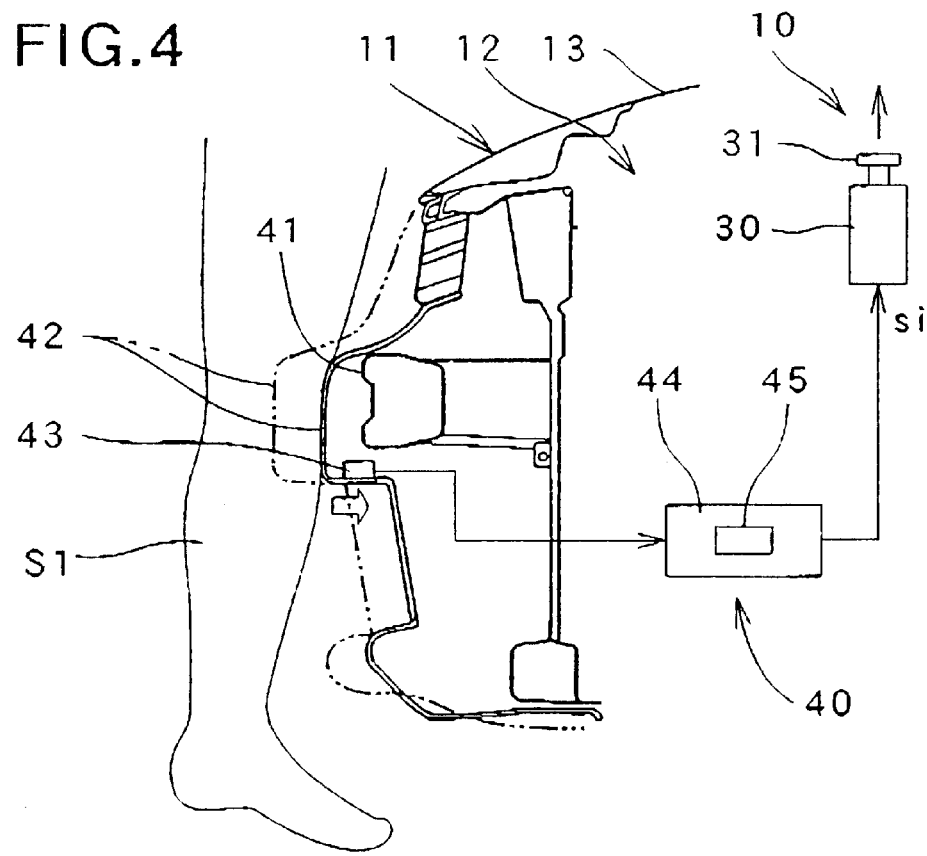
FIG. 4 is a view illustrating the construction and operation of a bumper face and a bumper sensor shown in FIG. 3.

FIG. 3 and FIG. 4 show a front bumper 41 mounted on the front of the vehicle 11 and a bumper sensor 43 mounted on the inside of a bumper face 42 covering the front of this front bumper 41. The bumper sensor 43 is an acceleration sensor.

A plurality of (for example three) bumper sensors 43 may be lined up in the width direction of the vehicle, as shown in FIG. 1. When a plurality of bumper sensors 43 are provided like this, the control part 44 operates on the basis of detection signals from these bumper sensors 43. For example, the control part 44 calculates the average value of the plurality of detection signals and controls the actuators 30 on the basis of that average value, or controls the actuators 30 on the basis of the largest of the detection signals.

The bumper face 42 in FIG. 4 is a deformable member which deforms in correspondence with an impact force with which the vehicle 11 hits an obstruction S1, and for example is a resin product.

The bumper face 42 shown with a broken line in FIG. 4 deforms as shown by the solid line in correspondence with the impact force with which the obstruction S1 is hit. The acceleration of the deforming part of the bumper face 42 at this time can be detected with the bumper sensor 43 attached to the bumper face 42. And by integrating the deformation acceleration rate detected by the bumper sensor 43 it is possible to find the deformation rate of the bumper face 42.

Also, by carrying out an operation such as integration on the basis of the deformation rate of the bumper face 42, it is possible to find the deformation of the bumper face 42. For example, by multiplying the deformation rate of the bumper face 42 by a detection time interval over which it is detected by the bumper sensor 43 and integrating this product, it is possible to find the continuously changing deformation of the bumper face 42.

The obstruction inference apparatus for a vehicle 40 is for, when the vehicle 11 has hit an obstruction S1, inferring the type of that obstruction S1 and outputting an inference signal si to the secondary collision countermeasure apparatus 10. Specifically, the obstruction inference apparatus for a vehicle 40 is made up of the bumper face 42, constituting a deformable member; the bumper sensor 43; and the control part 44, which outputs the inference signal si to the actuators 30 of the secondary collision countermeasure apparatus 10 on the basis of a signal from the bumper sensor 43. The control part 44 is for example a microcomputer.

Figure 5:
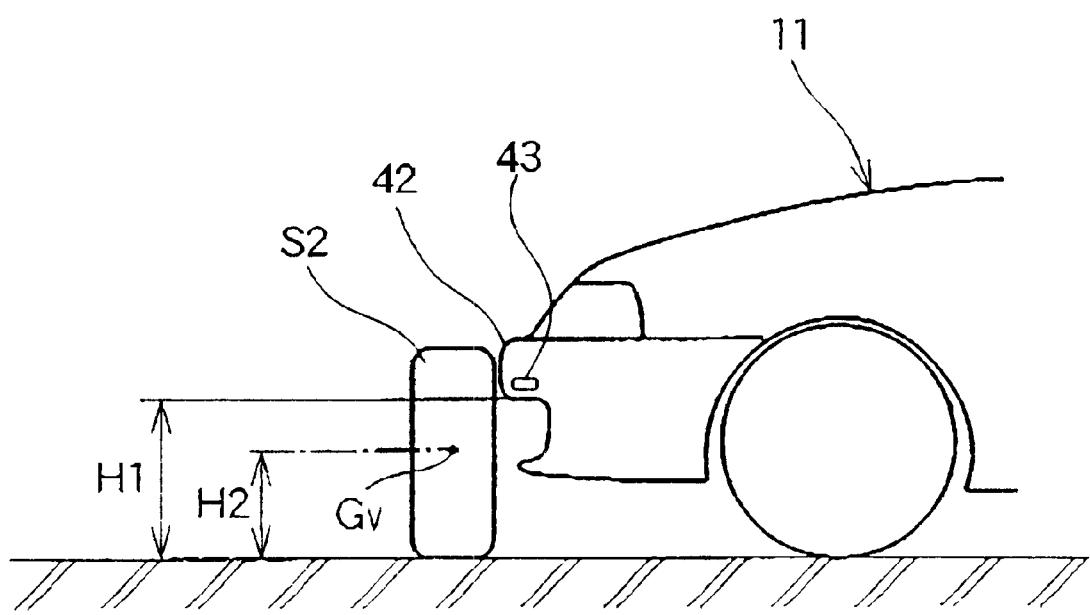
FIG. 5 is a view showing the operation of the bumper face and bumper sensor shown in FIG. 3.

FIG. 5 illustrates the operation of the bumper face 42 and the bumper sensor 43 in this invention.

In FIG. 5, when the vehicle 11 hits an obstruction S2 (hereinafter, 'low-center-of-gravity obstruction S2') the height above the ground H2 of the center of gravity Gv of which is low with respect to the height above the ground H1 of the front end of the bumper face 42, the low-center-of-gravity obstruction S2 sometimes gets caught by the underside of the vehicle 11. In this case, the low-center-of-gravity obstruction S2 so caught deforms the bumper face 42 so as to pull it to the lower side of the vehicle 11 and rearward.

Next, the obstruction inference apparatus for a vehicle 40 of this first preferred embodiment will be described on the basis of FIGS. 6 through 8 and FIGS. 9A and 9B.

First, with reference to FIG. 4 and FIG. 5, change in the deformation rate of the bumper face 42 occurring when the bumper face 42 has hit an obstruction S1 or a low-center-of-gravity obstruction S2 will be explained on the basis of FIG. 6 and FIG. 7.

Figure 6:
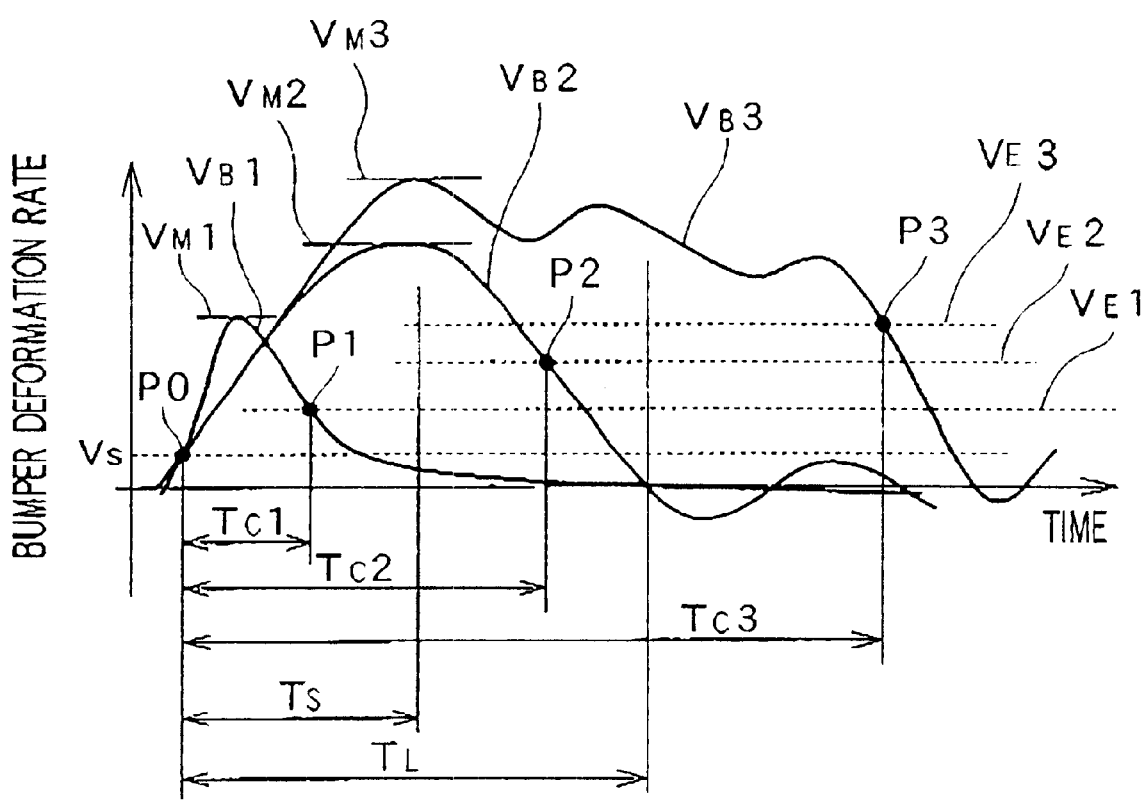
FIG. 6 is a graph showing deformation rates of the bumper face shown in FIG. 3.

FIG. 6 shows change in the deformation rate of the bumper face when it has hit an obstruction, with time on the horizontal axis and bumper deformation rate on the vertical axis. The reference numerals are defined as follows:

| | |
|---|---|
| curve VB1 | deformation rate waveform curve of when the obstruction is a light object |
| curve VB2 | deformation rate waveform curve of when the obstruction is a specified obstruction such as a pedestrian |
| curve VB3 | deformation rate waveform curve of when the obstruction is a low-center-of-gravity obstruction |
| VM1 | maximum deformation rate of curve VB1 |
| VM2 | maximum deformation rate of curve VB2 |
| VM3 | maximum deformation rate of curve VB3 |
| VS | first reference rate of curves VB1, VB2 and VB3 (a value of almost immediately after impact, e.g. a value slightly above zero) |
| VE1 | second reference rate of curve VB1 (VE1 = 0.5 × VM1) |
| VE2 | second reference rate of curve VE2 (VE2 = 0.5 × VM2) |
| VE3 | second reference rate of curve VB3 (VE3 = 0.5 × VM3) |
| P0 | VS point of curves VB, VB2 and VB3 |
| P1 | point at which curve VB1 has decreased to VE1 after increasing from P0 to VM1 |
| P2 | point at which curve VB2 has decreased to VE2 after increasing from P0 to VM2 |
| P3 | point at which curve VB3 has decreased to VE3 after increasing from P0 to VM3 |
| TC1 | time taken for curve VB1 to change from P0 to P1 (i.e. elapsed time) |
| TC2 | time taken for curve VB2 to change from P0 to P2 (i.e. elapsed time) |
| TC3 | time taken for curve VB3 to change from P0 to P3 (i.e. elapsed time) |
| TS | lower limit time (predetermined elapsed time from P0) |
| TL | upper limit time (predetermined elapsed time from P0) |

As is clear from this graph of FIG. 6, each of the deformation rate waveform curves VB1, VB2 and VB3 has the characteristic that it rises through the first reference rate VS to a respective maximum deformation rate VM1, VM2 or VM3 and then decreases and passes downward through the respective second reference rate VE1, VE2 or VE3.

Also, it can be seen that the lighter the obstruction, the shorter the time taken for the deformation rate waveform curve to change from the first reference rate to the second reference rate (for example, TC1<TC2).

And also, as described above, when the obstruction is a low-center-of-gravity obstruction S2 of the kind shown in FIG. 5, the bumper face 42 deforms so as to be pulled to the lower side of the vehicle 11 and rearward. In this case, as shown by the deformation rate waveform curve VB3, it can be seen that the time taken for the deformation rate to change from the maximum deformation rate VM3 to the point P3 is longer compared to the other deformation rate waveform curves VB1 and VB2. That is, the decreasing of the deformation rate in the deformation rate waveform curve VB3 is extremely gentle.

The present inventors discovered that the characteristic with which the deformation rate VB of the bumper face 42 continuously changes, that is, the deformation rate waveform characteristic, differs like this in accordance with the type of the obstruction which the bumper face 42 (see FIG. 4) has hit.

Here, a predetermined lower limit time TS will be set between the elapsed time TC1 and the elapsed time TC2 and a predetermined upper limit time TL will be set between the elapsed time TC2 and the elapsed time TC3. And, the curves VB1, VB2 and VB3 will be generically called 'the deformation rate waveform curve VB'; VM1, VM2 and VM3 will be generically called 'the maximum deformation rate VM'; VS will be called 'the first reference rate VS'; VE1, VE2 and VE3 will be generically called 'the second reference rate VE'; and TC1, TC2 and TC3 will be generically called 'the elapsed time TC'.

Now, it will be supposed that the vehicle has hit a certain obstruction. The deformation rate waveform curve of the bumper face at this time is VB. And it will be supposed that the elapsed time TC of this deformation rate waveform curve VB is in a preset time range (that is, between the lower limit time TS and the upper limit time TL). When the elapsed time TC is within a predetermined time range like this, it can be inferred that the obstruction which has been hit is a specified obstruction.

In FIG. 6, the obstruction having the deformation rate waveform curve VB2 characteristic is a specified obstruction. The upper limit time TL is an extremely short time of a few tens of ms (milliseconds).

Figure 7:
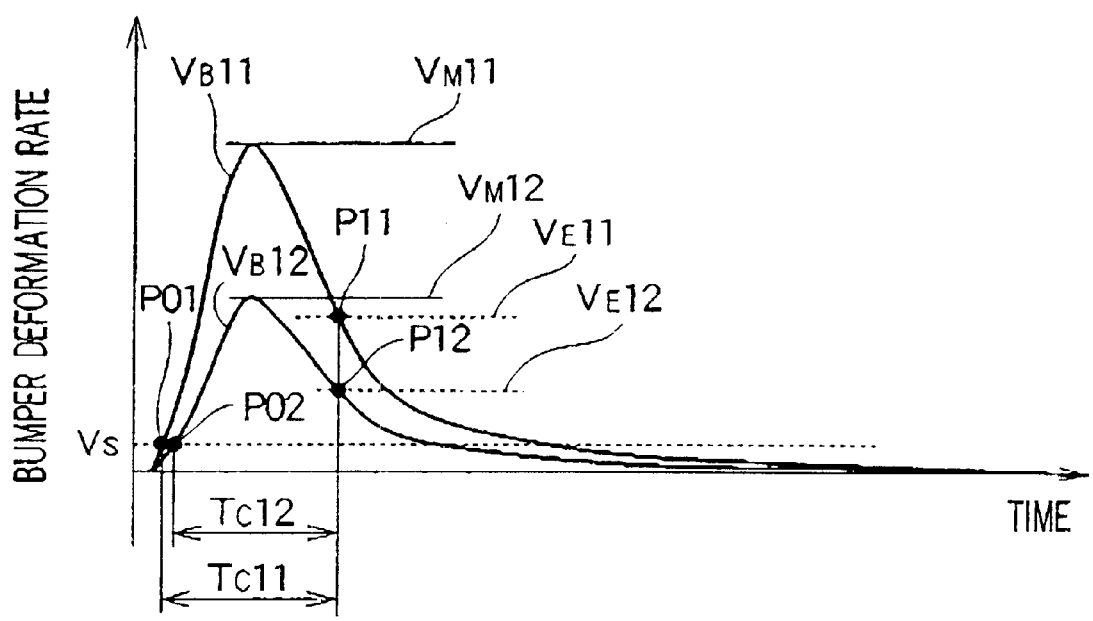
FIG. 7 is a graph showing deformation rates of the bumper face shown in FIG. 3.

FIG. 7 shows for comparison the change of deformation rate of the bumper face when the vehicle hits the same obstruction at a high speed and at a low speed, with time on the horizontal axis and bumper deformation rate on the vertical axis. The reference numerals are defined as follows:

| | |
|---|---|
| curve VB11 | deformation rate waveform curve of when obstruction is hit at a high speed |
| curve VB12 | deformation rate waveform curve of when obstruction is hit at a low speed |
| VM11 | maximum deformation rate of curve VB11 |
| VM12 | maximum deformation rate of curve VB12 |
| VS | first reference rate of curves VB11, VB12 (a value of almost immediately after impact, e.g. a value slightly above zero) |
| VE11 | second reference rate of curve VB11 (VE11 = 0.5 × VM11) |
| VE12 | second reference rate of curve VB12 (VE12 = 0.5 × VM12) |
| P01 | VS point of curve VB11 |
| P02 | VS point of curve VB12 |
| P11 | point at which curve VB11 has decreased to VE11 after increasing from P01 to VM11 |
| P12 | point at which curve VB12 has decreased to VE12 after increasing from P02 to VM12 |
| TC11 | time taken for curve VB11 to change from P01 to P11 (i.e. elapsed time) |
| TC12 | time taken for curve VB12 to change from P02 to P12 (i.e. elapsed time) |

As is clear from this FIG. 7, there is almost no difference between the elapsed time TC11 of when the vehicle hits the obstruction at a high speed and the elapsed time TC12 of when it hits the same obstruction at a low speed.

That is, if the same vehicle hits the same obstruction, even if there is a difference in the speed of the vehicle at the time of impact, there is no great difference in the elapsed times TC11, TC12 of when the vehicle hits the obstruction.

From this also, as explained above with reference to FIG. 6, with the inference method of inferring that an obstruction which has been hit is a specified obstruction when the deformation rate waveform curve VB of the bumper face 42 is a curve having the characteristic of falling (to its respective second reference rate) within a predetermined time range (that is, between the lower limit time TS and the upper limit time TL) it is possible to make a correct inference irrespective of the speed at which the obstruction was hit (that is, the vehicle speed at the time when the vehicle hits the obstruction), and therefore it can be said to be an extremely effective inference method.

Next, the control flow of the control part 44 of this first preferred embodiment will be described on the basis of FIG. 8, with reference to FIG. 4 and FIG. 6. The deformation rate of the bumper face 42 will be referred to as VB.

Step (hereinafter, ST) 01: All values are initialized. For example, the maximum deformation rate VM is set to 0 and the elapsed time TC is set to 0.

ST02: The deformation acceleration GB of the bumper face 42 detected by the bumper sensor 43 is read in.

ST03: The deformation rate VB of the bumper face 42 is calculated from the deformation acceleration GB. For example, the deformation rate VB is obtained by integrating the deformation acceleration GB.

ST04: It is determined whether or not the deformation rate VB has reached a predetermined first reference rate VS; if YES then processing proceeds to ST09, and if NO then processing returns to ST02.

ST09: The elapsed time TC of a timer 45 built into the control part 44 shown in FIG. 2 is reset (TC=0).

ST10: The timer 45 is started.

ST11: It is determined whether or not the deformation rate VB is larger than a previous maximum deformation rate value VM detected earlier; if YES then processing proceeds to ST12, and if NO then processing proceeds to ST13.

ST12: The deformation rate VB is set as the maximum deformation rate VM.

ST13: In correspondence with the maximum deformation rate VM, a second reference rate VE is set. Specifically, the second reference rate VE is determined by one of the following methods [1] and [2]:

[1] A value obtained by multiplying the maximum deformation rate VM by a predetermined constant CV smaller than 1.0 is set as the second reference rate VE (VE=VM×CV).

Figures 9A, 9B:
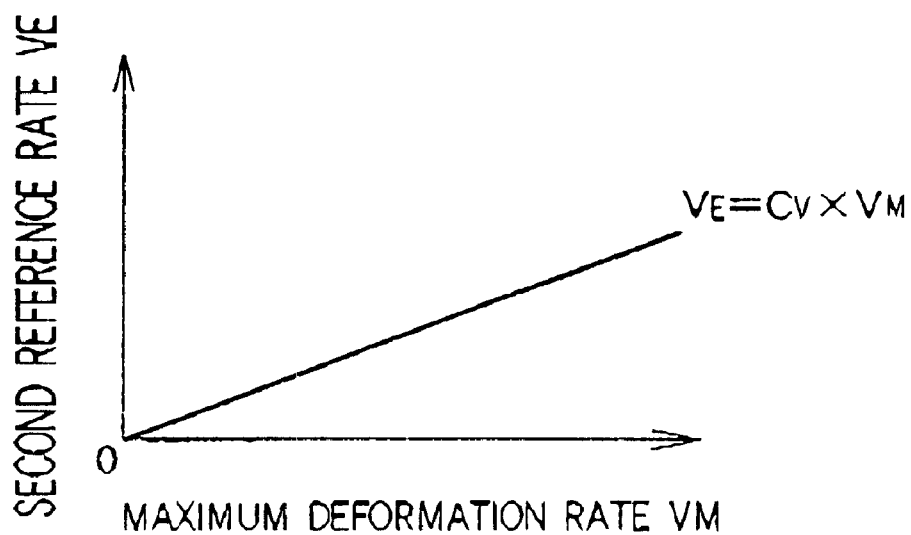
FIGS. 9A and 9B are views illustrating the setting of a second reference rate pertaining to the first preferred embodiment of the invention.

[2] The second reference rate VE is set in correspondence with the maximum deformation rate VM with reference to a map shown in FIG. 9A or FIG. 9B.

FIG. 9A is a maximum deformation rate VM—second reference rate VE correspondence map with the maximum deformation rate VM on the horizontal axis and a second reference rate VE on the vertical axis, and shows a second reference rate VE which changes in correspondence with the maximum deformation rate VM. Here, the second reference rate VE is a value obtained by multiplying the maximum deformation rate VM by a predetermined constant CV smaller than 1.0 (VE=VM×CV).

FIG. 9B is a map in the form of a table prepared on the basis of FIG. 9A, and again shows a second reference rate VE which changes in correspondence with the maximum deformation rate VM.

The second reference rate VE can be set by providing a map in memory of the control part 44 (see FIG. 4) in advance like this and referring to the map in correspondence with the maximum deformation rate VM in the above-mentioned step ST13.

Figure 8:
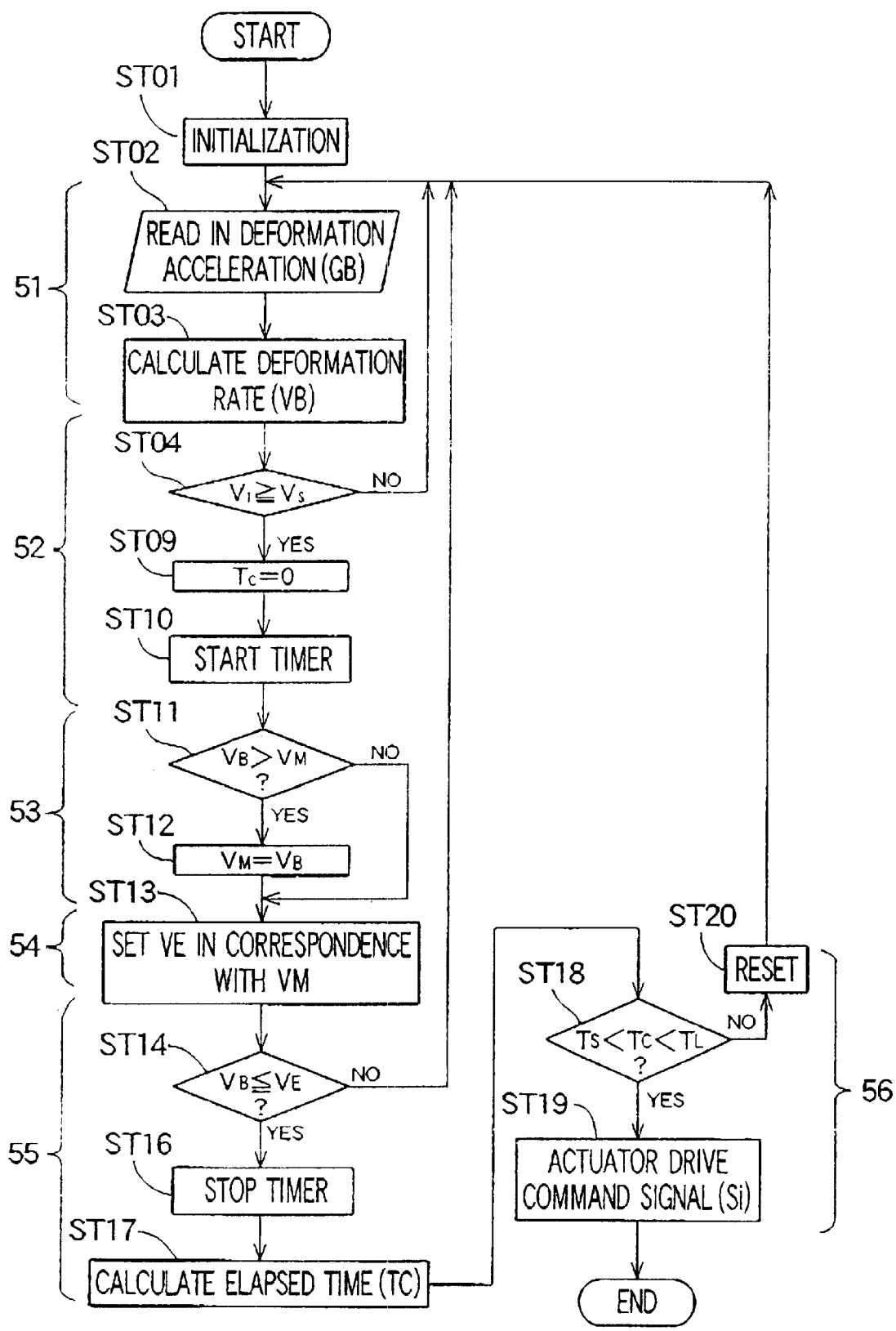
FIG. 8 is a control flow chart of a control part of the first preferred embodiment of the invention.

The description will now return to the control flow chart of FIG. 8.

ST14: It is determined whether or not the deformation rate VB has reached the second reference rate VE, that is, whether or not it has decreased to the second reference rate VE, and if YES then processing proceeds to ST16 and if NO then processing returns to ST02.

ST16: The timer 45 is stopped.

ST17: The elapsed time TC from when the timer 45 was started to when it was stopped is obtained.

ST18: It is determined whether or not the elapsed time TC is within a predetermined time range, namely between the preset lower and upper limit times TS and TL, and if YES then processing proceeds to ST19 and if NO then processing proceeds to ST20.

ST19: It is inferred that the obstruction S1 which the vehicle 10 has hit is a specified obstruction; an inference signal si (for example an actuator drive command signal si) is produced, and control ends.

ST20: The maximum deformation rate VM and the elapsed time TC are each reset to 0, and processing returns to ST02.

The specific construction of the obstruction inference apparatus for a vehicle 40 of this first preferred embodiment will now be described with reference to FIG. 4 and FIG. 8. The obstruction inference apparatus for a vehicle 40 of this first preferred embodiment has the following elements (1) through (7):

(1) The bumper face 42 (see FIG. 4), which constitutes a deformable member of the invention.

(2) Deformation rate detecting means 51, for detecting the deformation rate VB of the bumper face 42. The deformation rate detecting means 51 consists of a combination of the bumper sensor 43 (see FIG. 4) and the steps ST02 and ST03.

(3) Timer starting means 52, for starting the timer 45 (see FIG. 4) when the increasing deformation rate VB detected by the deformation rate detecting means 51 reaches the preset first reference rate VS. The timer starting means 52 consists of a combination of the steps ST04, ST09 and ST10.

(4) Maximum deformation rate updating means 53, for comparing the deformation rate VB with a previous maximum deformation rate value VM detected earlier and setting the larger of the two as the maximum deformation rate VM. The maximum deformation rate updating means 53 consists of a combination of steps ST11 and ST12. With steps ST11 and ST12, by updating the maximum deformation rate VM to the largest value as the deformation rate VB increases, it is possible to set a maximum deformation rate VM which corresponds with the type of the obstruction S1.

(5) Second reference rate generating means 54, for setting as the second reference rate VE a value equivalent to a value obtained by multiplying the maximum deformation rate VM by a constant CV smaller than 1.0, for example 0.4 to 0.6. The second reference rate generating means 54 consists of the step ST13. If the constant CV is too much smaller or larger than 0.4 to 0.6, the accuracy in inferring that the obstruction is a specified obstruction S1 is reduced.

(6) Elapsed time calculating means 55, for stopping the timer 45 when the deformation rate VB reaches the second reference rate VE and obtaining the elapsed time TC from timer start to timer stop. The elapsed time calculating means 55 consists of a combination of steps ST14, ST16 and ST17.

(7) Inference signal generating means 56, for inferring that the obstruction is a specified obstruction S1 and producing an inference signal si when the elapsed time TC is within a predetermined time range (that is, between the lower and upper limit times TS and TL). The inference signal generating means 56 consists of a combination of steps ST18 through ST20.

As is clear from the above description, with the obstruction inference apparatus for a vehicle 440 of this first preferred embodiment, (1) the deformation rate VB of the bumper face 42 when the vehicle 11 has hit an obstruction S1 is detected; (2) the elapsed time TC is obtained from when in the course of increasing this deformation rate VB reaches a preset first reference rate VS to when after reaching a maximum deformation rate VM and decreasing again it reaches a second reference rate VE; and (3) when this elapsed time TC is within a predetermined time range, that is, between the lower and upper limit times TS and TL, it can be inferred that the obstruction S1 which the vehicle has hit is a specified obstruction (for example a pedestrian).

In this way, the obstruction inference apparatus for a vehicle 40 of this first preferred embodiment applies practically the fact that when a bumper face 42 constituting a deformable member hits an obstruction S1, the deformation rate waveform characteristic of this bumper face 42 (that is, the characteristic with which the deformation rate VB continuously changes) differs according to the type, for example the weight, of the obstruction S1.

And accordingly, because only a single detecting means, the deformation rate detecting means 51, is used for this inference of the type of the obstruction S1, the number of detecting means can be reduced. Furthermore, because all that is necessary is for an impact force in one direction to be detected with a single detecting means, the detection time can be shortened.

Also, because the elapsed time from when the deformation rate VB reaches a first reference rate VS to when it reaches a second reference rate VE is obtained and the type of the obstruction S1 is just inferred on the basis of whether or not this elapsed time TC is within a predetermined time range, the time needed to infer the type of the obstruction S1 can be made extremely short and the type of the obstruction S1 can be inferred more exactly.

And also, because by the second reference rate generating means 54 a value equivalent to a value obtained by multiplying the maximum deformation rate VM, which differs according to the type of the obstruction S1, with a constant CV smaller than 1.0 is set as the second reference rate VE, the type of the obstruction S1 can be inferred still more exactly, irrespective of the impact speed at which the obstruction S1 is hit.

Next, the control flow of a control part 44 of a variation of the first preferred embodiment will be described, on the basis of FIG. 10.

Figure 10:
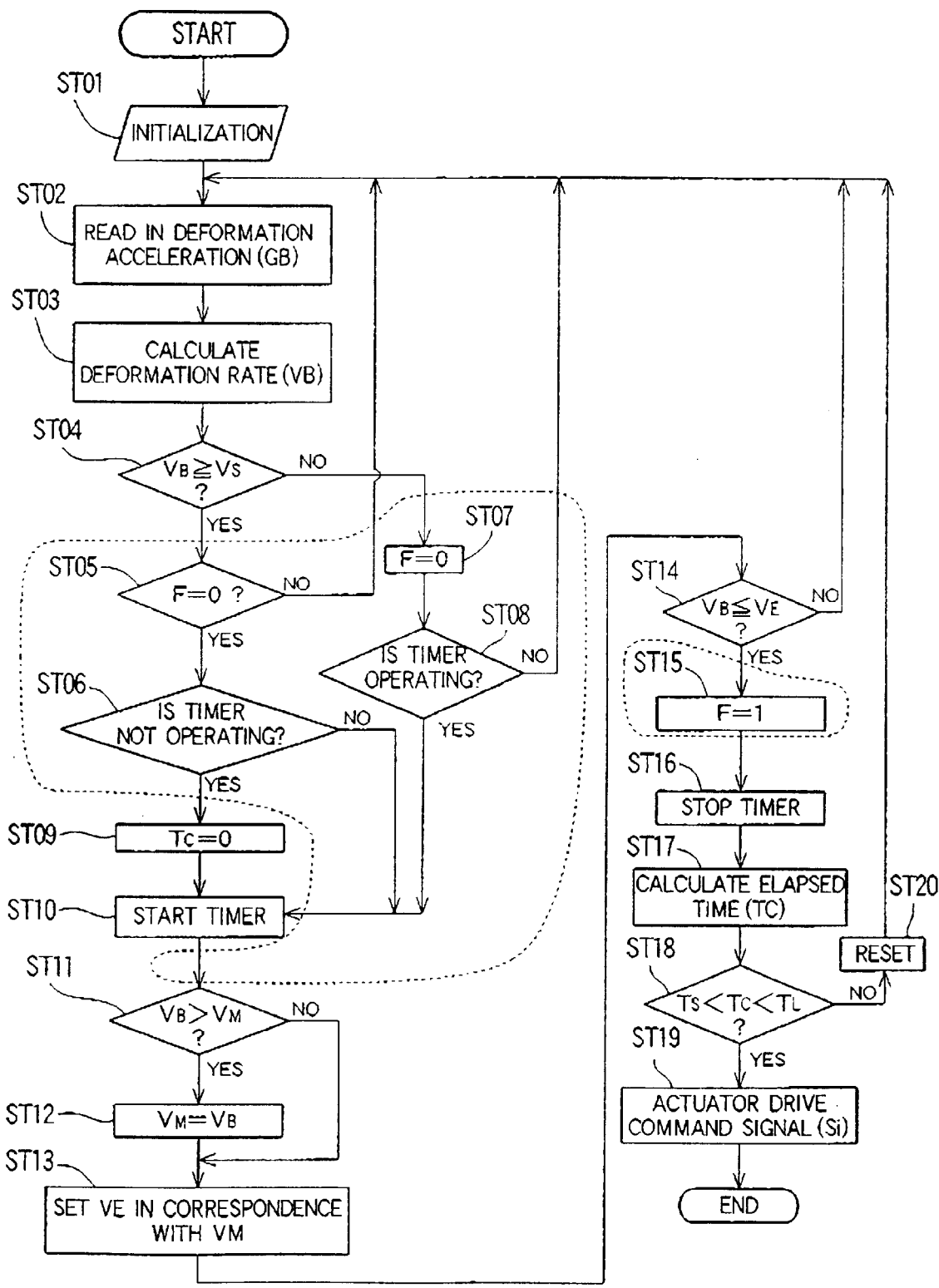
FIG. 10 is a control flow chart of a control part of a variation of the first preferred embodiment.
Figure 11:
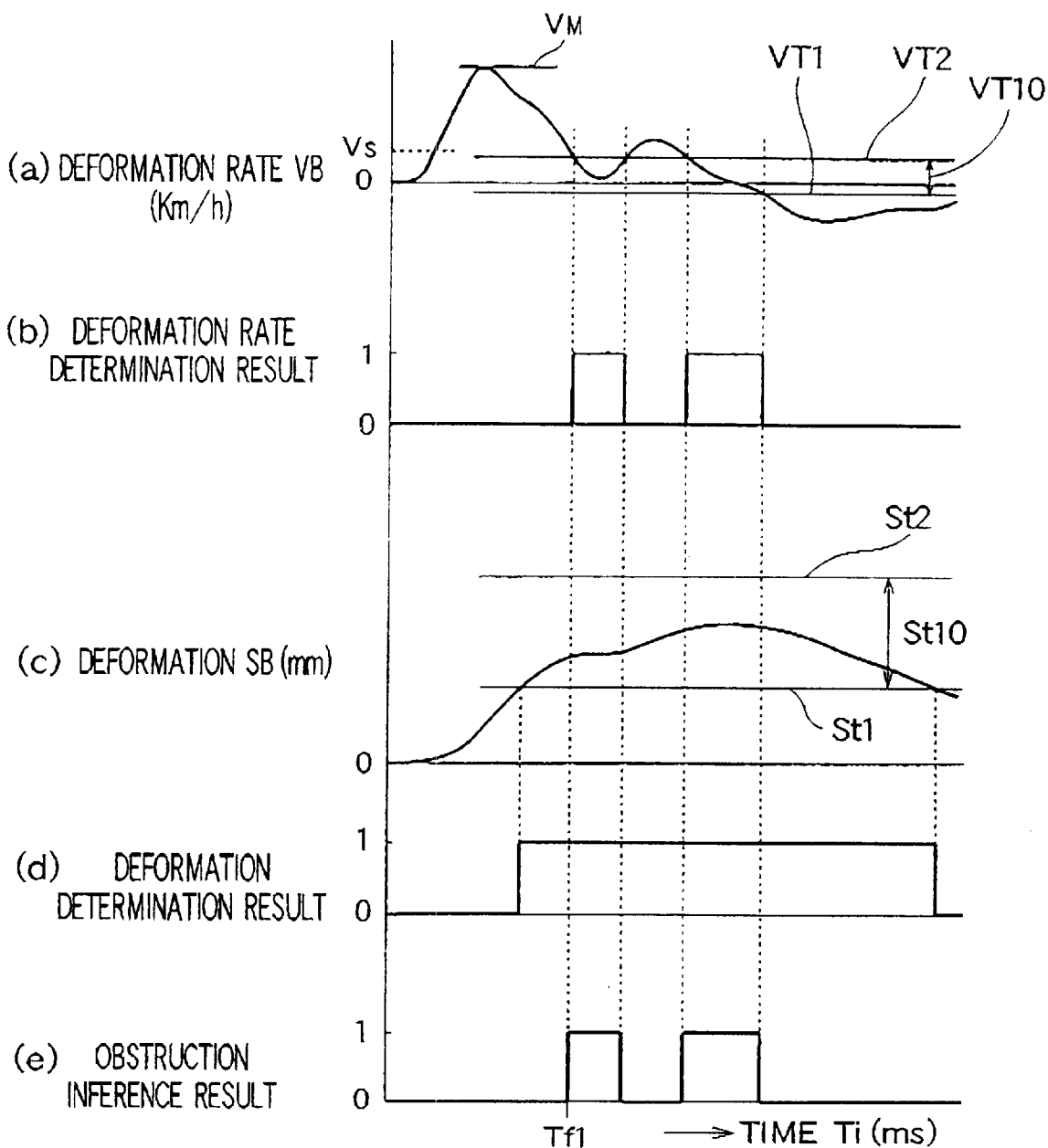
FIGS. 11A through 11E are bumper face deformation rate and deformation graphs pertaining to a second preferred embodiment of the invention.

FIG. 10 is the control flow chart shown in FIG. 8 with steps ST05 through ST08 surrounded with a broken line added between the steps ST04 and ST09 and a step ST15 surrounded with a broken line added between the steps ST14 and ST16.

Here, only the added steps ST05 through ST08 and ST15 will be described.

ST05: When the determination YES is made in ST04, it is determined whether or not a flag F is 0, and when the determination is YES processing proceeds to ST06 and when it is NO processing returns to ST02.

ST06: It is determined whether or not the timer 45 is non-operating, and when the determination is YES processing proceeds to ST09 and when it is NO processing proceeds to ST11.

ST07: When the determination NO was made in ST04, the flag F is set to 0 and processing proceeds to ST08.

ST08: It is determined whether or not the timer 45 is operating, and when YES processing proceeds to ST11 and when NO processing returns to ST02.

ST15: When the determination YES was made in ST14, the flag F is set to 1 and processing proceeds to ST16.

Next, an obstruction inference apparatus for a vehicle 40 according to a second preferred embodiment will be described, on the basis of FIG. 11A through FIG. 19B.

FIGS. 11A through 11E are bumper face deformation rate and deformation graphs (1) pertaining to this second preferred embodiment and showing a case in which the obstruction is a specified obstruction such as a pedestrian.

FIG. 11A shows change of the deformation rate VB of a bumper face having hit a specified obstruction, with time Ti (ms) on the horizontal axis and the deformation rate VB (km/h) of the bumper face on the vertical axis. VM, VS, VT1 and VT2 here are defined as follows:

VS: inference start reference speed of VB (a value of almost immediately after impact, e.g. a value slightly above zero)

VM: maximum deformation rate value of VB

| | |
|---|---|
| VT1 | first reference rate of VB (VT1 = −0.1 × VM) |
| VT2 | second reference rate of VB (VT2 = 0.2 × VM) |

Here, −0.1 and 0.2 are predetermined constants.

From FIG. 11A it can be seen that the deformation rate VB has the characteristic that after rising through the inference start reference rate VS and peaking at the maximum deformation rate VM it decreases and passes downward through the second reference rate VT2 and the first reference rate VT1.

FIG. 11B shows the result of determining whether or not the deformation rate VB lies within the range between the first reference rate VT1 and the second reference rate VT2, i.e. within the speed range VT10. The determination result when the deformation rate VB is within the speed range VT10 is '1' and the determination result when VB is not within the speed range VT10 is '0'.

FIG. 11C shows change of the deformation of the bumper face having hit the specified obstruction, with time Ti (ms) on the horizontal axis and the deformation SB (mm) of the bumper face on the vertical axis. The deformation of the bumper face is a value calculated on the basis of the deformation rate VB of FIG. 11A. St1 and St2 are defined as follows:

| | |
|---|---|
| St1 | first reference deformation of SB (St1 = 0.1 × VM) |
| St2 | second reference deformation of SB (St2 = 2.5 × VM) |

Here, the 1.0 and the 2.5 are constants for when the units of the deformation rate VB are km/h and the units of the deformation SB are mm.

From FIG. 11C it can be seen that the deformation SB has the characteristic that after rising through the first reference deformation St1 it starts to decrease before reaching the second reference deformation St2 and falls below the first reference deformation St1 again.

FIG. 11D shows the result of determining whether or not the deformation SB is within the range of from the first reference deformation St1 to the second reference deformation St2, i.e. within the deformation range St10. The determination result when the deformation SB is within the deformation range St10 is '1' and the determination result when SB is not within the deformation range St10 is '0'.

FIG. 11E shows an obstruction inference result based on the logical product of the determination result of FIG. 11B and the determination result of FIG. 11D. When the determination result in FIG. 11B is '1' and the determination result in FIG. 11D is also '1', the obstruction inference result is the determination '1'. That is, when in FIG. 11A the deformation rate VB is within the speed range VT10 and also in FIG. 11C the deformation SB is within the deformation range St10, the obstruction inference result becomes '1' and it is inferred that the obstruction is a specified obstruction. According to FIG. 11E it can be inferred at the time Tf1 that the obstruction is a specified obstruction.

Figure 12:
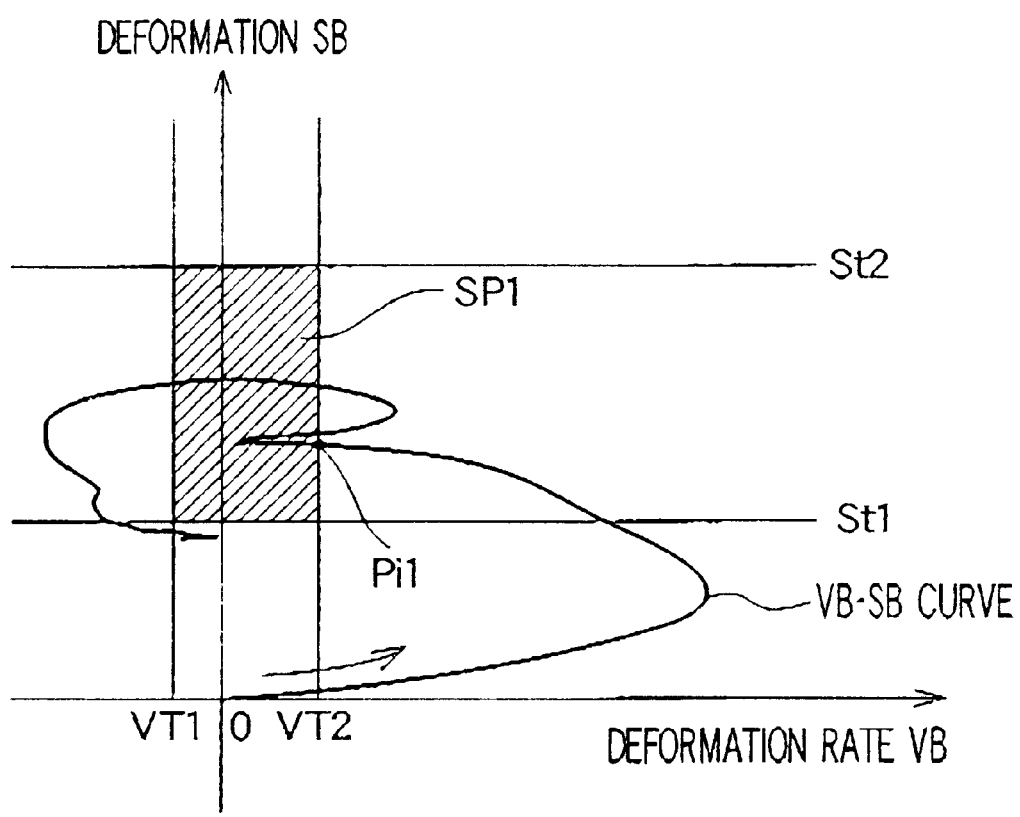
FIG. 12 is a bumper face deformation rate—deformation curve pertaining to the second preferred embodiment of the invention.
Figure 13:
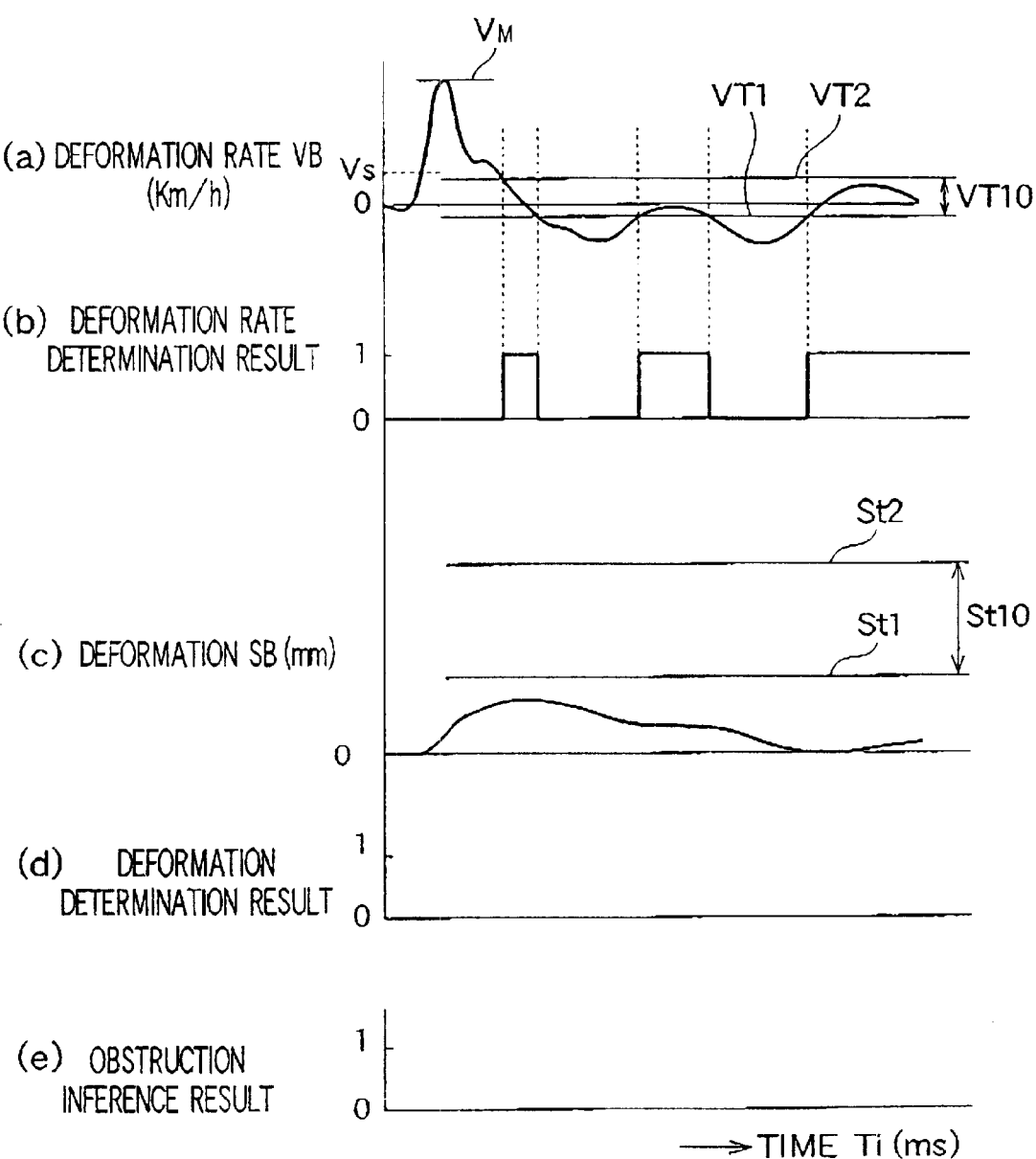
FIGS. 13A through 13E are bumper face deformation rate and deformation graphs pertaining to the second preferred embodiment of the invention.

FIG. 12 shows with deformation rate on the horizontal axis and deformation on the vertical axis a VB-SB curve obtained by plotting the deformation rate VB and the deformation SB of FIGS. 11A and 11C, which are for a case wherein the obstruction is a specified obstruction, against each other. The first and second reference rates VT1 and VT2 and the first and second reference deformations St1 and St2 are also the same as in FIGS. 11A and 11C.

From FIG. 12 it can be seen that when as a result of having hit an obstruction the bumper face starts to deform, the VB-SB curve extends rightward and upward in the graph from the origin (zero) and then extends counterclockwise as the deformation progresses.

Specifically, when the vehicle has hit an obstruction, the bumper face is deformed toward the rear of the vehicle by the force of the impact. From the time the collision starts the deformation rate VB of the bumper face starts to increase and in correspondence with this the deformation SB of the bumper face also starts to increase. Thereafter, as the deformation SB becomes large, the reaction of the bumper face becomes large. When the reaction of the bumper face to the impact force becomes large, the deformation rate VB starts to decrease, and eventually it becomes zero and then assumes a negative value. The deformation SB increases until the deformation rate VB becomes zero and then decreases as the deformation rate VB assumes a negative value.

Here, the frame of the range between the first reference rate VT1 and the second reference rate VT2 and the range between the first reference deformation St1 and the second reference deformation St2 is shown with hatching. This hatched frame will be called the first reference range SP1. The VB-SB curve enters this first reference range SP1 at the point Pi1. At this time, it can be inferred that the obstruction is a specified obstruction.

FIGS. 13A through 13E are bumper face deformation rate and deformation graphs (2) pertaining to the second preferred embodiment and showing a case where the obstruction is a light object. The graphs are to be viewed in the same way as FIGS. 11A through 11E, and the reference numerals have the same definitions.

FIG. 13A shows change of the deformation rate VB of a bumper face having hit a light object, with time Ti (ms) on the horizontal axis and the deformation rate VB (km/h) of the bumper face on the vertical axis.

FIG. 13B shows the result of determining whether or not the deformation rate VB lies within the speed range VT10. The determination result when the deformation rate VB is within the speed range VT10 is '1' and the determination result when VB is not within the speed range VT10 is '0'.

FIG. 13C shows change of the deformation of the bumper face having hit the light object, with time Ti (ms) on the horizontal axis and the deformation SB (mm) of the bumper face on the vertical axis. From FIG. 13C it can be seen that the deformation SB does not reach the first reference deformation St1. This is because the deformation time is short because the deformation rate VB becomes zero in a short time after starting to decrease from the maximum deformation rate VM.

FIG. 13D shows the result of determining whether or not the deformation SB is within the deformation range St10. Because the deformation SB is within the deformation range St10, the determination result is '0'.

FIG. 13E shows an obstruction inference result based on the logical product of the determination result of FIG. 13B and the determination result of FIG. 13D. Because the determination result in FIG. 13D is '0', the obstruction inference result is '0' and it is inferred that the obstruction is not a specified obstruction.

Figure 14:
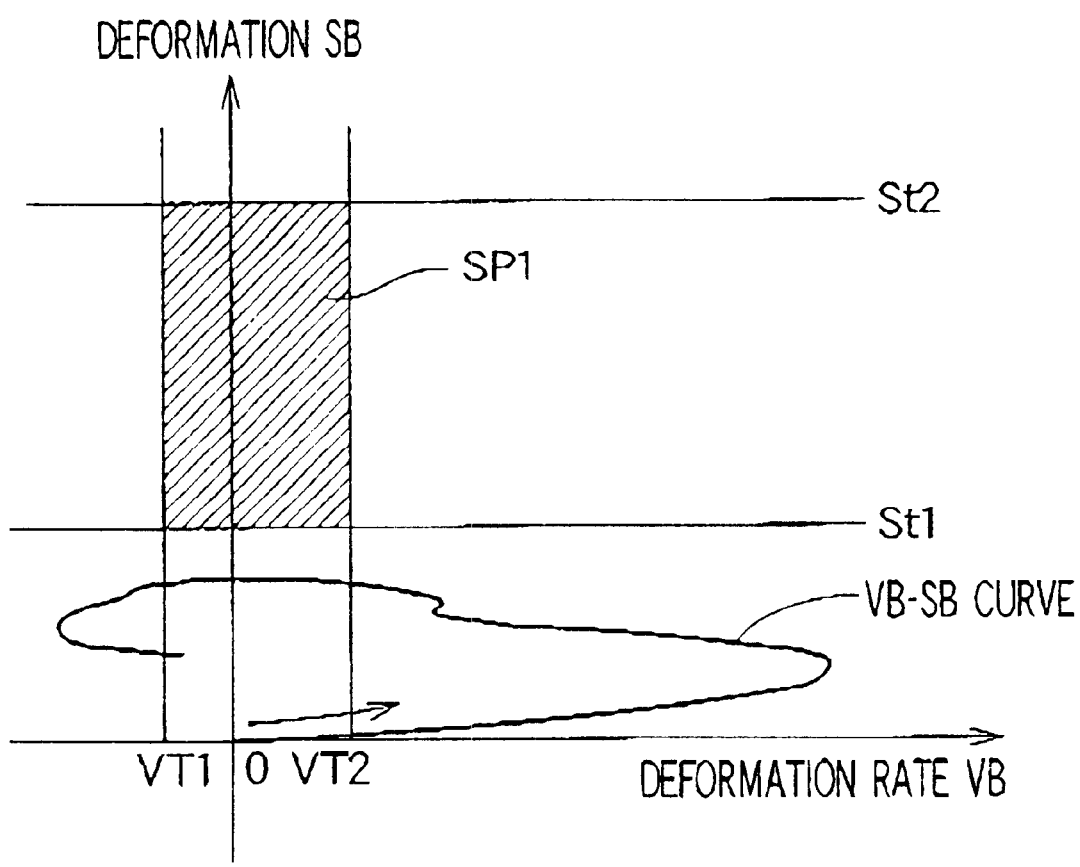
FIG. 14 is a bumper face deformation rate—deformation curve pertaining to the second preferred embodiment of the invention.
Figure 15:
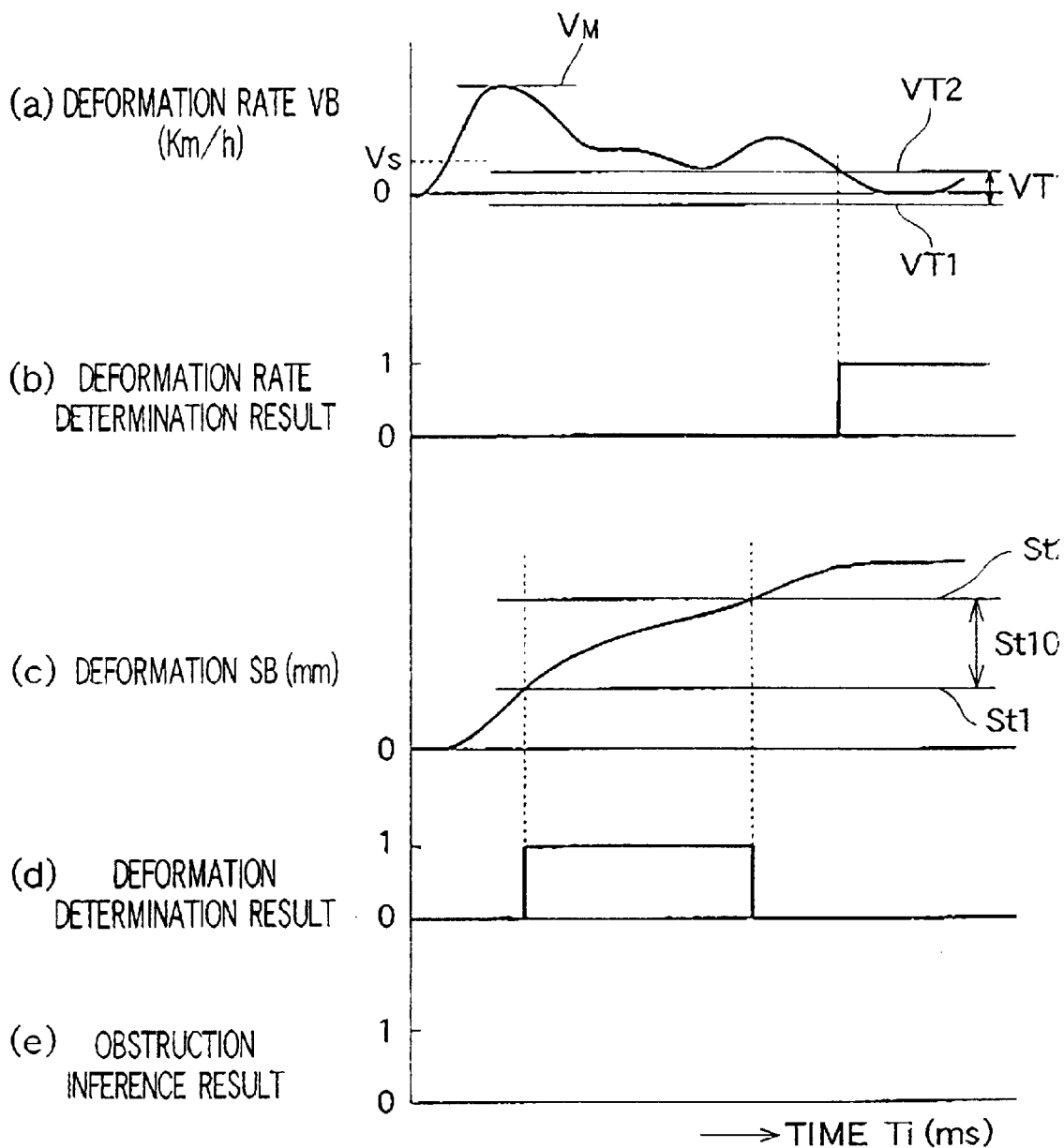
FIGS. 15A through 15E are bumper face deformation rate and deformation graphs pertaining to the second preferred embodiment of the invention.

FIG. 14 shows with deformation rate on the horizontal axis and deformation on the vertical axis a VB-SB curve obtained by plotting the deformation rate VB and the deformation SB of FIGS. 13A and 13C, which are for a case wherein the obstruction is a light object, against each other. The first and second reference rates VT1 and VT2 and the first and second reference deformations St1 and St2 are also the same as in FIGS. 13A and 13C.

From the VB-SB curve of FIG. 14, it can be seen that the deformation SB of when the deformation rate VB is in the course of decreasing from its maximum value is extremely small compared with FIG. 12. Consequently, the VB-SB curve does not enter the first reference range SP1. As a result, it can be inferred that the obstruction is not a specified obstruction.

FIGS. 15A through 15E are bumper face deformation rate and deformation graphs (3) pertaining to the second preferred embodiment and showing a case wherein the obstruction is a low-center-of-gravity obstruction S2 of the kind shown in FIG. 5. The graphs are to be viewed in the same way as FIGS. 11A through 11E, and the reference numerals have the same definitions.

FIG. 15A shows change of the deformation rate VB of a bumper face having hit a low-center-of-gravity obstruction, with time Ti (ms) on the horizontal axis and the deformation rate VB (km/h) of the bumper face on the vertical axis.

FIG. 15B shows the result of determining whether or not the deformation rate VB lies within the speed range VT10. The determination result when the deformation rate VB is within the speed range VT10 is '1' and the determination result when VB is not within the speed range VT10 is '0'.

FIG. 15C shows change of the deformation of the bumper face having hit the light object, with time Ti (ms) on the horizontal axis and the deformation SB (mm) of the bumper face on the vertical axis. From FIG. 15C it can be seen that the deformation SB rises through the first reference deformation St1 and then also rises through the second reference deformation St2. This is because since it takes a relatively long time for the deformation rate VB to decrease to zero from the maximum deformation rate VM, the deformation time is long. In this case, when the deformation SB is within the deformation range St10, the deformation rate VB in FIG. 15A is not within the rate range VT10.

FIG. 15D shows the result of determining whether or not the deformation SB is within the deformation range St10. The determination result when the deformation SB is within the deformation range St10 is '1' and the determination result when SB is not within the deformation range St10 is '0'.

FIG. 15E shows an obstruction inference result based on the logical product of the determination result of FIG. 15B and the determination result of FIG. 15D. When the determination result in FIG. 15B is '1', because the determination result in FIG. 15D is '0', the obstruction inference result is '0' and it is inferred that the obstruction is not a specified obstruction.

Figure 16:
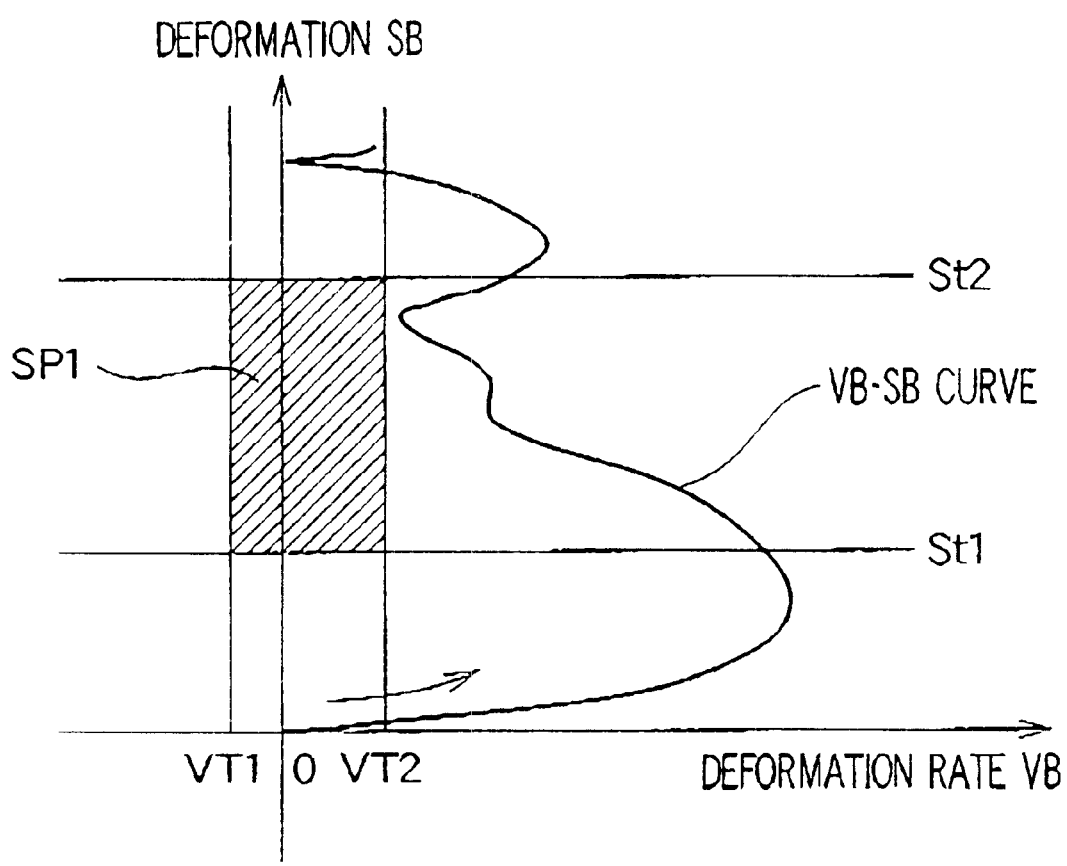
FIG. 16 is a bumper face deformation rate—deformation curve pertaining to the second preferred embodiment of the invention.

FIG. 16 shows with deformation rate on the horizontal axis and deformation on the vertical axis a VB-SB curve obtained by plotting the deformation rate VB and the deformation SB of FIGS. 15A and 15C, which are for a case wherein the obstruction is a low-center-of-gravity obstruction, against each other. The first and second reference rates VT1 and VT2 and the first and second reference deformations St1 and St2 are also the same as in FIGS. 15A and 15C.

From the VB-SB curve of FIG. 16, it can be seen that the deformation SB of when the deformation rate VB is in the course of decreasing from its maximum value is extremely large compared with FIG. 12. Consequently, the VB-SB curve does not enter the first reference range SP1. As a result, it can be inferred that the obstruction is not a specified obstruction.

The present inventors discovered that the characteristic (the VB-SB curve) with which the deformation rate VB and the deformation SB of the bumper face 42 continuously change differs like this in accordance with the type of the obstruction which the bumper face 42 (see FIG. 4) has hit.

That is, (1) when the obstruction is a light object, as shown in FIG. 14, the deformation SB of when the deformation rate VB is in the course of decreasing from its maximum value is extremely small compared to the case of a specified obstruction. And (2) when the obstruction is a low-center-of-gravity obstruction, as shown in FIG. 16, the deformation SB of when the deformation rate VB is in the course of decreasing from its maximum value is extremely large compared to the case of a specified obstruction.

This second preferred embodiment thus utilizes the fact that when the deformation rate VB is in the course of decreasing from the time when it reaches its maximum deformation rate VM the characteristic of the deformation SB differs in accordance with the type of the obstruction S1, and infers that the obstruction is a specified obstruction when the VB-SB curve (i.e. the deformation rate VB and the deformation SB) enters the preset first reference range SP1. With this kind of inference method it is possible to infer the type of an obstruction exactly, and therefore it can be said to be an extremely effective inference method.

Next, with reference to FIG. 4, the control flow of the control part 44 of this second preferred embodiment will be described, on the basis of FIG. 17.

ST31: All values are initialized (for example, the maximum deformation rate VM is set to 0 and F is set to 0).

ST32: The deformation acceleration GB of the bumper face 42 detected by the bumper sensor 43 is read in, and processing proceeds to ST39.

ST39: The deformation rate VB of the bumper face 42 is calculated from the deformation acceleration GB. For example, the deformation rate VB is obtained by integrating the deformation acceleration GB.

ST40: The deformation SB of the bumper face 42 is calculated from the deformation rate VB. For example, the deformation SB is obtained by integrating the deformation rate VB.

ST41: It is determined whether or not the deformation rate VB has reached a preset inference start reference rate VS, and when YES processing proceeds to ST42 and when NO processing proceeds to ST43.

ST42: The flag F is set to '1'.

St43: It is determined whether or not the flag F=1, and when YES processing proceeds to ST44 and when NO processing returns to ST32.

ST44: It is determined whether or not the deformation rate VB is larger than a previous maximum deformation rate VM detected earlier, and when YES processing proceeds to ST45 and when NO processing proceeds to ST46.

ST45: The deformation rate VB is set as the maximum deformation rate VM.

ST46: A first reference rate VT1 is set in correspondence with the maximum deformation rate VM. Specifically, a value obtained by multiplying the maximum deformation rate VM by a preset first rate constant CV1 smaller than 1.0 is set as the first reference rate VT1 (VT1=VM×CV1).

ST47: A second reference rate VT2 is set in correspondence with the maximum deformation rate VM. Specifically, a value obtained by multiplying the maximum deformation rate VM by a preset second rate constant CV2 smaller than 1.0 but larger than the first rate constant CV1 is set as the second reference rate VT2 (VT2=VM×CV2).

ST49: A first reference deformation St1 is set in correspondence with the maximum deformation rate VM. Specifically, a value obtained by multiplying the maximum deformation rate VM by a preset first deformation constant CS1 is set as the first reference deformation St1 (St1=VM× CS1).

ST50: A second reference deformation St2 is set in correspondence with the maximum deformation rate VM. Specifically, a value obtained by multiplying the maximum deformation rate VM by a preset second deformation constant CS2 larger than the first deformation constant CS1 is set as the second reference deformation St2 (St2=VM×CS2).

ST52: It is determined whether or not the deformation rate VB is within the range of from the first reference rate VT1 to the second reference rate VT2, and if YES then processing proceeds to ST53 and if No then processing returns to ST32.

ST53: It is determined whether or not the deformation SB is within the range of from the first reference deformation St1 to the second reference deformation St2, and if YES then processing proceeds to ST56 and if NO then processing returns to ST32.

ST56: It is inferred that the obstruction S1 which the vehicle 11 has hit is a specified obstruction; an inference signal si (for example an actuator drive command signal si) is produced, and control ends.

The specific construction of the obstruction inference apparatus for a vehicle 40 of this second preferred embodiment will now be described, with reference to FIG. 4 and FIG. 17. The obstruction inference apparatus for a vehicle 40 of this second preferred embodiment has the following elements (1) through (10):

(1) The bumper face 42 (see FIG. 4), which serves as a deformable member of the invention.

(2) Deformation rate detecting means 151, for detecting the deformation rate VB of the bumper face 42. The deformation rate detecting means 151 consists of a combination of the bumper sensor 43 (see FIG. 4) and the steps ST32 and ST39.

(3) Deformation calculating means 152, for obtaining the deformation SB of the bumper face 42 on the basis of the deformation rate VB detected by the deformation rate detecting means 151. The deformation calculating means 152 consists of the step ST40.

(4) Inference starting means 153, for starting the inference of the type of the obstruction S1 (see FIG. 4) when the deformation rate VB first reaches the preset inference start reference rate VS. The inference starting means 153 consists of a combination of the steps ST41 through ST43. When the deformation rate VB has once reached the inference start reference rate VS, the inference of the type of the obstruction S1 can be continued irrespective of the size of the deformation rate VB thereafter.

(5) Maximum deformation rate updating means 154, for comparing the deformation rate VB with a previous maximum deformation rate value VM detected earlier and setting the larger of the two as the maximum deformation rate VM. The maximum deformation rate updating means 154 consists of a combination of steps ST44 and ST45. With steps ST44 and ST45, by updating the maximum deformation rate VM to the largest value as the deformation rate VB increases, it is possible to set a maximum deformation rate VM which corresponds with the type of the obstruction S1.

(6) First reference rate generating means 155, for setting as the first reference rate VT1 a value equivalent to a value obtained by multiplying the maximum deformation rate VM by a preset first rate constant CV1 smaller than 1.0, for example −0.1. The first reference rate generating means 155 consists of the step ST46.

(7) Second reference rate generating means 156, for setting as the second reference rate VT2 a value equivalent to a value obtained by multiplying the maximum deformation rate VM by a preset second rate constant CV2 smaller than 1.0 but larger than the first rate constant CV1, for example 0.2. The second reference rate generating means 156 consists of the step ST47.

(8) First reference deformation generating means 158, for setting as the first reference deformation St1 a value equivalent to a value obtained by multiplying the maximum deformation rate VM by a preset first deformation constant CS1, for example 1.0. The first reference deformation generating means 158 consists of the step ST49.

(9) Second reference deformation generating means 159, for setting as the second reference deformation St2 a value equivalent to a value obtained by multiplying the maximum deformation rate VM by a preset second deformation constant CS2 larger than the first deformation constant CS1, for example 2.5. The second reference deformation generating means 159 consists of the step ST50.

(10) Inference signal generating means 161, for inferring that the obstruction is a specified obstruction S1 and producing an inference signal si when the deformation rate VB is within the range of from the first reference rate VT1 to the second reference rate VT2 and the deformation SB is within the range of from the first reference deformation St1 to the second reference deformation St2. The inference signal generating means 161 consists of the steps ST52, ST53 and ST56.

As is clear from the foregoing description, with the obstruction inference apparatus for a vehicle 40 of this second preferred embodiment, (1) the deformation rate VB of the bumper face 42 of when the vehicle 11 has hit an obstruction S1 is detected; (2) the deformation SB of the bumper face 42 is obtained on the basis of this deformation rate VB; (3) the maximum deformation rate VM, of when the deformation rate VB reaches its peak, is obtained; (4) on the basis of this maximum deformation rate VM, a range of from a first reference rate VT1 to a second reference rate VT2 and a range of from a first reference deformation St1 to a second reference deformation St2 are set; and (5) when the deformation rate VB is in the range between the first and second reference rates VT1, VT2 and the deformation SB is in the range between the first and second reference deformations St1, St2 it can be inferred that the obstruction S1 which has been hit is a specified obstruction (for example a pedestrian).

In this way, the obstruction inference apparatus for a vehicle 40 of this second preferred embodiment applies practically the fact that when a bumper face 42 constituting a deformable member hits an obstruction S1, the deformation rate waveform characteristic of this bumper face 42 (that is, the characteristic with which the deformation rate VB continuously changes) differs according to the type, for example the weight, of the obstruction S1.

And accordingly, because only a single detecting means, the deformation rate detecting means 151, is used for this inference of the type of the obstruction S1, the number of detecting means can be reduced. Furthermore, because all that is necessary is for the deformation rate VB in one direction to be detected with a single detecting means, the detection time can be shortened.

Also, because the fact that when the deformation rate VB is in the course of decreasing from the time when it reaches its maximum deformation rate VM the characteristic of the deformation SB differs in accordance with the type of the obstruction S1 is utilized and the type of the obstruction S1 is just inferred on the basis of whether or not the VB-SB curve enters the preset first reference range SP1, the time needed to infer the type of the obstruction S1 can be made extremely short and the type of the obstruction S1 can be inferred more exactly.

And also, when the vehicle 11 hits an obstruction S1, the bumper face 42 at the front end of the vehicle is the first to hit the obstruction S1. And only the data that are the deformation rate VB and the deformation SB of when the bumper face 42, which hits the obstruction first, deforms are used to infer the type of the obstruction S1. Consequently, the type of the obstruction S1 can be inferred in a still shorter time.

And, because values equivalent to values obtained by multiplying the maximum deformation rate VM, which differs according to the type of the obstruction S1, with predetermined constants are set as the first and second reference rates VT1, VT2 and the first and second reference deformations St1, St2, the type of the obstruction S1 can be inferred still more exactly, irrespective of the impact speed at which the obstruction S1 is hit.

In the steps ST46, ST47, ST49 and ST50, the values VT1, VT2, St1 and St2 can be set in correspondence with the maximum deformation rate VM by referring to maps shown in the following figures FIGS. 18A, 18B, 19A and 19B.

Figures 18A, 18B:
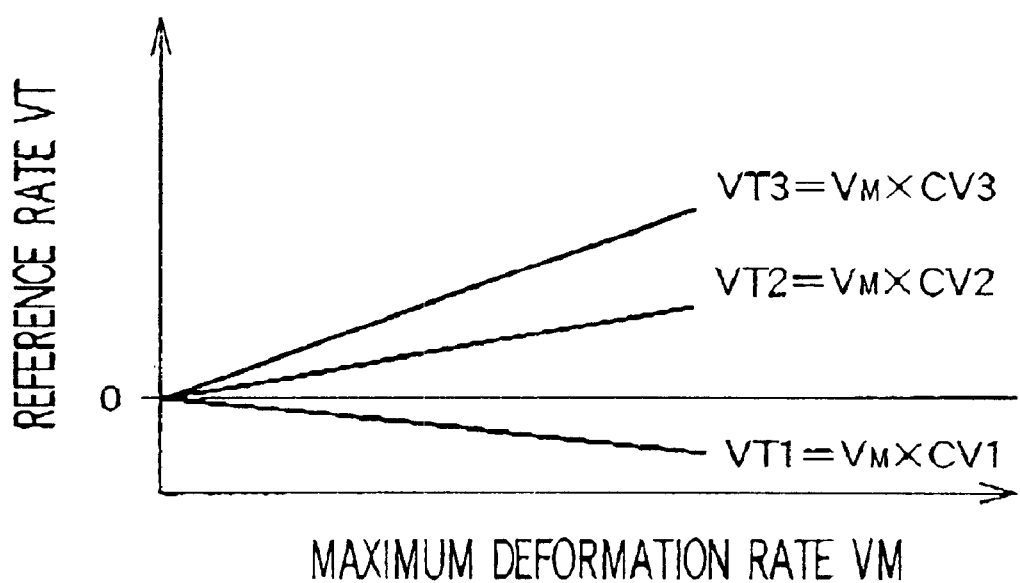
FIGS. 18A and 18B are views illustrating the setting of a reference rate of a control part of the second preferred embodiment of the invention.

FIG. 18A is a maximum deformation rate VM—reference rate VT correspondence map with the maximum deformation rate VM on the horizontal axis and a reference rate VT on the vertical axis, and shows first and second reference rates VT1, VT2 which change in correspondence with the maximum deformation rate VM. The line VT1 is based on the formula 'first reference rate VT1=VM×CV1', and the line VT2 is based on the formula 'second reference rate VT2=VM×CV2'.

FIG. 18B is a map in the form of a table prepared on the basis of FIG. 18A, and again shows first and second reference rates VT1, VT2 which change in correspondence with the maximum deformation rate VM.

The first and second reference rates VT1, VT2 can be set by providing a map in memory of the control part 44 (see FIG. 4) in advance like this and referring to the map in correspondence with the maximum deformation rate VM in the above-mentioned steps ST46 and ST47. That is, the first and second reference rates VT1, VT2 set by referring to a map are values equivalent to values obtained using the formulas of FIG. 18A.

Figures 19A, 19B:
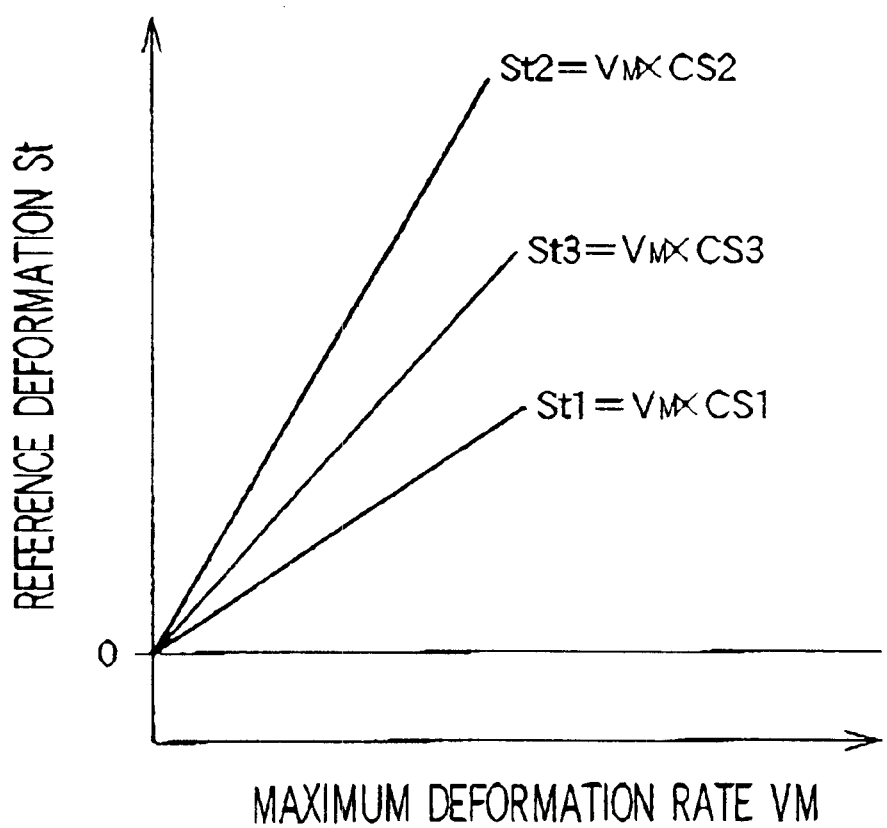
FIGS. 19A and 19B are views illustrating the setting of a reference deformation of a control part of the second preferred embodiment of the invention.

FIG. 19A is a maximum deformation rate VM—reference deformation ST correspondence map with the maximum deformation rate VM on the horizontal axis and a reference deformation ST on the vertical axis, and shows first and second reference deformations St1, St2 which change in correspondence with the maximum deformation rate VM. The line St1 is based on the formula 'first reference deformation St1=VM×CS1', and the line St2 is based on the formula 'second reference deformation St2=VM×CS2'.

FIG. 19B is a map in the form of a table prepared on the basis of FIG. 19A, and again shows first and second reference deformations St1, St2 which change in correspondence with the maximum deformation rate VM.

The first and second reference deformations St1, St2 can be set by providing a map in memory of the control part 44 (see FIG. 4) in advance like this and referring to the map in correspondence with the maximum deformation rate VM in the above-mentioned steps ST49 and ST50. That is, the first and second reference deformations St1, St2 set by referring to a map are values equivalent to values obtained using the formulas of FIG. 19A.

The control flow of the control part 44 of a first variation of the second preferred embodiment will now be described, on the basis of FIG. 20.

Figure 17:
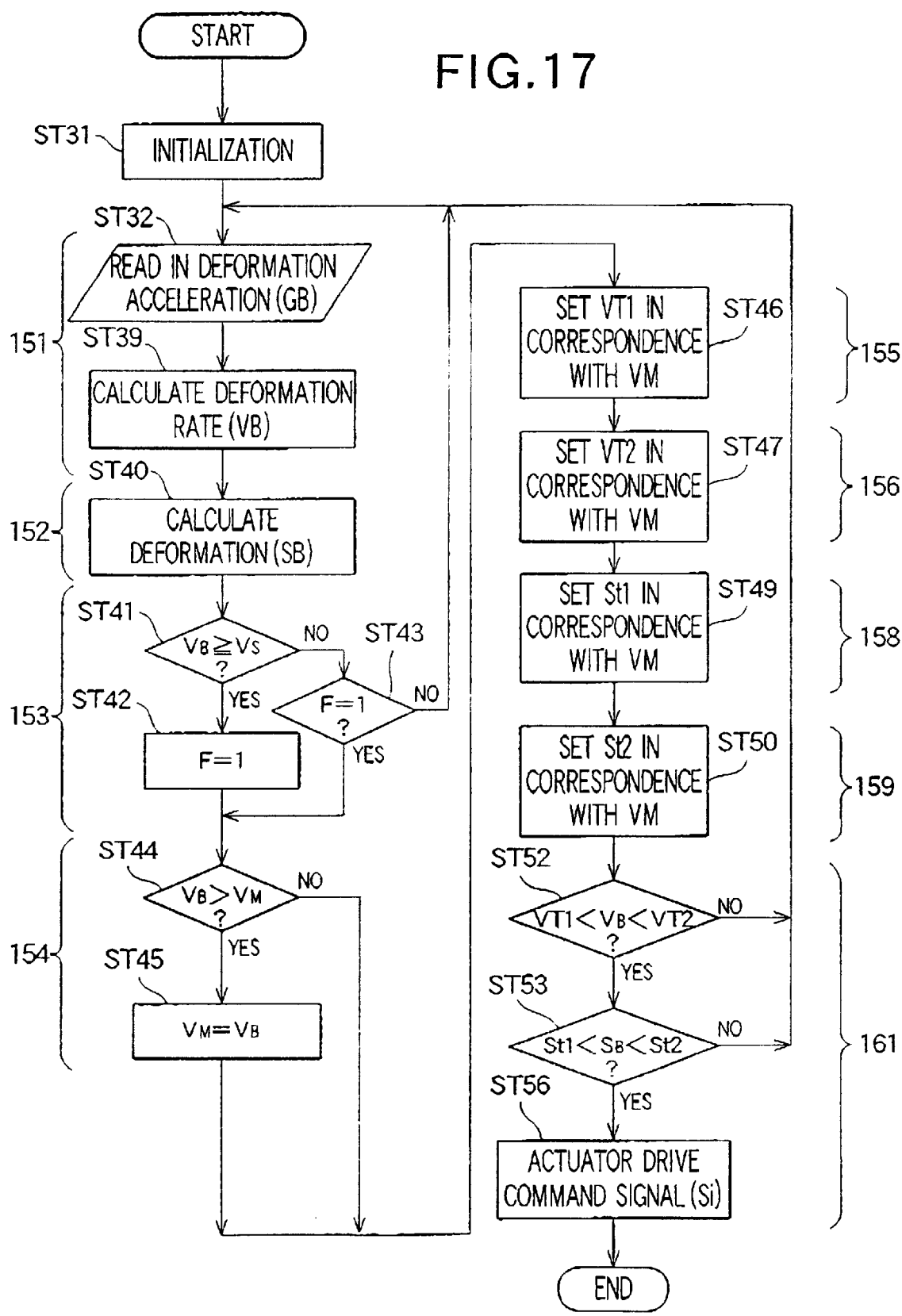
FIG. 17 is a control flow chart of a control part pertaining to the second preferred embodiment of the invention.
Figure 20:
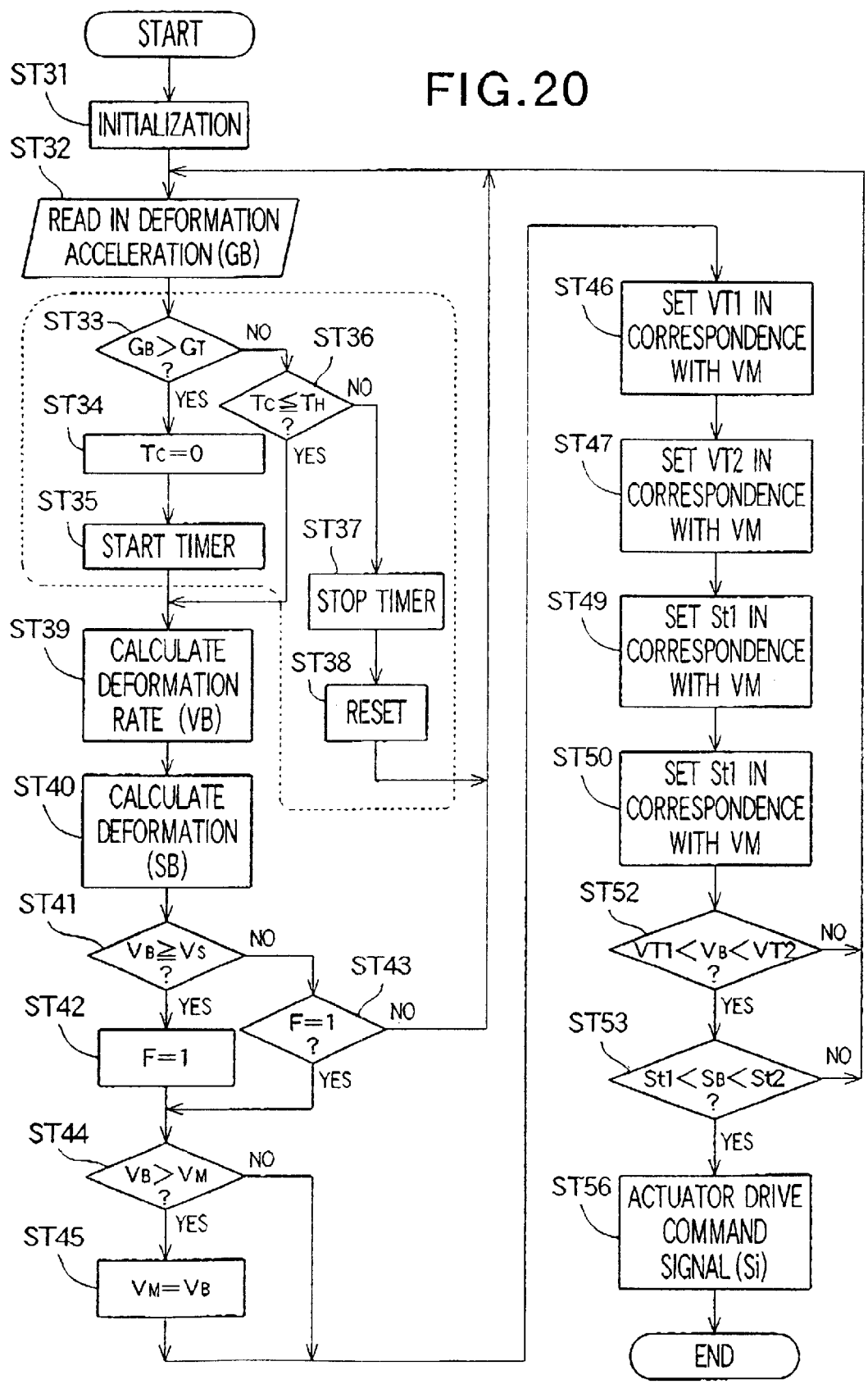
FIG. 20 is a control flow chart of a control part of a first variation of the second preferred embodiment of the invention.

FIG. 20 is the flow chart shown in FIG. 17 with steps ST33 through ST38 surrounded with a broken line added between the steps ST32 and ST39.

Here, only the added steps ST33 through ST38 will be explained.

ST33: Following the step ST32 it is determined whether or not the deformation acceleration GB has risen above a predetermined reference acceleration GT, and if YES then processing proceeds to ST34 and if NO then processing proceeds to ST36.

ST34: The elapsed time TC of the timer 45 built into the control part 44 shown in FIG. 4 is reset (TC=0).

ST35: The timer 45 is started and processing proceeds to ST39.

ST36: It is determined whether or not the elapsed time TC from when the timer 45 was started has reached a predetermined reference time TH, and if YES then processing proceeds to ST39 and if NO then processing proceeds to ST37.

ST37: The timer 45 is stopped.

ST38: The maximum deformation rate VM, the elapsed time TC and the flag F are all reset to 0, and processing proceeds to ST32.

In this way, after the deformation acceleration GB has risen above a small reference acceleration GT, after a fixed time passes without it exceeding the reference acceleration GT again, processing returns to the starting point.

The control flow of the control part 44 of a second variation of the second preferred embodiment will now be described, on the basis of FIG. 21.

Figure 21:
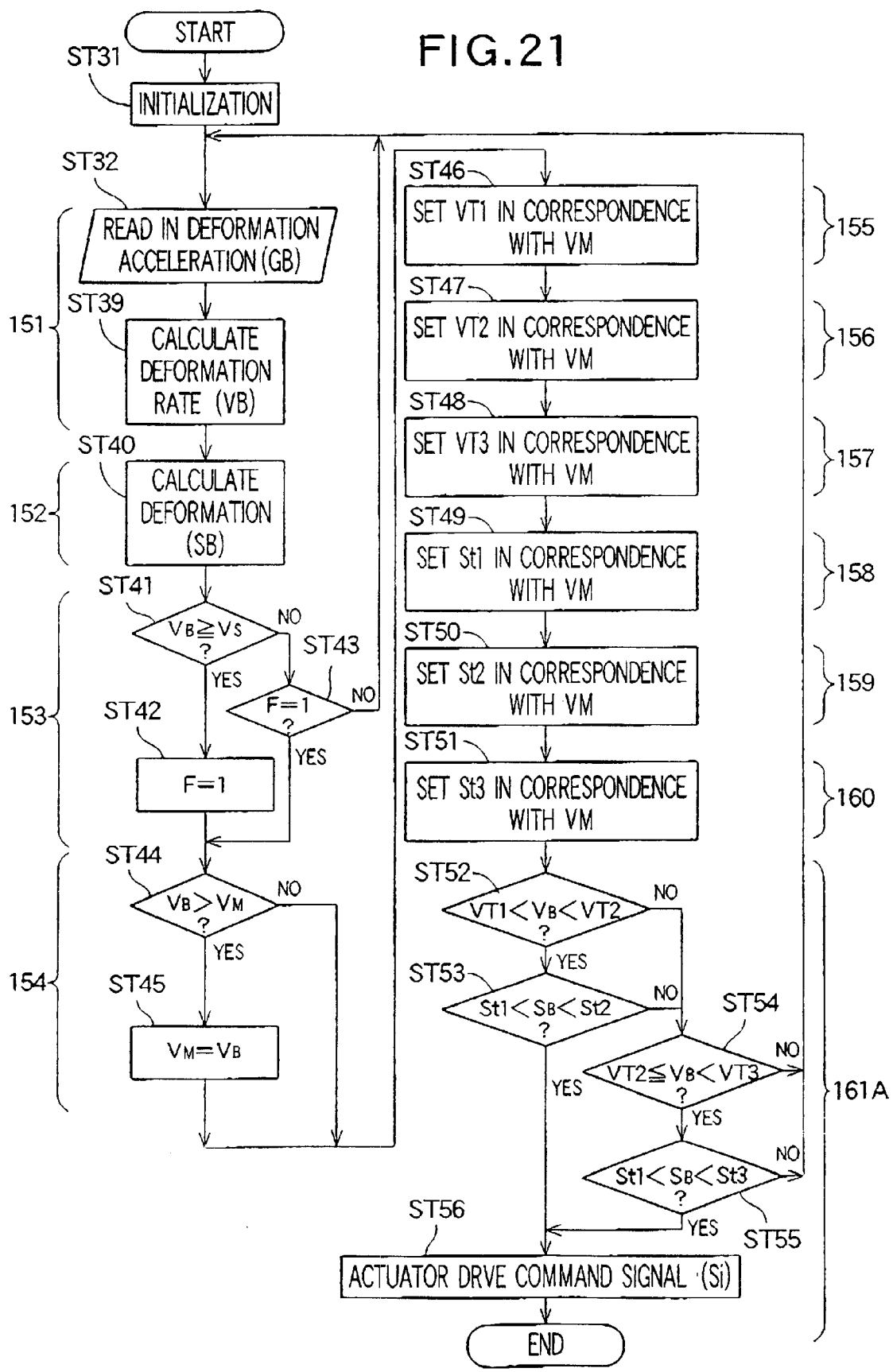
FIG. 21 is a control flow chart of a control part of a second variation of the second preferred embodiment of the invention.

FIG. 21 is the control flow chart shown in FIG. 17 with steps ST48, ST51, ST54 and ST55 added.

Here, only the steps ST46 through ST56 will be explained.

ST46: A first reference rate VT1 corresponding to the maximum deformation rate VM is set.

ST47: A second reference rate VT2 corresponding to the maximum deformation rate VM is set.

ST48: A third reference rate VT3 corresponding to the maximum deformation rate VM is set. Specifically, a value obtained by multiplying the maximum deformation rate VM by a preset third rate constant CV3 smaller than 1.0 and different from the first and second rate constants CV1, CV2 is set as the third reference rate VT3 (VT3=VM×CV3). The third rate constant CV3 is for example a value larger than the first and second rate constants CV1 and CV2.

ST49: A first reference deformation St1 is set in correspondence with the maximum deformation rate VM.

ST50: A second reference deformation St2 is set in correspondence with the maximum deformation rate VM.

ST51: A third reference deformation St3 is set in correspondence with the maximum deformation rate VM. Specifically, a value obtained by multiplying the maximum deformation rate VM by a preset third deformation constant CS3 different from the first and second deformation constants CS1 and CS2 is set as the third reference deformation St3 (St3=VM×CS3). The third deformation constant CS3 is for example a value larger than the first deformation constant CS1 but smaller than the second deformation constant CS2.

ST52: It is determined whether or not the deformation rate VB is within the range of from the first reference rate VT1 to the second reference rate VT2 (VT1≦VB≦VT2), and if YES then processing proceeds to ST53 and if NO then processing proceeds to ST54.

ST53: It is determined whether or not the deformation SB is within the range of from the first reference deformation St1 to the second reference deformation St2, and if YES then processing proceeds to ST56 and if NO then processing proceeds to ST54.

ST54: It is determined whether or not the deformation rate VB is within the range of from the second reference rate VT2 to the third reference rate VT3 (VT2<VB<VT3), and if YES then processing proceeds to ST55 and if NO then processing returns to ST32.

ST55: It is determined whether or not the deformation SB is within the range of from the first reference deformation St1 to the third reference deformation St3 (St1<SB<St3), and if YES then processing proceeds to ST56 and if NO then processing returns to ST32.

ST56: It is inferred that the obstruction S1 which the vehicle 11 has hit is a specified obstruction; an inference signal si (for example and actuator drive command signal si) is produced, and control ends.

The specific construction of the obstruction inference apparatus for a vehicle 40 of this second variation of the second preferred embodiment will now be described, with reference to FIG. 4 and FIG. 21. The obstruction inference apparatus for a vehicle 40 of the second variation of the second preferred embodiment has the following elements (1) through (12).

(1) A bumper face 42 constituting a deformable member (see FIG. 4).

(2) Deformation rate detecting means 151, consisting of a combination of the bumper sensor 43 and the steps ST32 and ST39.

(3) Deformation calculating means 152, consisting of the step ST40.

(4) Inference starting means 153, consisting of the steps ST41 through ST43.

(5) Maximum deformation rate updating means 154, consisting of the steps ST44 and ST45.

(6) First reference rate generating means 155, consisting of the step ST46.

(7) Second reference rate generating means 156, consisting of the step ST47.

(8) Third reference rate generating means 157, for setting as the third reference rate VT3 a value equivalent to a value obtained by multiplying the maximum deformation rate VM by a preset third rate constant CV3 smaller than 1.0 and different from the first and second rate constants CV1 and CV2. The third reference rate generating means 157 consists of the step ST48.

(9) First reference deformation generating means 158, consisting of the step ST49.

(10) Second reference deformation generating means 159, consisting of the step ST50.

(11) Third reference deformation generating means 160, for setting as a third reference deformation St3 a value equivalent to a value obtained by multiplying the maximum deformation rate VM by a preset third deformation constant CS3 different from the first and second deformation constants CS1 and CS2. The third reference rate generating means 160 consists of the step ST51.

(12) Inference signal generating means 161A, for inferring that the obstruction is a specified obstruction S1 when the either of the following conditions [1] and [2] is met. The inference signal generating means 161A consists of a combination of steps ST52 through ST56.

Condition [1]: When the deformation rate VB is within the range of from the first reference rate VT1 to the second reference rate VT2 and the deformation SB is within the range of from the first reference deformation St1 to the second reference deformation St2.

Condition [2]: When the deformation rate VB is within the range of from the second reference rate VT2 to the third reference rate VT3 and the deformation SB is within the range of from the first reference deformation St1 to the third reference deformation St3.

In the steps ST46 through ST51, the values VT1 through VT3 and St1 through St3 can be set by referring to the maps shown in FIGS. 18A, 18B, 19A and 19B in correspondence with the maximum deformation rate VM.

In FIG. 18A, the line VT3 is based on the formula 'third reference rate VT3=VM×CV3'. The map of FIG. 18B also shows a third reference rate VT3 which changes in correspondence with the maximum deformation rate VM.

In FIG. 19A, the line St3 is based on the formula 'third reference deformation St3=VM×CS3'. The map of FIG. 19B also shows a third reference deformation St3 which changes in correspondence with the maximum deformation rate VM.

The third reference rate VT3 and the third reference deformation St3 can be set by providing a map in memory of the control part 44 (see FIG. 4) in advance like this and referring to the map in correspondence with the maximum deformation rate VM in the above-mentioned steps ST48 and ST51. That is, the third reference rate VT3 and the third reference deformation St3 set by referring to a map are values equivalent to values obtained using the formulas of FIG. 18A and FIG. 19A.

Next, an example of inferring the type of an obstruction by applying the control flow chart of the control part 44 of the second variation of the second preferred embodiment shown in FIG. 21 will be described, on the basis of FIG. 22 and FIG. 23.

Figure 22:
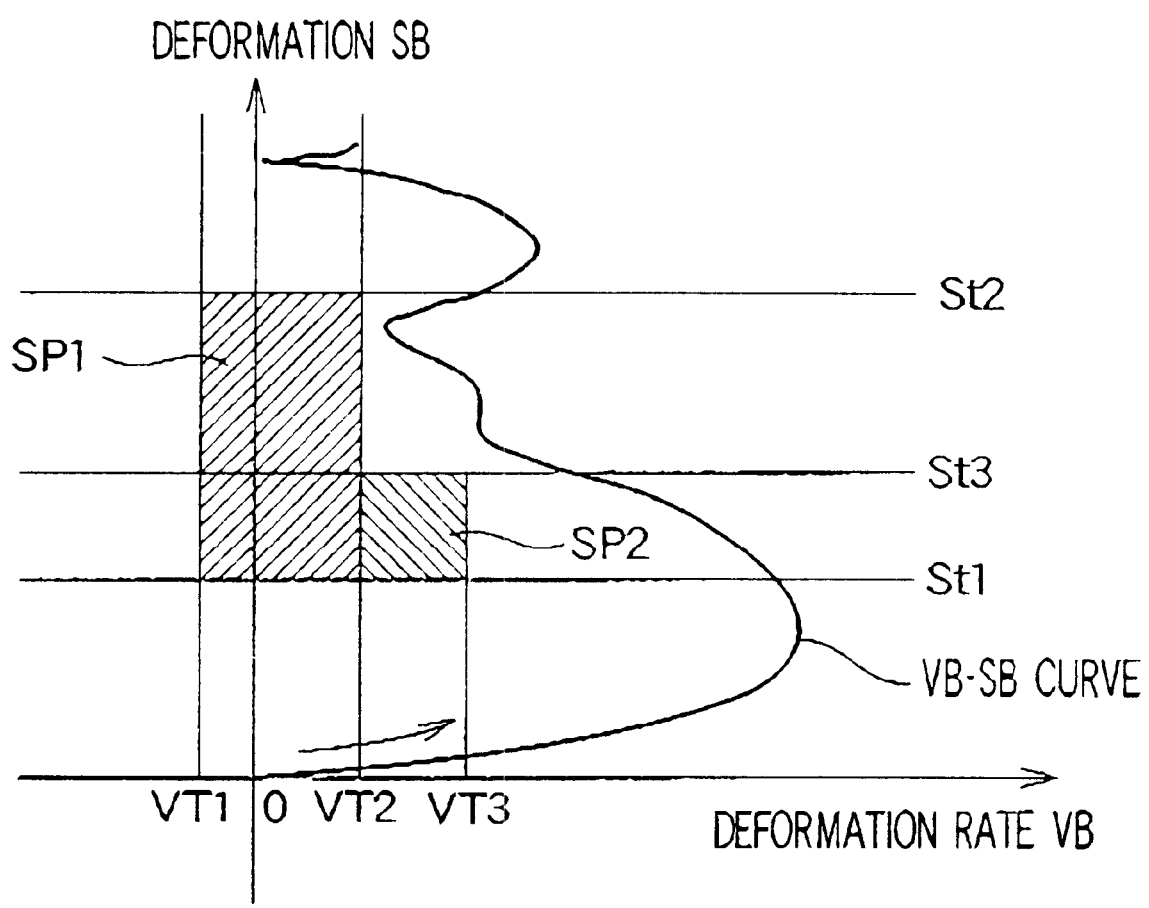
FIG. 22 is a bumper face deformation rate—deformation curve pertaining to the second variation of the second preferred embodiment of the invention.

FIG. 22 shows with deformation rate on the horizontal axis and deformation on the vertical axis a VB-SB curve obtained by plotting against each other the deformation rate VB and the deformation SB for a case wherein the obstruction is a specified obstruction. This FIG. 22 shows a second reference range SP2 set on the graph of FIG. 12. The VB-SB curve itself is also the same curve as that of FIG. 12.

Here, VT3, St3 and SP2 are defined as follows;

VT3: third reference rate of VB (a value obtained by multiplying the maximum deformation rate VM by a preset constant smaller than 1.0. VT1<VT2<VT3)

St3: third reference deformation of SB (St1<St3<St2)

SP2: second reference range (frame of range between second reference rate VT2 and third reference rate VT3 and range between first reference deformation St1 and third reference deformation St3)

When the VB-SB curve has entered the first reference range SP1 or entered the second reference range SP2 it can be inferred that the obstruction is a specified obstruction. For example, when as in this FIG. 22 the obstruction is a specified obstruction, the VB-SB curve enters the second reference range SP2 at the point Pi2. At this time, it can be inferred that the obstruction is a specified obstruction.

Figure 23:
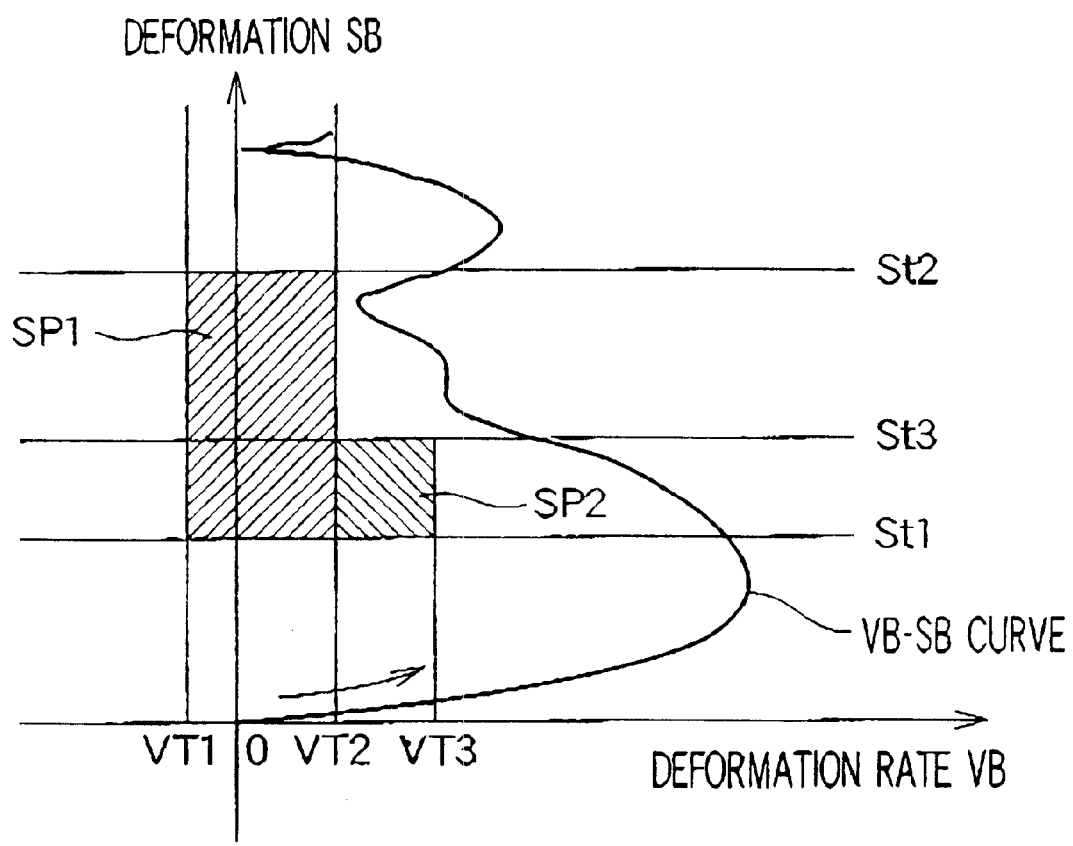
FIG. 23 is a bumper face deformation rate—deformation curve pertaining to the second variation of the second preferred embodiment of the invention.
Figure 24:
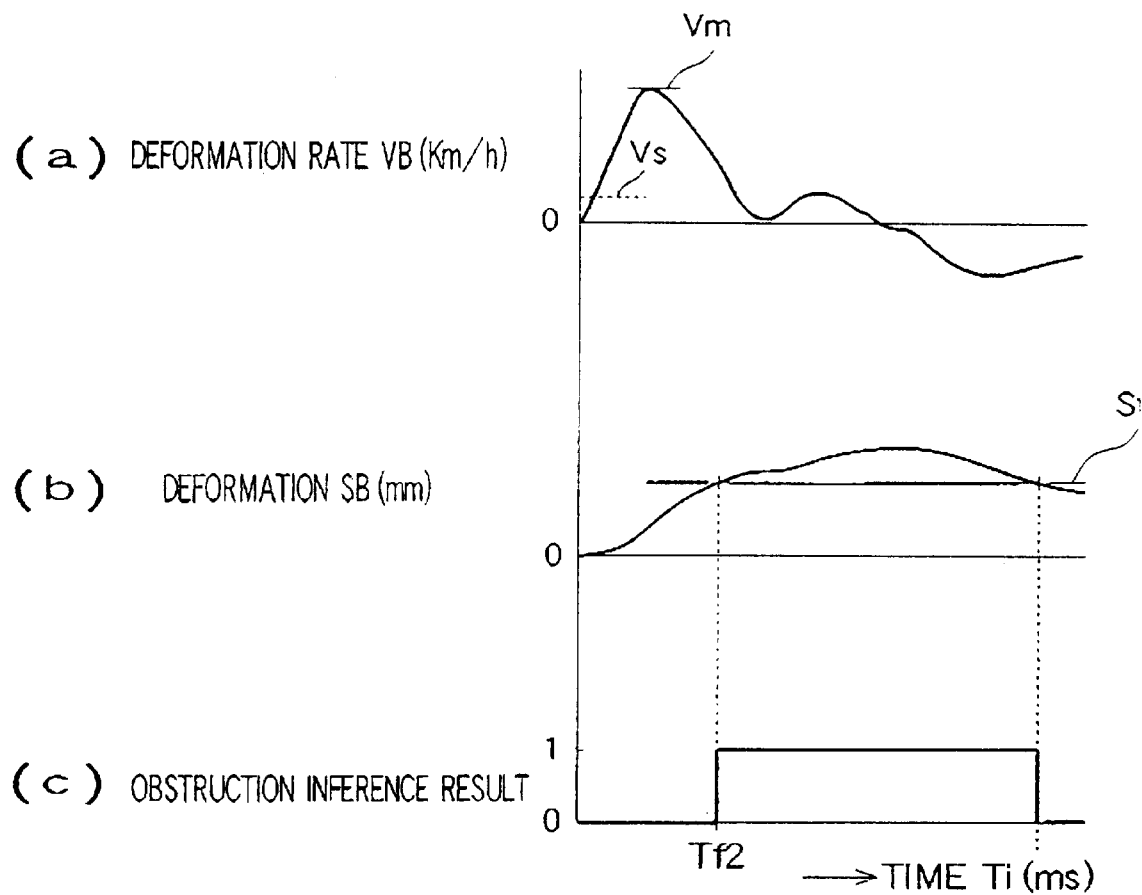
FIGS. 24A through 24C are bumper face deformation rate and deformation graphs pertaining to the second variation of the second preferred embodiment of the invention.
Figure 25:
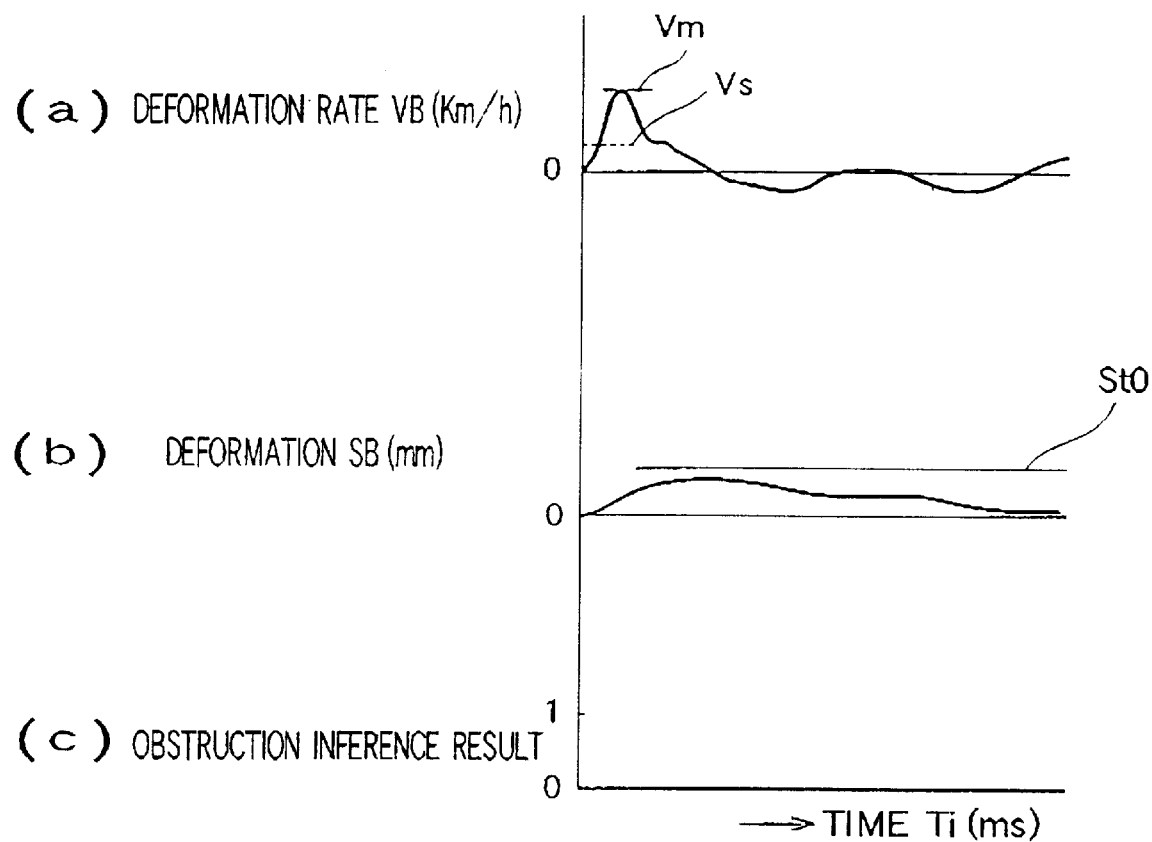
FIGS. 25A through 25C are bumper face deformation rate and deformation graphs pertaining to the second variation of the second preferred embodiment of the invention.

FIG. 23 shows with deformation rate on the horizontal axis and deformation on the vertical axis a VB-SB curve obtained by plotting against each other the deformation rate VB and the deformation SB for a case wherein the obstruction is a low-center-of-gravity obstruction. This FIG. 23 shows a second reference range SP2 set on the graph of FIG. 16. The VB-SB curve itself is also the same curve as that of FIG. 16. The definitions of VT3, St3 and SP2 are the same as the definitions shown above for FIG. 22.

In this FIG. 23, the VB-SB curve does not enter either of the first and second reference ranges SP1, SP2. Accordingly, it can be inferred that the obstruction is not a specified obstruction.

To summarize the foregoing description, an obstruction inference apparatus for a vehicle 40 having the control part 44 of the second variation of the second preferred embodiment has the characteristic that a range different from the first reference range SP1 and based on a combination of first, second and third reference deformations St1, St2 and St3 and within a range based on a combination of first, second and third reference rates VT1, VT2 and VT3 is set as a second reference range SP2 and it is inferred that the obstruction is a specified obstruction when the VB-SB curve, i.e. the deformation rate VB and the deformation SB, enters either the first reference range SP1 or the second reference range SP2.

Accordingly, because the range for inferring the type of an obstruction can be set more precisely, the type of an obstruction can be inferred more exactly.

An obstruction inference apparatus for a vehicle 40 of a third preferred embodiment will now be described, on the basis of FIG. 24A through FIG. 34.

FIGS. 24A through 24C are bumper face deformation rate and deformation graphs (1) pertaining to a third preferred embodiment and showing a case in which the obstruction is a specified obstruction such as a pedestrian.

FIG. 24A shows change of the deformation rate VB of a bumper face having hit a specified obstruction, with time Ti (ms) on the horizontal axis and the deformation rate VB (km/h) of the bumper face on the vertical axis. VS and VM are defined as follows:

VS: inference start reference rate of VB (a value of almost immediately after impact, e.g. a value slightly above zero) VM: maximum deformation rate value of VB From FIG. 24A it can be seen that the deformation rate VB has the characteristic that it rises through the inference start reference rate VS and reaches a maximum deformation rate VM and then decreases again.

FIG. 24B shows change of the deformation of the bumper face having hit the specified obstruction, with time Ti (ms) on the horizontal axis and the deformation SB (mm) of the bumper face on the vertical axis. The deformation of the bumper face is a value calculated on the basis of the deformation rate VB of FIG. 24A. St0 is defined as follows:

St0: reference deformation of SB (St0=1.0×VM)

Here, the 1.0 is a constant for when the units of the deformation rate VB are km/h and the units of the deformation SB are mm.

From FIG. 24B it can be seen that the deformation SB has the characteristic that it rises through the reference deformation St0 and then decreases and falls to below the reference deformation St0 again.

FIG. 24C shows the result of determining whether or not the deformation SB has risen above the reference deformation St0. When the deformation SB has risen above the reference deformation St0, the inference result becomes the determination '1' and it is inferred that the obstruction is a specified obstruction. According to FIG. 24C, it can be inferred that the obstruction is a specified obstruction at the time Tf2.

FIGS. 25A through 25C are bumper face deformation rate and deformation graphs (2) pertaining to the third preferred embodiment and showing a case wherein the obstruction is a light object. The graphs are to be viewed in the same way as FIGS. 24A through 24C and the reference numerals have the same definitions.

FIG. 25A shows change of the deformation rate VB of the bumper face having hit the light object, with time Ti (ms) on the horizontal axis and the deformation rate VB (km/h) of the bumper face on the vertical axis.

FIG. 25B shows change of the deformation of the bumper face having hit the light object, with time Ti (ms) on the horizontal axis and the deformation SB (mm) of the bumper face on the vertical axis. From FIG. 25B it can be seen that the deformation SB does not reach the reference deformation St0. This is because the deformation time is short because the deformation rate VB becomes zero in a short time after starting to decrease from the maximum deformation rate VM.

FIG. 25C shows an obstruction inference result based on whether or not the deformation SB has risen above the reference deformation St0. Because the deformation SB does not rise above the reference deformation St0, the obstruction inference result is '0' and it is inferred that the obstruction is not a specified obstruction.

Figure 26:
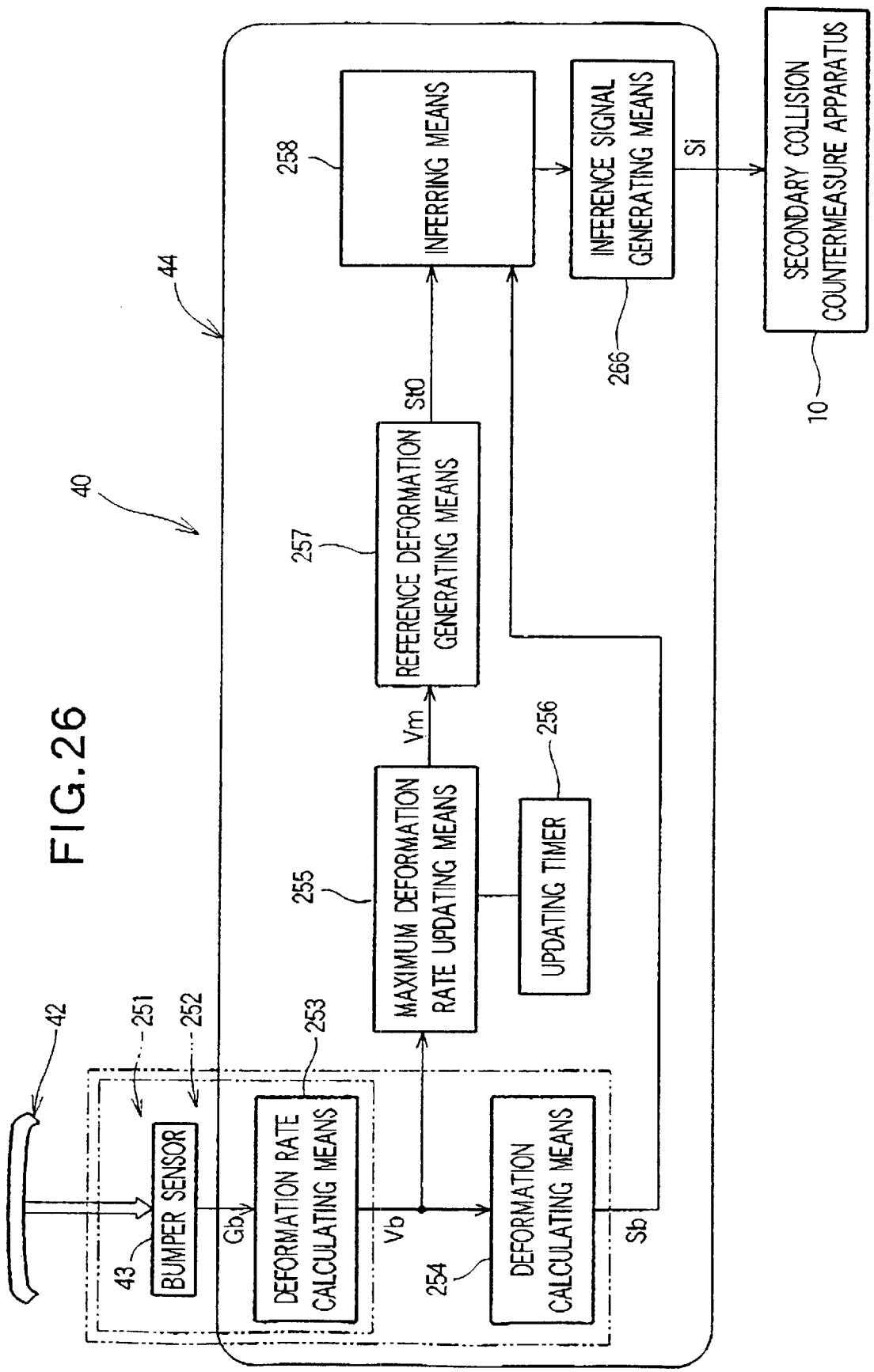
FIG. 26 is a block diagram of an obstruction inference apparatus for a vehicle constituting a third preferred embodiment of the invention.

FIG. 26 is a block diagram of an obstruction inference apparatus for a vehicle according to this third preferred embodiment.

The obstruction inference apparatus for a vehicle 40 of this third preferred embodiment has the following elements (1) through (7):

(1) A bumper face 42, serving as a deformable member of the invention.

(2) Deformation rate detecting means 25, for detecting the deformation rate VB of the bumper face 42.

(3) Deformation detecting means 252, for detecting the deformation SB of the bumper face 42.

(4) Maximum deformation rate updating means 255, for comparing the deformation rate VB with a previous maximum deformation rate value detected earlier and setting the larger of the two as the maximum deformation rate VM.

(5) Reference deformation generating means 257, for setting as the reference deformation St0 a value equivalent to a value obtained by the multiplying maximum deformation rate VM by a preset deformation constant.

(6) Inferring means 258, for inferring that the obstruction is a specified obstruction (for example a pedestrian) when the deformation SB has risen above the reference deformation St0.

(7) Inference signal generating means 266, for outputting an inference signal si to the secondary collision countermeasure apparatus 10 on the basis of an inference of the inferring means 258.

The deformation rate detecting means 251 consists of a combination of the bumper sensor 43 and the deformation rate calculating means 253. The deformation detecting means 252 consists of a combination of the deformation rate detecting means 251 and the deformation calculating means 254. The maximum deformation rate updating means 255 has an updating timer 256 for deciding a predetermined updating time for updating the maximum deformation rate VM. The control part 44 of the third preferred embodiment has the above-mentioned means 253 through 258 and inference signal generating means 266.

Figure 27:
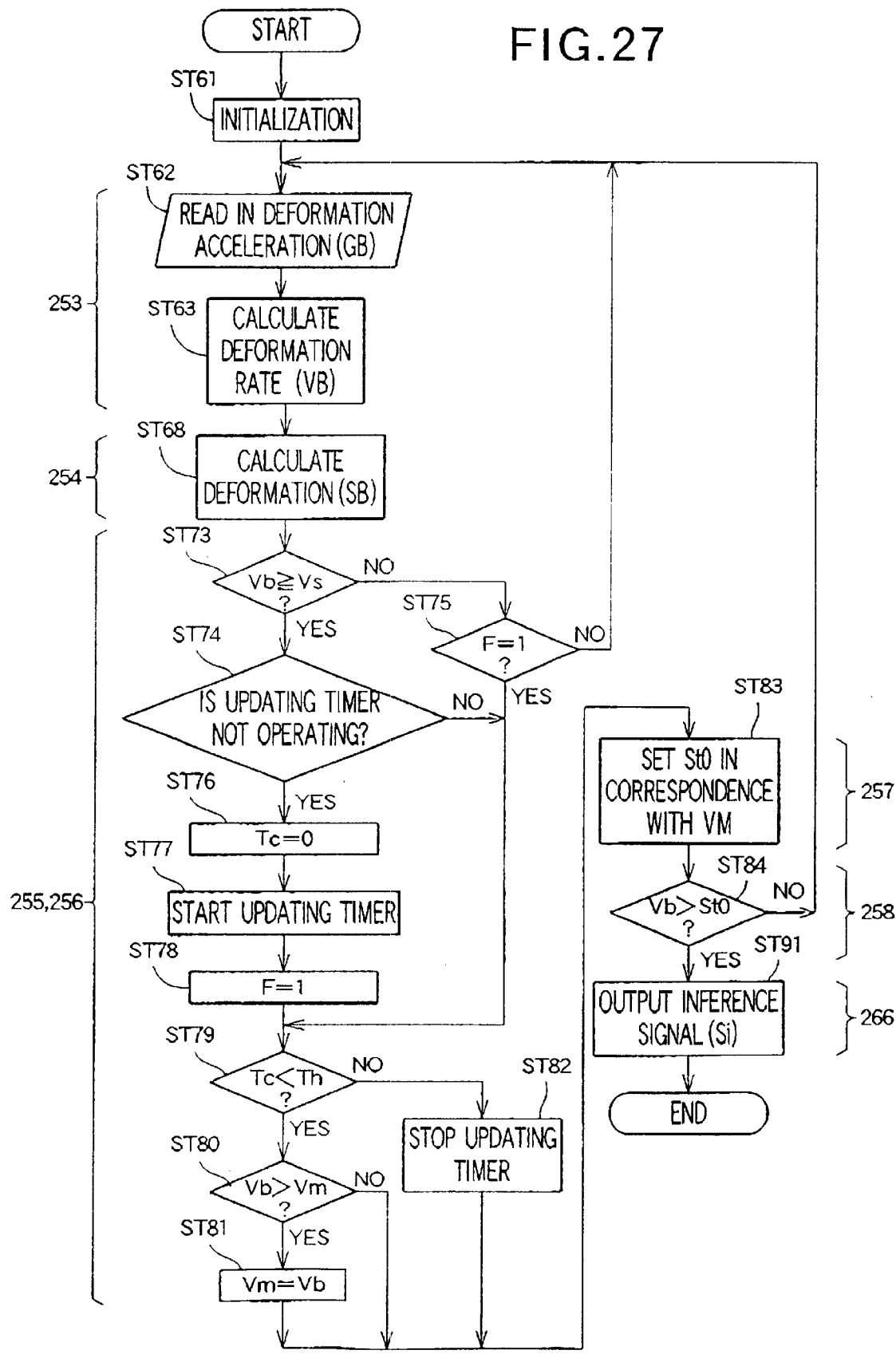
FIG. 27 is a control flow chart of a control part of the third preferred embodiment of the invention.

Next, with reference to FIG. 26, the control flow of the control part 44 of the third preferred embodiment will be described, on the basis of FIG. 27.

ST61: All values are initialized (for example, the maximum deformation rate VM is set to 0 and F is set to 0).

ST62: The deformation acceleration GB of the bumper face 42 (the acceleration GB at which it deforms) detected by the bumper sensor 43 is read in.

ST63: The deformation rate VB of the bumper face 42 is calculated from the deformation acceleration GB. For example, the deformation rate VB is obtained by integrating the deformation acceleration GB.

ST68: The deformation SB of the bumper face 42 is calculated from the deformation rate VB. For example, the deformation SB is obtained by integrating the deformation rate VB.

ST73: It is determined whether or not the deformation rate VB has reached a preset small inference start reference rate VS, and if YES then processing proceeds ST74 and if NO then processing proceeds to ST75.

ST74: It is determined whether or not the updating timer 256 is non-operating, and if YES then processing proceeds ST76 and if NO then processing proceeds to ST79.

ST75: It is determined whether or not the flag F=1, and if YES then processing proceeds to ST79 and if NO then processing returns to ST62.

ST76: The elapsed time TC of the updating timer 256 is reset.

ST77: The updating timer 256 is started.

ST78: The flag F is set to '1'.

ST79: It is determined whether or not the elapsed time TC from the starting of the updating timer 256 has not reached a predetermined reference time TH, and if YES then processing proceeds to ST80 and if NO then processing proceeds to ST82.

ST80: It is determined whether or not the deformation rate VB is larger than a previous maximum deformation rate VM detected earlier, and if YES then processing proceeds to ST81 and if NO then processing proceeds to ST83.

ST81: The deformation rate VB is set as the maximum deformation rate VM and processing proceeds to ST83.

ST82: The updating timer 256 is stopped and processing proceeds to ST83.

ST83: A reference deformation St0 is set in correspondence with the maximum deformation rate VM. Specifically, a value obtained by multiplying the maximum deformation rate VM by a preset deformation constant CS is set as the reference deformation St0 (St0=VM×CS). When the units of the deformation rate VB are km/h and the units of the deformation are mm, the deformation constant CS is for example set to 1.0.

ST84: It is determined whether or not the deformation SB has risen above the reference deformation St0, and if YES then processing proceeds to ST91 and if NO then processing returns to ST62.

ST91: It is inferred that the obstruction S1 which the vehicle 11 shown in FIG. 4 has hit is a specified obstruction; an inference signal si (for example an actuator drive command signal si) is produced, and control ends.

With this combination of ST73, ST75 and ST78, inferring of the type of the obstruction S1 (see FIG. 4) is started when the deformation rate VB first reaches the inference start reference rate VS. When the deformation rate VB once reaches the inference start reference rate VS, inferring of the type of the obstruction S1 can be continued irrespective of the size of the deformation rate VB thereafter.

With this combination of ST73 through ST82, in the time between the deformation rate VB reaching the inference start reference rate VS and the reference time TH being reached, by the maximum deformation rate VM being updated to the largest value as the deformation rate VB increases, it is possible to set a maximum deformation rate VM which corresponds with the type of the obstruction S1.

The reference time TH is a time set to remove any setting of the maximum deformation rate VM based on a noisy deformation acceleration GB caused by vibration during travel or an excessive deformation acceleration GB which affects the proper control of the control part 44, and is for example 500 ms.

Here, the relationships between the constituent elements of the obstruction inference apparatus for a vehicle 40 shown in FIG. 26 and the steps of the control part 44 shown in FIG. 27 will be explained.

ST62 and ST63 correspond to the deformation rate calculating means 253. ST68 corresponds to the deformation calculating means 254. The combination of ST73 through ST82 corresponds to the maximum deformation rate updating means 255 and the updating timer 256. ST83 corresponds to the reference deformation generating means 257. ST84 corresponds to the inferring means 258. ST91 corresponds to the inference signal generating means 266.

Figures 28A, 28B:
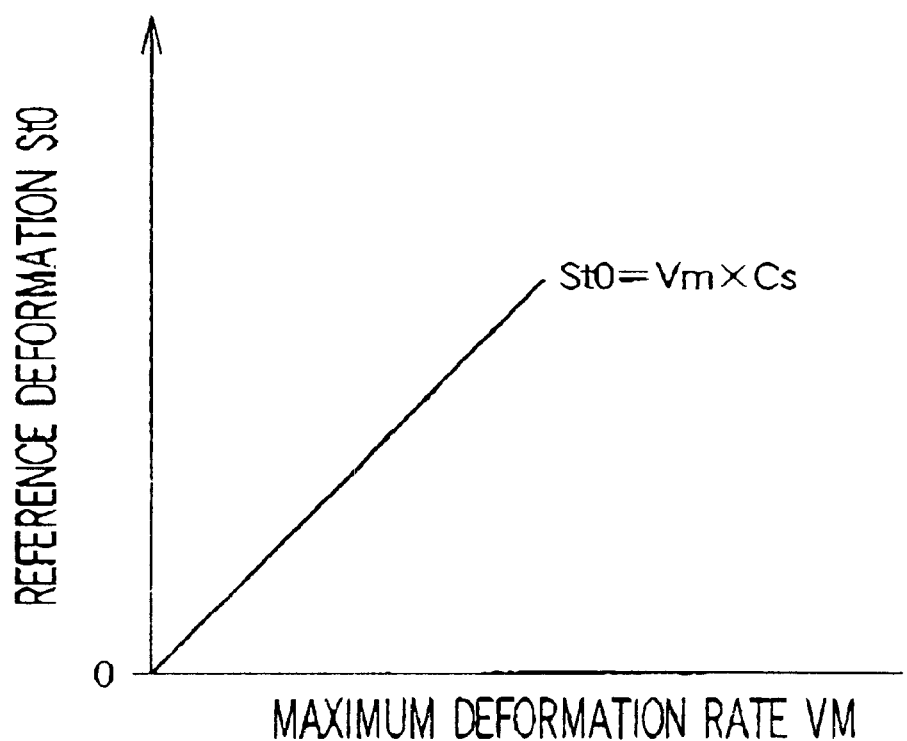
FIGS. 28A and 28B are views illustrating the setting of a reference deformation of a control part of the third preferred embodiment of the invention.

In ST83, St0 can alternatively be set by referring to a map shown in FIG. 28A or FIG. 28B in correspondence with the maximum deformation rate VM.

FIG. 28A is a maximum deformation rate VM—reference deformation St0 correspondence map with the maximum deformation rate VM on the horizontal axis and a reference deformation St0 on the vertical axis, and shows a reference deformation St0 which changes in correspondence with the maximum deformation rate VM. The line St0 is based on the formula 'reference deformation St0=VM×CS'.

FIG. 28B is a map in the form of a table prepared on the basis of FIG. 28A, and again shows a reference deformation St0 which changes in correspondence with the maximum deformation rate VM.

The reference deformation St0 can be set by providing a map in memory of the control part 44 (see FIG. 26) in advance like this and referring to the map in correspondence with the maximum deformation rate VM in the above-mentioned step ST83. The reference deformation St0 set by referring to a map is a value equivalent to a value obtained using the formula of FIG. 28A.

The foregoing description will now be summarized.

When the vehicle hits an obstruction S1, the bumper face 42 deforms toward the rear of the vehicle under the force of the impact. As shown in FIGS. 24A and 24B, the deformation rate VB of the bumper face 42 increases from zero at the collision start time, and in correspondence with this the deformation SB of the bumper face 42 also starts to increase. As the deformation SB increases, the reaction of the bumper face 42 also increases. When the reaction of the bumper face 42 to the impact force becomes large, the deformation rate VB reaches a peak and starts to decrease and eventually returns to zero and then assumes a negative value. The deformation SB increases until the deformation rate VB becomes zero, and then decreases as the deformation rate VB assumes a negative value.

As is clear from FIGS. 24A through 24C and FIGS. 25A through 25C, generally, the lighter the obstruction is the shorter is the time taken for the deformation rate VB to return to zero after reaching a peak, from the collision start time. And the lighter the obstruction is, because the shorter is the time taken for the deformation rate VB to reach zero, the shorter the deformation time is also. As a result, the ratio of the maximum value of the deformation SB to the maximum value VM of the deformation rate VB, compared to the case of a specified obstruction such as a pedestrian, is smaller with a lighter obstruction.

The obstruction inference apparatus for a vehicle 40 of the third preferred embodiment shown in FIG. 26 utilizes this characteristic: it detects the deformation rate VB and the deformation SB of the bumper face 42 when the vehicle has hit an obstruction S1; obtains the maximum deformation rate VM, of when the deformation rate VB reaches its peak; sets a reference deformation St0 on the basis of this maximum deformation rate VM; and when the deformation SB rises above the reference deformation St0, infers that the obstruction S1 which has been hit is a specified obstruction. Accordingly, a light object is not erroneously inferred to be a specified obstruction. And thus the type of the obstruction S1 can be inferred more exactly.

And, because a value equivalent to a value obtained by multiplying the maximum deformation rate VM, which differs according to the type of the obstruction S1, by a predetermined constant is set as the reference deformation St0, the type of the obstruction S1 can be inferred still more exactly, irrespective of the impact speed at which the obstruction S1 is hit.

Next, a variation of this third preferred embodiment of an obstruction inference apparatus for a vehicle according to the invention will be described, on the basis of FIG. 29 through FIG. 34.

Figure 29:
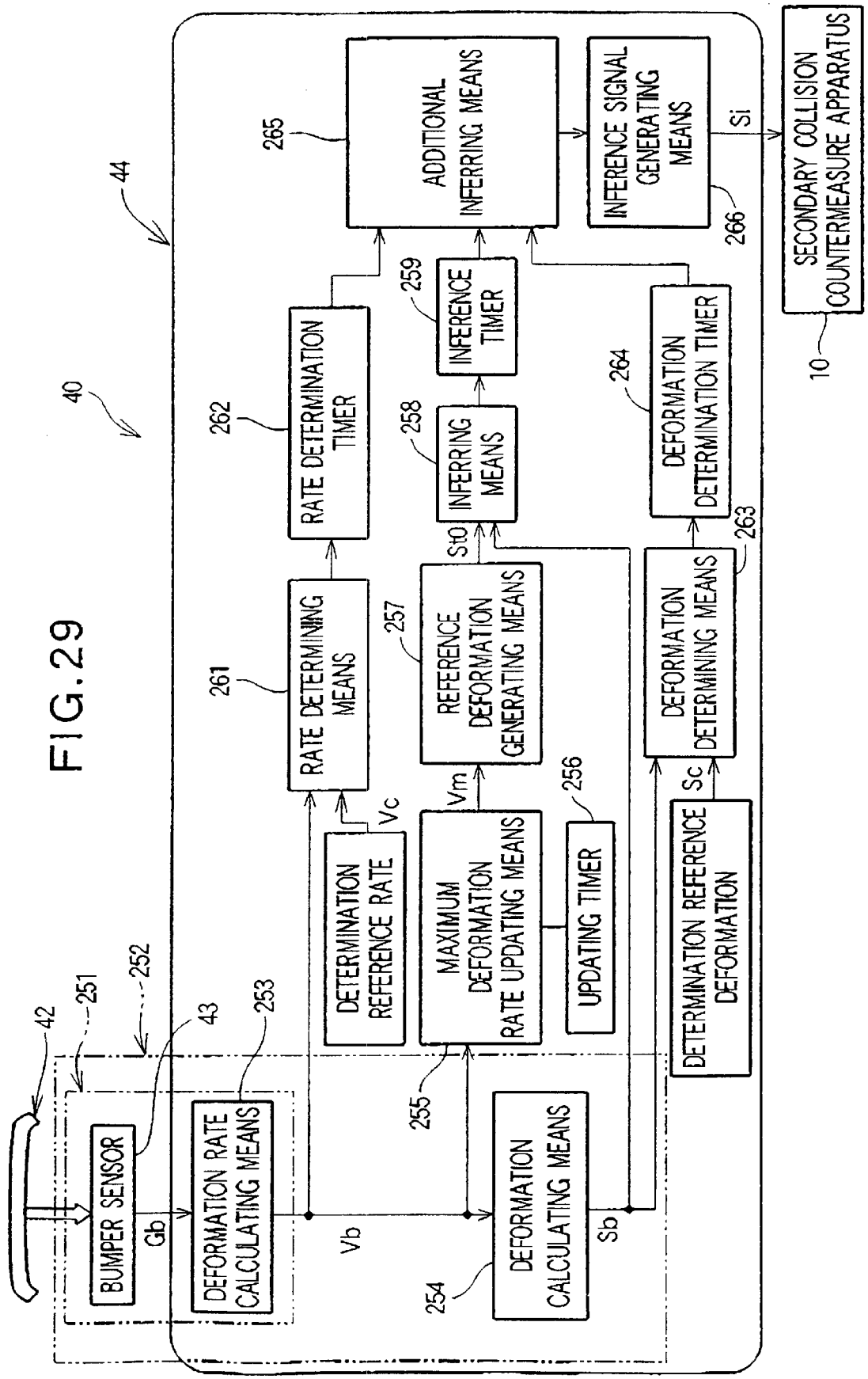
FIG. 29 is a block diagram of an obstruction inference apparatus for a vehicle of a variation of the third preferred embodiment of the invention.
Figure 30:
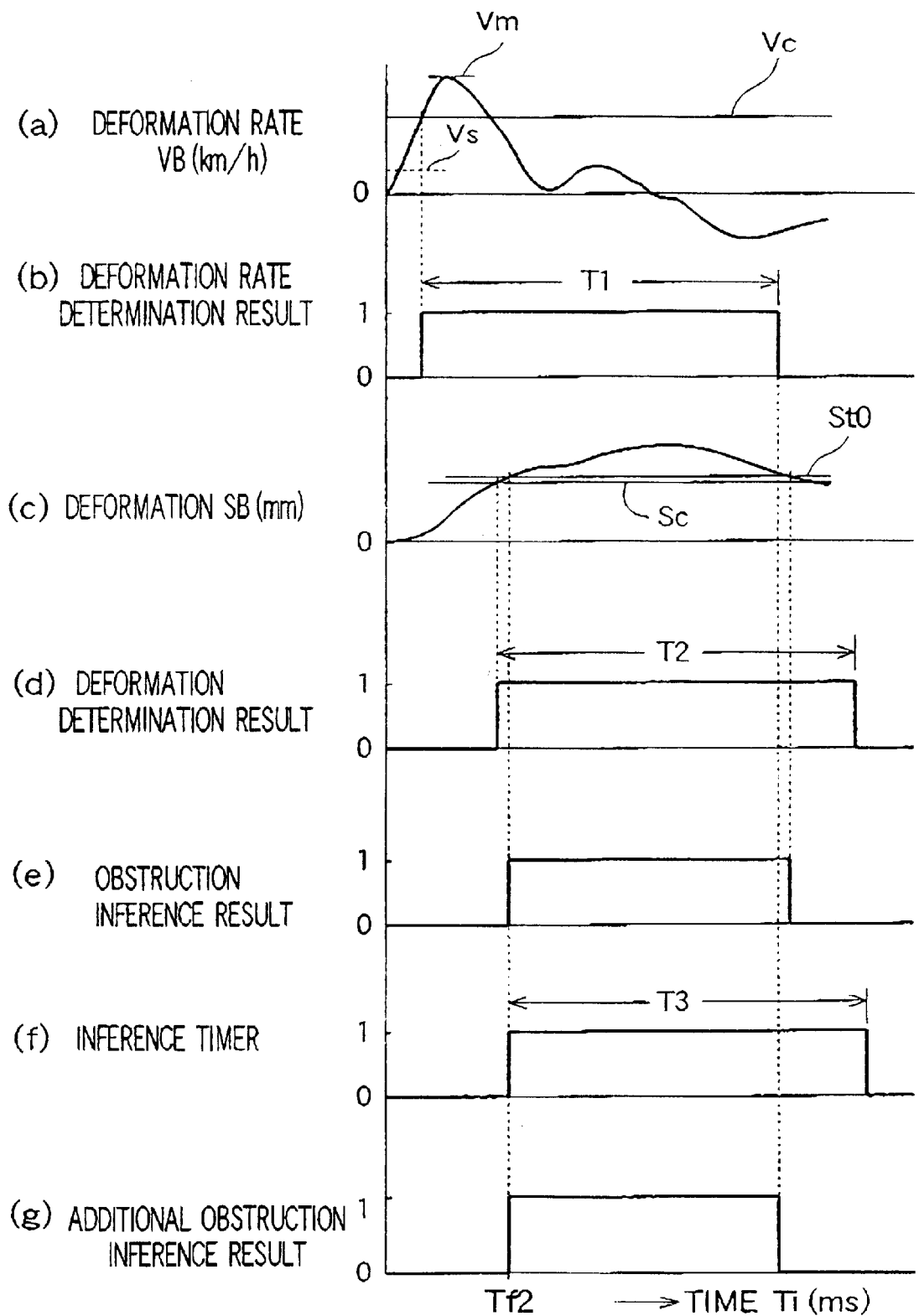
FIGS. 30A through 30G are bumper face deformation rate and deformation graphs pertaining to the variation of the third preferred embodiment of the invention.
Figure 31:
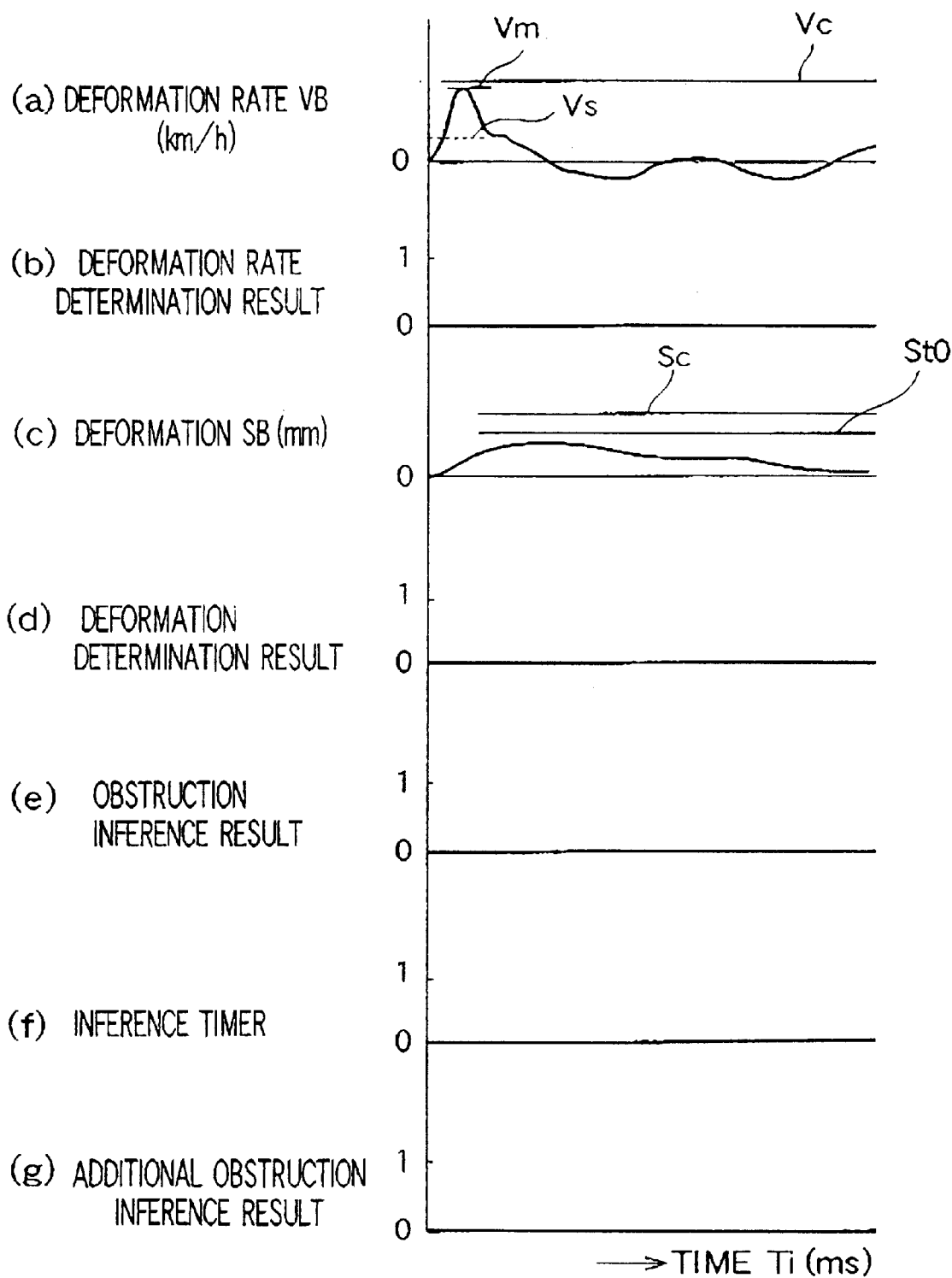
FIGS. 31A through 31G are bumper face deformation rate and deformation graphs pertaining to the variation of the third preferred embodiment of the invention.

FIG. 29 is a block diagram of an obstruction inference apparatus for a vehicle pertaining to a variation of the third preferred embodiment. The obstruction inference apparatus for a vehicle 40 of this variation of the third preferred embodiment has the construction of the obstruction inference apparatus for a vehicle of the third preferred embodiment shown in FIG. 26 with the following elements (1) through (6) added.

(1) An inference timer 259, for holding an inference signal from the inferring means 258 for a preset time only.
(2) Deformation rate determining means 261 (hereinafter simply 'rate determining means 261') for determining that the deformation rate VB has risen above a preset determination reference rate VC.
(3) A rate determination timer 262, for holding a determination signal from the rate determining means 261 for a preset time only.
(4) Deformation determining means 263, for determining that the deformation SB has risen above a preset determination reference deformation SC different from the reference deformation St0.
(5) A deformation determination timer 264, for holding a determination signal from the deformation determining means 263 for a preset time only.
(6) Additional inferring means 265, for additionally inferring that the obstruction S1 is a specified obstruction (for example a pedestrian) when the signals from the inference timer 259, the rate determination timer 262 and the deformation determination timer 264 have all been received.

As is clear from the foregoing explanation, in the obstruction inference apparatus for a vehicle 40 of this variation of the third preferred embodiment, determination/inference signals from means 258, 261 and 263 are held for a fixed time by timers 259, 262 and 264. That is, the signals of the timers 259, 262 and 264 are mustered for a fixed time. This makes it possible for the additional inference of the additional inferring means 265 to be carried out more certainly.

When the additional inference of the additional inferring means 265 can be carried out certainly even if the determination/inference signals from the means 258, 261 and 263 are transmitted to the additional inferring means 265 directly, the timers 259, 262 and 264 are unnecessary.

The inference signal generating means 266 of this variation of the third preferred embodiment produces an inference signal si on the basis of the additional inference of the additional inferring means 265. The control part 44 of this variation of the third preferred embodiment has the above-mentioned means 253 through 259 and 261 through 265.

FIGS. 30A through 30G are bumper face deformation rate and deformation graphs (1) of the obstruction inference apparatus for a vehicle of this variation of the third preferred embodiment, and show a case wherein the obstruction is a specified obstruction such as a pedestrian. The graphs are to be viewed in the same way as FIGS. 24A through 24C and the reference numerals have the same definitions. Reference will be made to FIG. 29 in the following explanation.

FIG. 30A shows change of the deformation rate VB of the bumper face having hit a specified obstruction. It can be seen that the deformation rate VB rises through the determination reference rate VC in the course of increasing to its maximum deformation rate VM. The determination reference rate VC is for example set with the case in which the obstruction is a specified obstruction as a reference.

FIG. 30B shows the operation of the rate determination timer 262. From when the deformation rate VB rises above the determination reference rate VC, the rate determination timer 262 holds the determination result '1' for an elapsed time T1 (that is, a time equivalent to a reference time Ts1 which will be further discussed later).

FIG. 30C shows change of the deformation of the bumper face having hit the specified obstruction. It can be seen that the deformation SB rises above the reference deformation St0 in the course of increasing. The determination reference deformation SC, for example with the case in which the obstruction is a specified obstruction as a reference, is in the relationship SC<St0.

FIG. 30D shows the operation of the deformation determination timer 264. From when the deformation SB rises above the determination reference deformation SC, the deformation determination timer 264 holds the determination result '1' for an elapsed time T2 (that is, a time equivalent to a reference time Ts2 which will be further discussed later).

FIG. 30E shows the obstruction inference result. When the deformation SB has risen above the reference deformation St0 the obstruction inference result is '1' and it is inferred that the obstruction is a specified obstruction.

FIG. 30F shows the operation of the inference timer 259. From when in FIG. 30E the obstruction inference result becomes '1', the inference timer 259 holds the determination result '1' for an elapsed time T3 (that is, a time equivalent to a reference time Ts3 which will be further discussed later).

FIG. 30G shows the additional obstruction inference result of the additional inferring means 265. When the held contents of the rate determination timer 262, the deformation determination timer 264 and the inference timer 259 are all '1', the additional obstruction inference result becomes '1' and it is additionally inferred that the obstruction is a specified obstruction. According to FIG. 30G it can be inferred at the time Tf2 that the obstruction is a specified obstruction.

FIGS. 31A through 31G are bumper face deformation rate and deformation graphs (2) of the obstruction inference apparatus for a vehicle of this variation of the third preferred embodiment showing a case in which the obstruction is a light object. The graphs are to be viewed in the same way as FIGS. 30A through 30G and the reference numerals have the same definitions. Reference will be made to FIG. 29 in the following explanation.

FIG. 31A shows change of the deformation rate VB of the bumper face having hit a light object. It can be seen that the deformation rate VB does not rise above the determination reference rate VC.

FIG. 31B shows the operation of the rate determination timer 262. Because the deformation rate VB does not rise above the determination reference rate VC, the determination result is '0'.

FIG. 31C shows change of the deformation of the bumper face having hit the light object. It can be seen that the deformation SB does not rise above the reference deformation St0. This is because since the deformation rate VB returns to zero in a short time, the deformation time is short.

FIG. 31D shows the operation of the deformation determination timer 264. Because the deformation SB does not rise above the determination reference deformation SC, the determination result is '0'.

FIG. 31E shows the obstruction inference result. Because the deformation SB does not rise above the reference deformation St0, the obstruction inference result is '0' and it is inferred that the obstruction is not a specified obstruction.

FIG. 31F shows the operation of the inference timer 259. Because in FIG. 31E the obstruction inference result is '0', the inference timer 259 holds the obstruction inference result '0'.

FIG. 31G shows the additional obstruction inference result of the additional inferring means 265. Because the held contents of the rate determination timer 262, the deformation determination timer 264 and the inference timer 259 are all '0', the additional obstruction inference result is '0' and it is additionally inferred that the obstruction is not a specified obstruction.

Next, still with reference to FIG. 29, the control flow of the control part 44 of this variation of the third preferred embodiment will be described, on the basis of FIG. 32 through FIG. 34.

Figure 32:
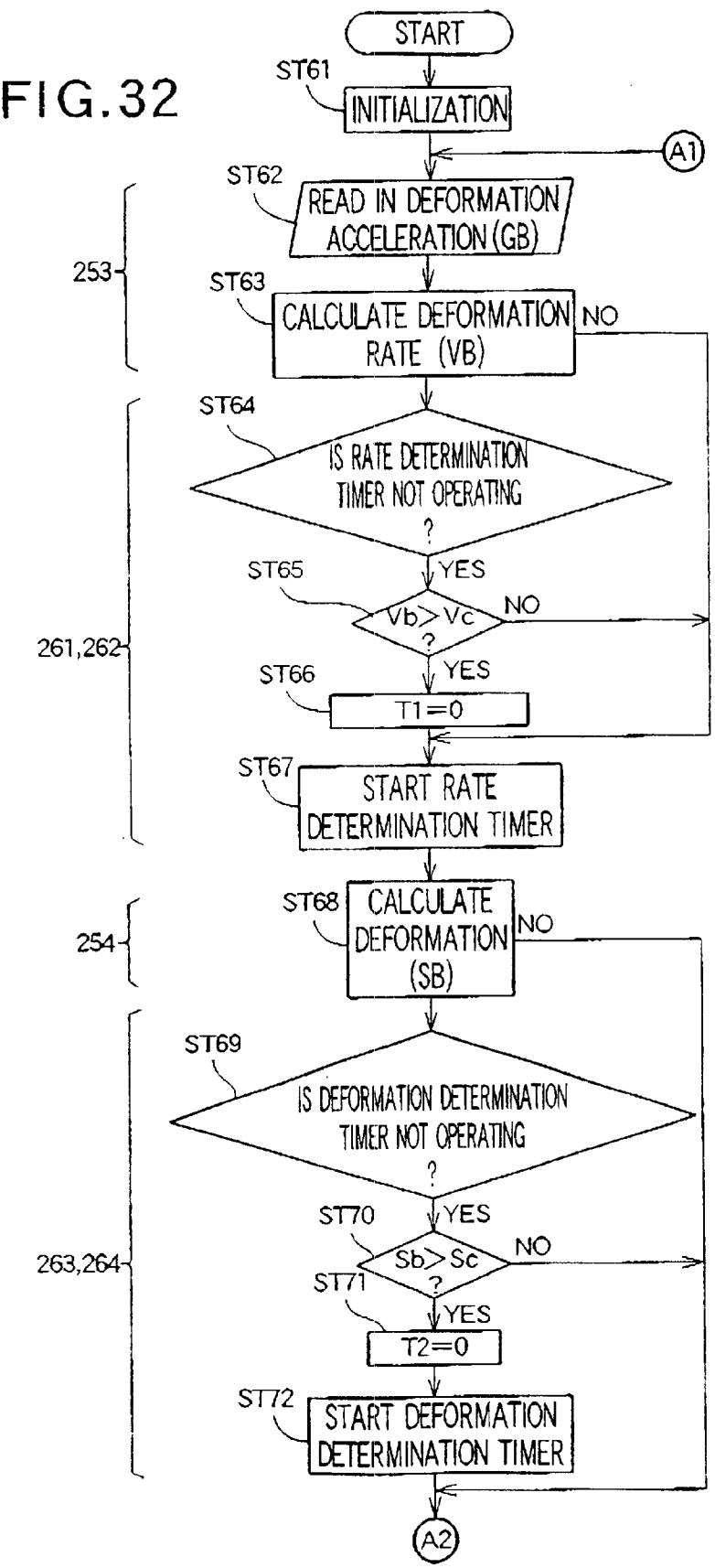
FIG. 32 is a control flow chart of a control part of the variation of the third preferred embodiment of the invention.

FIG. 32 is a control flow chart (1) of the control part of this variation of the third preferred embodiment.

ST61 through ST63: Respectively the same as the ST61 through ST63 shown in FIG. 27.

ST64: It is determined whether or not the rate determination timer 262 is non-operating, and if YES then processing proceeds to ST65 and if NO then processing proceeds to ST68.

ST65: It is determined whether or not the deformation rate VB has risen above the determination reference rate VC, and if YES then processing proceeds to ST66 and if NO then processing proceeds to ST68.

ST66: The elapsed time T1 of the rate determination timer 262 is reset.

ST67: The rate determination timer 262 is started.

ST68: The deformation SB is calculated. The same as ST68 of FIG. 27.

ST69: It is determined whether or not the deformation determination timer 264 is non-operating, and if YES then processing proceeds to ST70 and if NO then processing proceeds to the out-connector A2.

ST70: It is determined whether or not the deformation SB has risen above the determination reference deformation SC, and if YES then processing proceeds to ST71 and if NO then processing proceeds to the out-connector A2.

ST71: The elapsed time T2 of the deformation determination timer 264 is reset.

ST72: The deformation determination timer 264 is started and processing proceeds to the out-connector A2.

Figure 33:
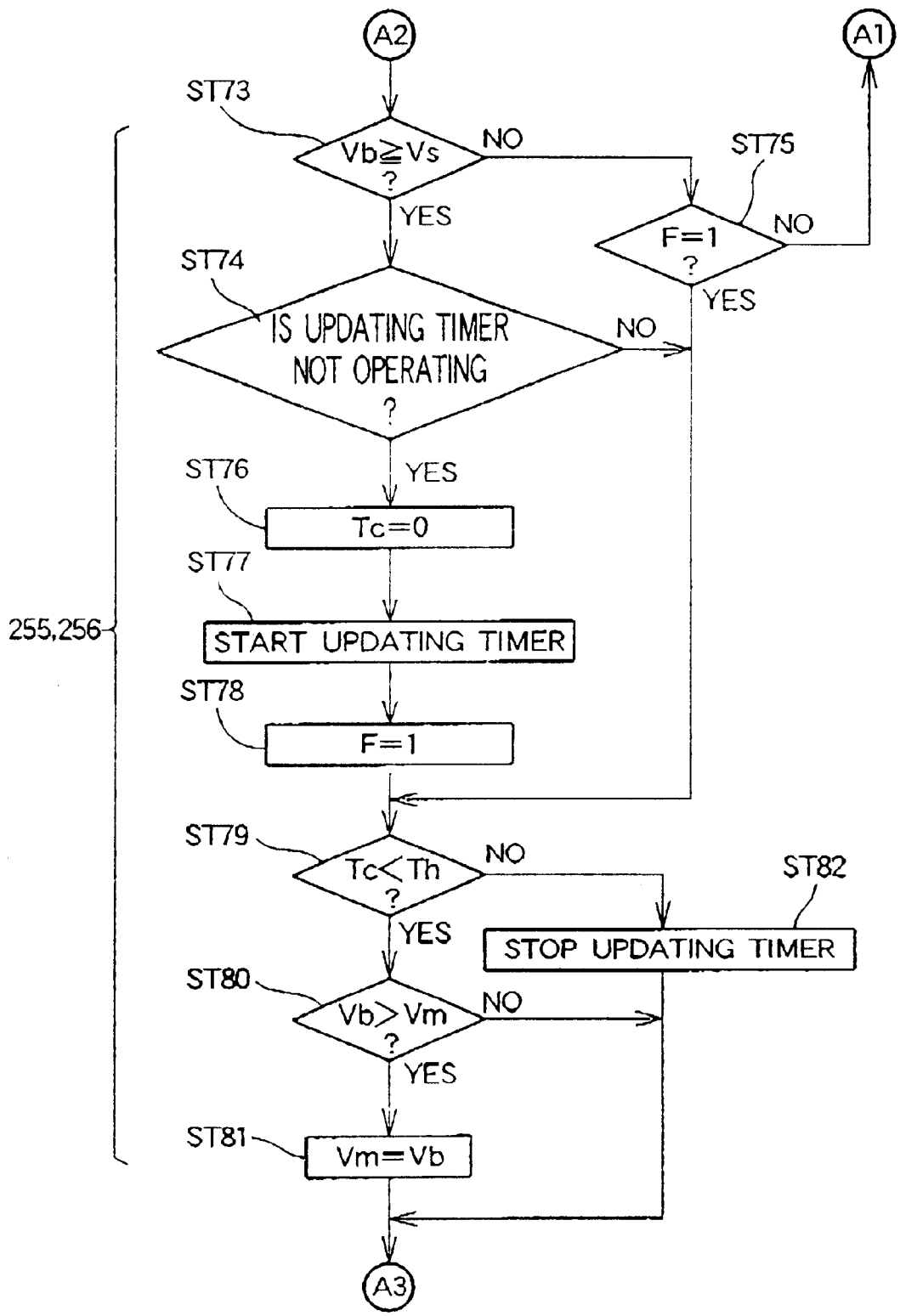
FIG. 33 is a control flow chart of a control part of the variation of the third preferred embodiment of the invention.

FIG. 33 is a control flow chart (2) of the control part of this variation of the third preferred embodiment and shows processing having proceeded from ST72 of FIG. 32 through the out-connector A2 and the in-connector A2 of this figure to a step ST73.

ST73 through ST82: Respectively the same as the steps ST73 through ST82 shown in FIG. 27.

If the determination of ST75 is NO, processing returns through the out-connector A1 and the in-connector A1 of FIG. 32 to ST62. From ST81 processing proceeds to the out-connector A3.

Figure 34:
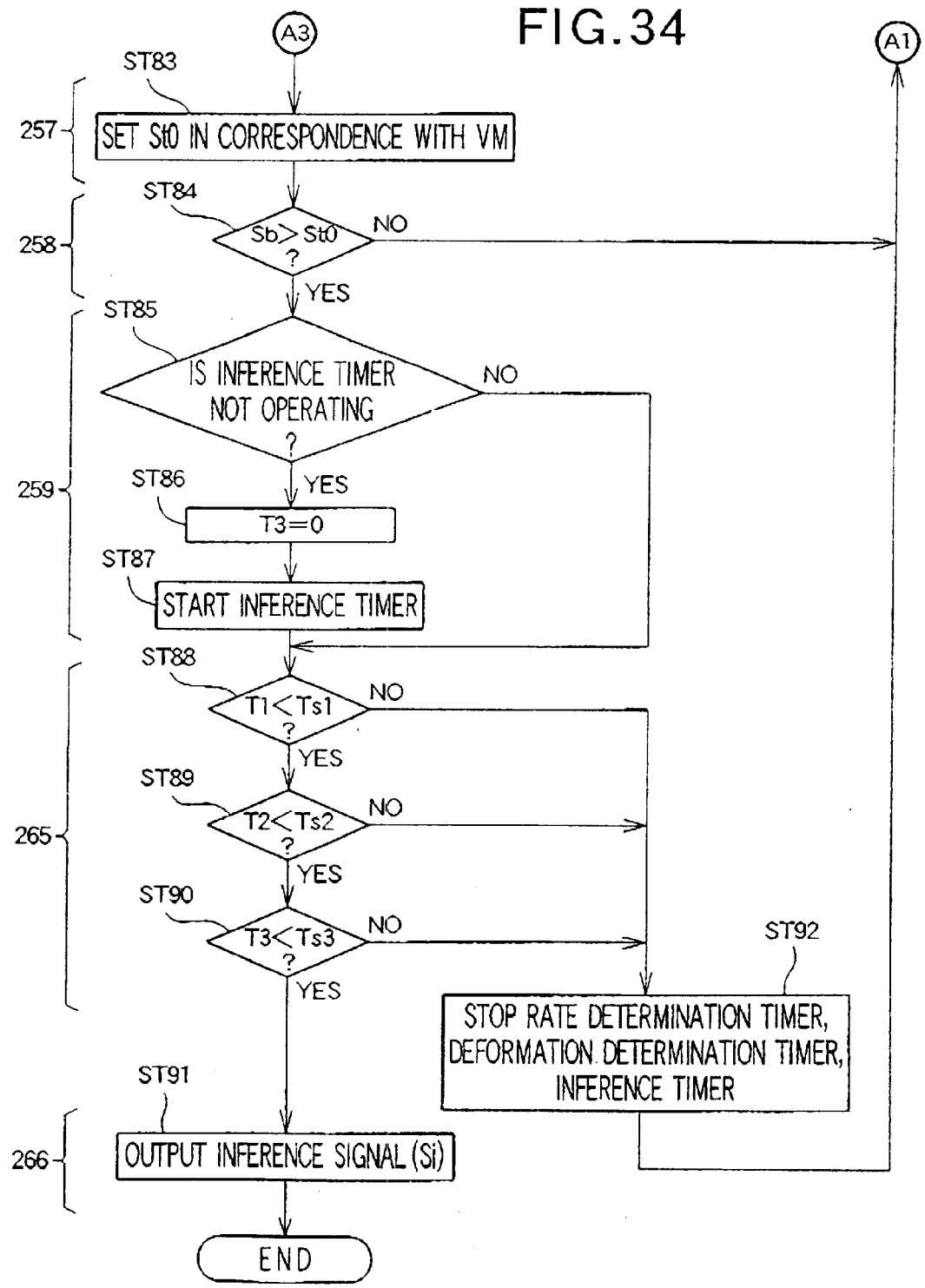
FIG. 34 is a control flow chart of a control part of the variation of the third preferred embodiment of the invention.

FIG. 34 is a control flow chart (3) of the control part of this variation of the third preferred embodiment and shows processing having proceeded from ST81 of FIG. 33 through the out-connector A3 and the in-connector A3 of this figure to a step ST83.

ST83: The reference deformation St0 is set. The same as ST83 in FIG. 27.

ST84: It is determined whether or not the deformation SB has risen above the reference deformation St0, and if YES then processing proceeds to ST85 and if NO then processing returns through the out-connector A1 and the in-connector A1 of FIG. 32 to ST62.

ST85: It is determined whether or not the inference timer 259 is non-operating, and if YES then processing proceeds to ST86 and if NO then processing proceeds to ST88.

ST86: The elapsed time T3 of the inference timer 259 is reset.

ST87: The inference timer 259 is started.

ST88: It is determined whether or not the elapsed time T1 from when the rate determination timer 262 started has not reached a predetermined reference time Ts1, and if YES then processing proceeds to ST89 and if NO then processing proceeds to ST92.

ST89: It is determined whether or not the elapsed time T2 from when the deformation determination timer 264 started has not reached a predetermined reference time Ts2, and if YES then processing proceeds to ST90 and if NO then processing proceeds to ST92.

ST90: It is determined whether or not the elapsed time T3 from when the inference timer 259 started has reached a predetermined reference time Ts3, and if YES then processing proceeds to ST91 and if NO then processing proceeds to ST92.

ST91: It is inferred that the obstruction S1 is a specified obstruction; an inference signal si is produced, and control ends. The same as ST91 in FIG. 27.

ST92: The rate determination timer 262, the deformation determination timer 264 and the inference timer 259 are stopped and processing returns via the out-connector A1 and the in-connector A1 of FIG. 32 to ST62.

Here, the relationships between the constituent elements of the obstruction inference apparatus for a vehicle 40 shown in FIG. 29 and the steps of the control part 44 shown in FIGS. 32 through 34 will be explained.

ST65 corresponds to the rate determining means 261. The combination of ST64, ST66 and ST67 corresponds to the rate determination timer 262. ST70 corresponds to the deformation determining means 263. The combination of ST69, ST71 and ST72 corresponds to the deformation determination timer 264. The combination of ST85 through ST87 corresponds to the inference timer 259. The combination of ST88 through ST90 corresponds to the additional inferring means 265.

To summarize the foregoing description, the obstruction inference apparatus for a vehicle 40 of the variation of the third preferred embodiment has (1) the rate determining means 261 and the rate determination timer 262, and also has (2) the deformation determining means 263 and the deformation determination timer 264.

As is clear also from FIGS. 30A through 31G, generally, the deformation rate VB and the deformation SB of the bumper face 42 have the characteristic that they become larger the heavier the obstruction is that is hit. For example, when a specified obstruction such as a pedestrian is hit, compared to a case where a lighter object than this is hit, the deformation rate VB and the deformation SB are larger.

To utilize this characteristic, this variation of the third preferred embodiment has the rate determining means 261 and the deformation determining means 263. The values of the determination reference rate VC and the determination reference deformation SC should be set to optimal values which make it possible to distinguish between a case of hitting a specified obstruction such as a pedestrian and a case of hitting a lighter obstruction than this.

Because the type of the obstruction S1 is additionally inferred by the additional inferring means 265 on the basis of the inference result of the inferring means 258 and the determination result of the rate determining means 261, compared to the third preferred embodiment itself it is possible to infer the type of an obstruction more exactly.

And also because the type of the obstruction S1 is further additionally inferred by the additional inferring means 265 on the basis of the inference result of the inferring means 258 and the determination result of the deformation determining means 263, compared to the third preferred embodiment itself it is possible to infer the type of an obstruction more exactly.

And also because the type of the obstruction S1 is further additionally inferred by the additional inferring means 265 on the basis of the inference result of the inferring means 258, the determination result of the rate determining means 261 and the determination result of the deformation determining means 263, compared to the third preferred embodiment itself it is possible to infer the type of an obstruction still more exactly.

Next, a fourth preferred embodiment of an obstruction inference apparatus for a vehicle according to the invention will be described, on the basis of FIG. 35 through FIG. 43B.

The obstruction inference apparatus for a vehicle 40 of this fourth preferred embodiment has the following elements (1) through (11):

(1) A bumper face 42 constituting a deformable member.

(2) Deformation rate detecting means 251 (the same as the deformation rate detecting means 251 of the third preferred embodiment shown in FIG. 26).

(3) Deformation detecting means 252 (the same as the deformation detecting means 252 of the third preferred embodiment shown in FIG. 26).

(4) Maximum deformation rate updating means 255 (the same as the maximum deformation rate updating means 255 of the third preferred embodiment shown in FIG. 26; equipped with an updating timer 256).

(5) Reference rate generating means 271, for setting as a reference rate Vt0 a value equivalent to a value obtained by multiplying the maximum deformation rate VM by a preset rate constant smaller than 1.0.

(6) First reference deformation generating means 272, for setting as a first reference deformation St11 a value equivalent to a value obtained by multiplying the maximum deformation rate VM by a preset first deformation constant.

(7) Second reference deformation generating means 273, for setting as a second reference deformation St12 a value equivalent to a value obtained by multiplying the maximum deformation rate VM by a preset second deformation constant larger than the first deformation constant.

(8) Acceleration determining means 274, for determining that the deformation acceleration GB detected by the bumper sensor 43 has risen above a preset reference acceleration GT.

(9) An acceleration determination timer 275, for holding a determination signal from the acceleration determining means 274 for a preset elapsed time Td.

(10) Inferring means 276, for inferring that an obstruction is a specified obstruction (for example a pedestrian) when within the elapsed time Td of the acceleration determination timer 275, i.e. within a preset inference time Td from when the vehicle hits the obstruction S1 (see FIG. 4), the deformation rate VB is smaller than the reference rate Vt0 and the deformation SB is within the range of from the first reference deformation St11 to the second reference deformation St12.

(11) Inference signal generating means 279, for producing an inference signal si on the basis of an inference of the inferring means 276.

The combination of the bumper sensor 43 and the acceleration determining means 274 and the acceleration determination timer 275 constitutes collision determining means for outputting a collision determination signal meaning 'the vehicle has hit something' over a preset inference time Td from the time when the vehicle hits the obstruction S1 (see FIG. 4). The control part 44 of the fourth preferred embodiment has the above-mentioned means 253 through 256, 271 through 276, and 279.

Figure 35:
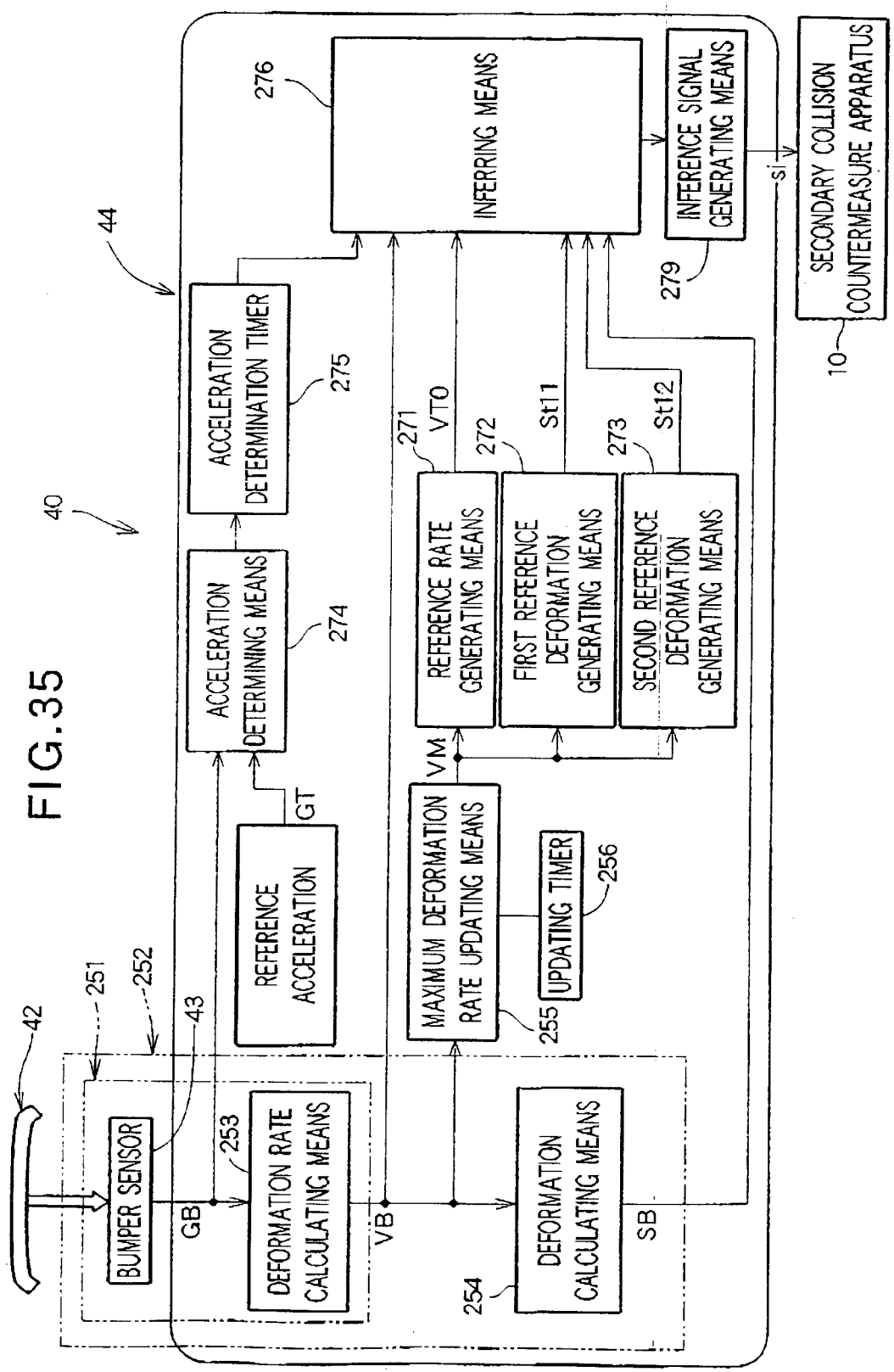
FIG. 35 is a block diagram of an obstruction inference apparatus for a vehicle constituting a fourth preferred embodiment of the invention.
Figure 36:
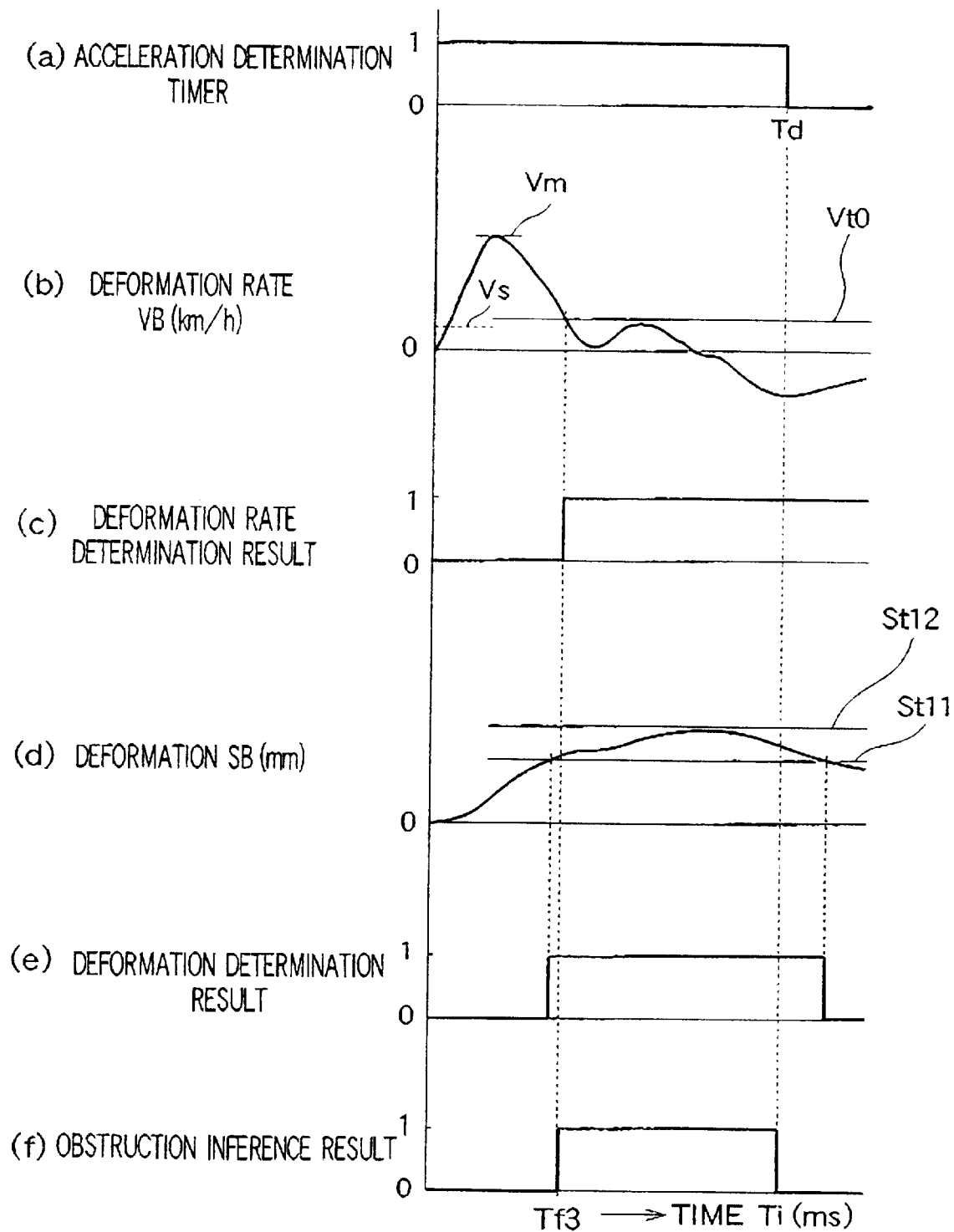
FIGS. 36A through 36F are bumper face deformation rate and deformation graphs pertaining to the fourth preferred embodiment of the invention.
Figure 37:
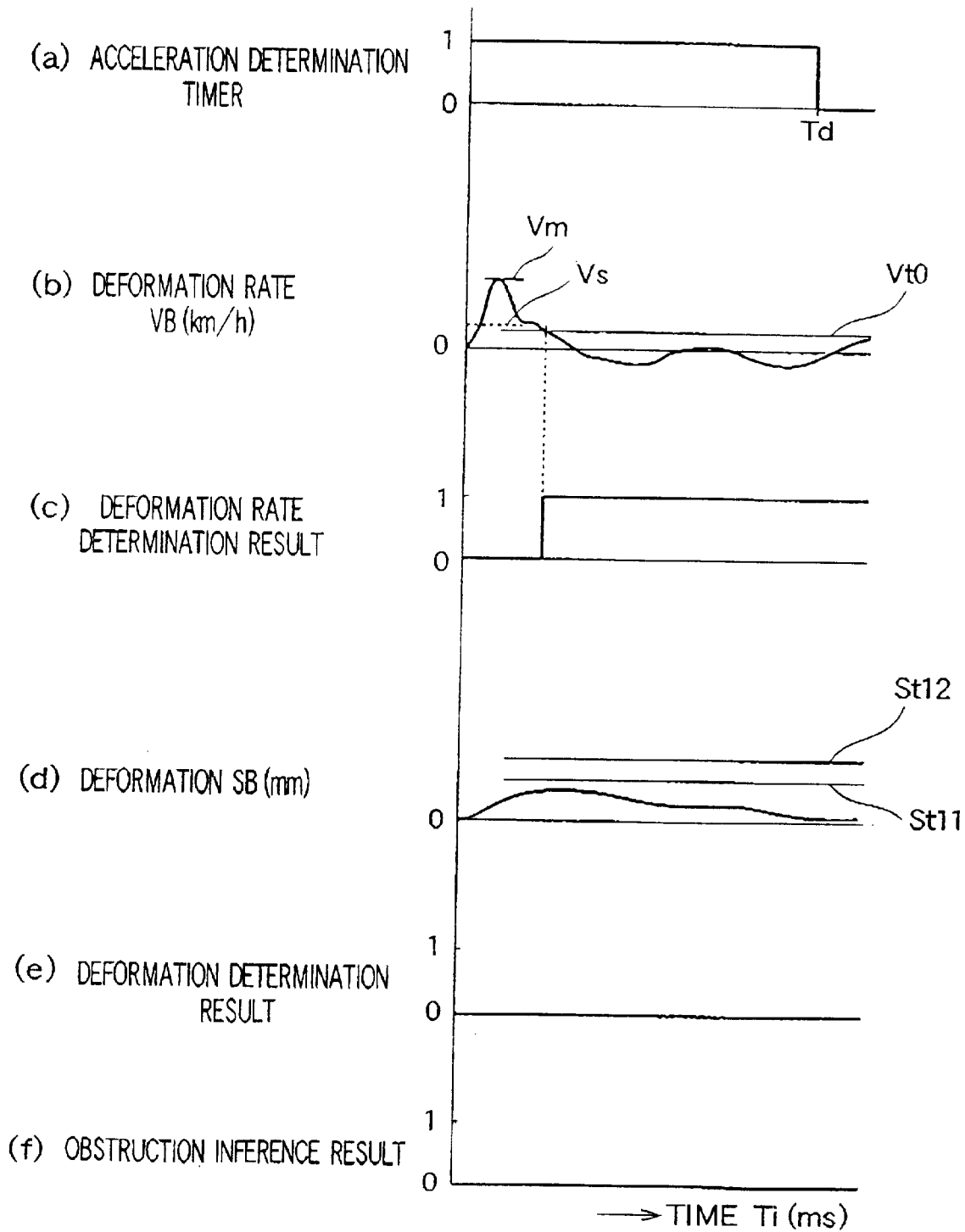
FIGS. 37A through 37f are bumper face deformation rate and deformation graphs pertaining to the fourth preferred embodiment.
Figure 38:
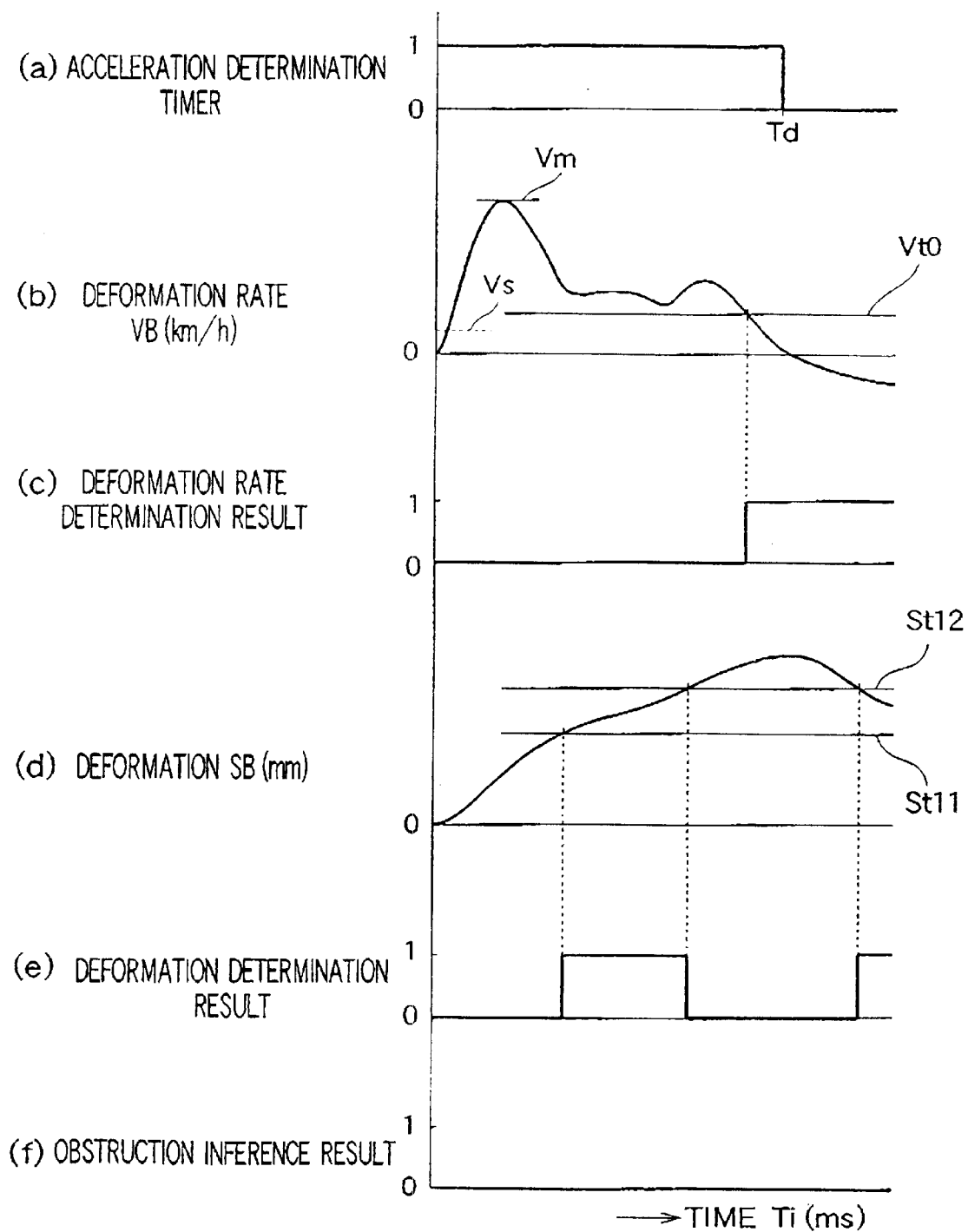
FIGS. 38A through 38F are bumper face deformation rate and deformation graphs pertaining to the fourth preferred embodiment of the invention.

FIGS. 36A through 36F are bumper face deformation rate and deformation graphs (1) pertaining to the obstruction inference apparatus for a vehicle of this fourth preferred embodiment and showing a case where the obstruction is a specified obstruction such as a pedestrian. Reference will also be made to FIG. 35 in the following description.

FIG. 36A shows the operation of the acceleration determination timer 275, with time Ti (ms) on the horizontal axis. The acceleration determination timer 275 holds the determination result '1' for a predetermined elapsed time Td (a time corresponding to the reference time Ti) from when the deformation acceleration GB rises above a preset reference acceleration GT.

FIG. 36B shows change of the deformation rate VB of the bumper face having hit the specified obstruction, with time Ti (ms) on the horizontal axis and the deformation rate VB (km/h) of the bumper face on the vertical axis. VS, VM and Vt0 here are defined as follows:

VS:inference start reference rate of VB (a value of almost immediately after impact, e.g. a value slightly above zero)

VM:maximum deformation rate value of VB

Vt0: reference rate of VB (Vt0=0.3×VM)

The 0.3 here is a rate constant.

From FIG. 36B it can be seen that the deformation rate VB has the characteristic that after rising through the inference start reference rate VS and increasing to a maximum deformation rate VM it decreases back to below the reference rate Vt0.

FIG. 36C shows the result of determining whether or not the deformation rate VB is smaller than the reference rate Vt0. The determination result is '1' only when the deformation rate VB is smaller than the reference rate Vt0.

FIG. 36D shows change of the deformation of the bumper face having hit the specified obstruction, with time Ti (ms) on the horizontal axis and the deformation SB (mm) of the bumper face on the vertical axis. The deformation of the bumper face is a value calculated on the basis of the deformation rate VB of FIG. 36B. St11 and St12 are defined as follows:

St11   first reference deformation of SB (St11 = 1.0 × VM)
St12   second reference deformation of SB (St12 = 1.5 × VM)

The 1.0 and 1.5 here are deformation constants for when the units of the deformation rate VB are km/h and the units of the deformation SB are mm.

From FIG. 36D it can be seen that the deformation SB has the characteristic that after rising through the first reference deformation St11 it starts to decrease before it reaches the second reference deformation St12 and then falls below the first reference deformation St11 again.

FIG. 36E shows the result of determining whether or not the deformation SB is within the range of from the first reference deformation St11 to the second reference deformation St12. The determination result is '1' only when the deformation SB is in the range between St11 and St12.

FIG. 36F shows an obstruction inference result based on the logical product of the determination result of FIG. 36A, the determination result of FIG. 36C and the determination result of FIG. 36E. When the determination results of FIG. 36A, FIG. 36C and FIG. 36E are all '1', the obstruction inference result is the determination '1'. According to FIG. 36F, it can be inferred at the time Tf3 that the obstruction is a specified obstruction.

FIGS. 37A through 37F are bumper face deformation rate and deformation graphs (2) pertaining to the obstruction inference apparatus for a vehicle of this fourth preferred embodiment and showing a case where the obstruction is a light object. The graphs are to be viewed in the same way as FIGS. 36A through 36F and the reference numerals have the same definitions. Reference will be made to FIG. 35 in the following explanation.

FIG. 37A shows the operation of the acceleration determination timer 275.

FIG. 37B shows change of the deformation rate VB of the bumper face having hit the light object.

FIG. 37C shows a deformation rate determination result. The determination result is '1' only when the deformation rate VB is smaller than the reference rate Vt0.

FIG. 37D shows change of the deformation of the bumper face having hit the light object. It can be seen that the deformation SB does not reach the first reference deformation St11. This is because since the deformation rate VB returns to zero from the maximum deformation rate VM in a short time, the deformation time is short.

FIG. 37E shows a deformation determination result. Because the deformation SB is not within the range of from the first reference deformation St11 to the second reference deformation St12, the determination result is '0'.

FIG. 37F shows an obstruction inference result based on the logical product of the determination results of FIG. 37A, FIG. 37C and FIG. 37E. Because the determination result of FIG. 37E is '0', the obstruction inference result is '0', and it is inferred that the obstruction is not a specified obstruction.

FIGS. 38A through 38F are bumper face deformation rate and deformation graphs (3) pertaining to the obstruction inference apparatus for a vehicle of this fourth preferred embodiment and showing a case where the obstruction is a low-center-of-gravity obstruction S2 of the kind shown in FIG. 5. The graphs are to be viewed in the same way as FIGS. 36A through 36F, and the reference numerals have the same definitions. Reference will be made to FIG. 35 in the following explanation.

FIG. 38A shows the operation of the acceleration determination timer 275.

FIG. 38B shows change of the deformation rate VB of the bumper face having hit the low-center-of-gravity obstruction.

FIG. 38C shows a deformation rate determination result. When the deformation rate VB is smaller than the reference rate Vt0, the determination result is '1'.

FIG. 38D shows change of the deformation of the bumper face having hit the low-center-of-gravity obstruction. It can be seen that the deformation SB increases to above the first and second reference deformations St11, St12. This is because the deformation time is long because the time taken for the deformation rate VB to decrease to zero from the maximum deformation rate VM is relatively long. In this case, when the deformation SB is within the range of from St11 to St12, the deformation rate VB in FIG. 38B is above the reference rate Vt0.

FIG. 38E shows a deformation determination result. The determination result is '1' only when the deformation SB is within the range of from St11 to St12.

FIG. 38F shows an obstruction inference result based on the logical product of the determination results of FIG. 38A, FIG. 38C and FIG. 38E. There is no time when the determination results of FIG. 38A, FIG. 38C and FIG. 38E are all '1'. Consequently, the obstruction inference result is '0' and it is inferred that the obstruction is not a specified obstruction.

Next, with reference to FIG. 35, the control flow of the control part 44 of this fourth preferred embodiment will be described, on the basis of FIG. 39 through FIG. 41.

Figure 39:
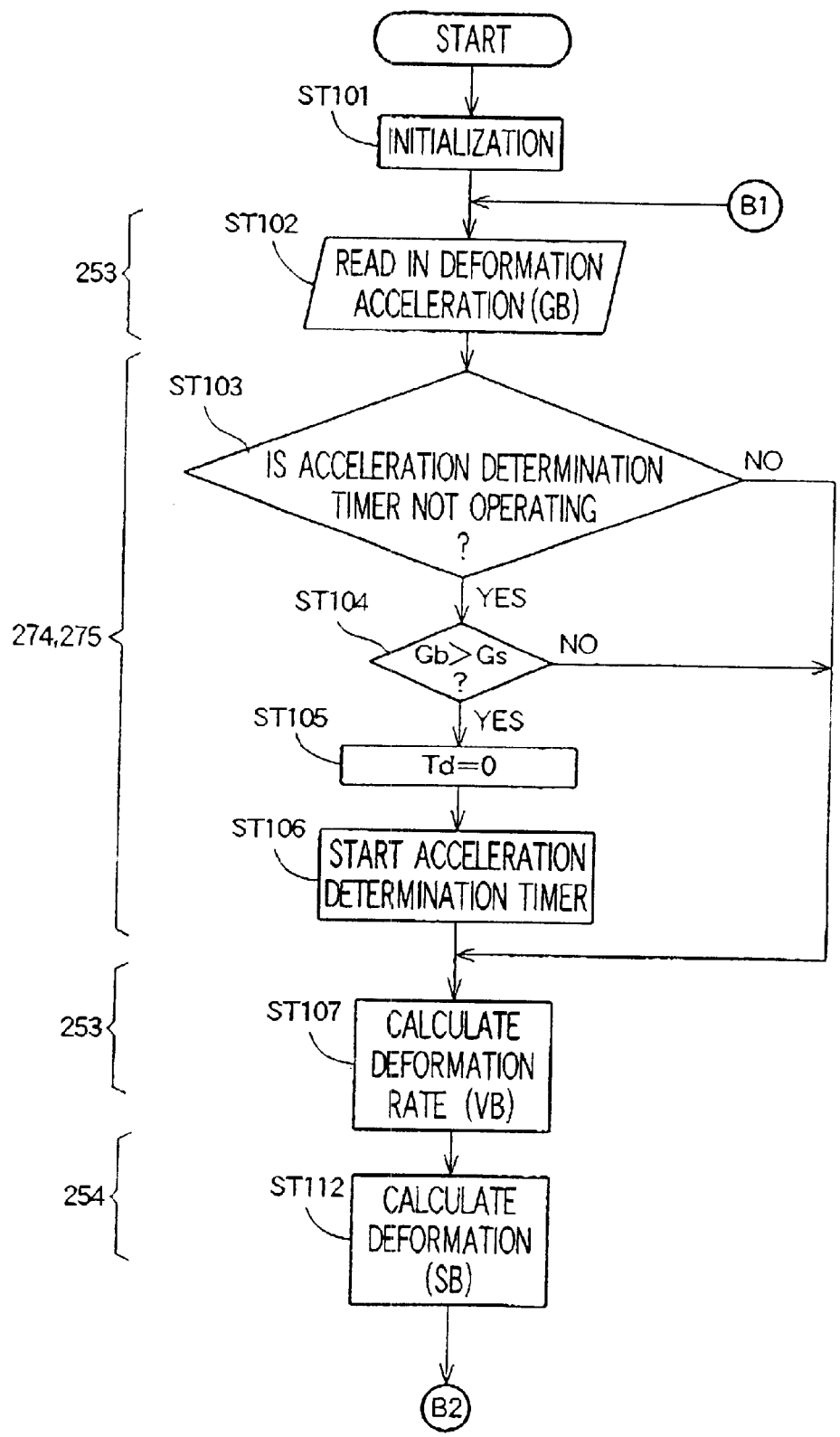
FIG. 39 is a control flow chart of a control part of the fourth preferred embodiment of the invention.

FIG. 39 is a control flow chart (1) of the control part of the fourth preferred embodiment.

ST101: All values are initialized (maximum deformation rate VM=0, F=0).

ST102: The deformation acceleration GB of the bumper face 42 detected by the bumper sensor 43 is read in.

ST103: It is determined whether or not the acceleration determination timer 275 is non-operating, and if YES then processing proceeds to ST104 and if NO then processing proceeds to ST107.

ST104: It is determined whether or not the deformation acceleration GB has risen above a preset reference acceleration GT, and if YES then processing proceeds to ST105 and if NO then processing proceeds to ST107.

ST105: The elapsed time Td of the acceleration determination timer 275 is reset.

ST106: The acceleration determination timer 275 is started.

ST107: The deformation rate VB of the bumper face 42 is calculated from the deformation acceleration GB. For example, the deformation rate VB is obtained by integrating the deformation acceleration GB.

ST112: The deformation SB of the bumper face 42 is calculated from the deformation rate VB. For example, the deformation SB is obtained by integrating the deformation rate VB. After that, processing proceeds to the out-connector B2.

Figure 40:
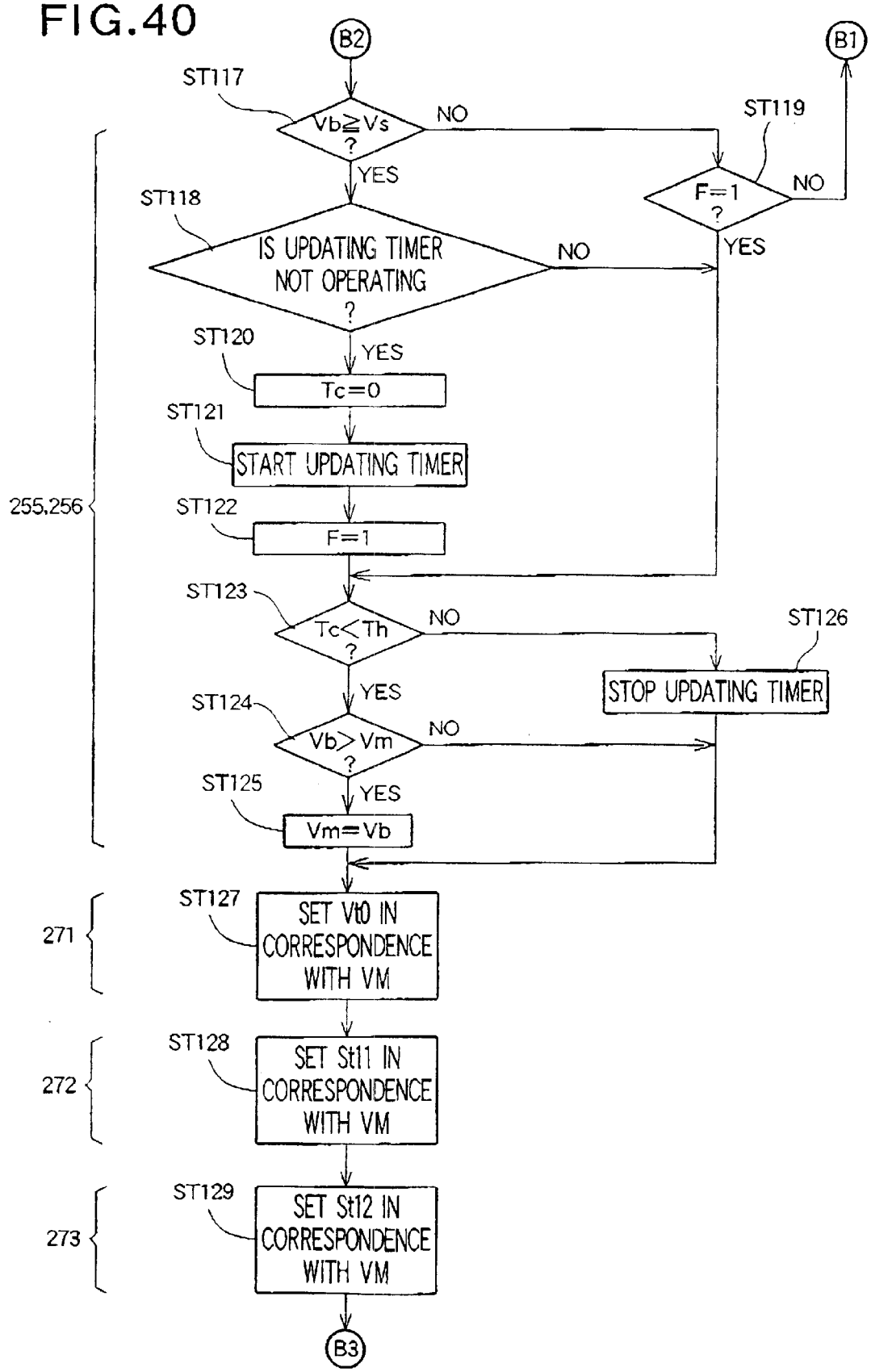
FIG. 40 is a control flow chart of a control part of the fourth preferred embodiment of the invention.

FIG. 40 is a control flow chart (2) of the control part of the fourth preferred embodiment, and shows processing having proceeded from ST112 of FIG. 39 via the out-connector B2 and the in-connector B2 of this figure to ST117.

ST117: It is determined whether or not the deformation rate VB has reached a preset small inference start reference rate VS, and if YES then processing proceeds to ST118 and if NO then processing proceeds to ST119.

ST118: It is determined whether or not the updating timer 256 is non-operating, and if YES then processing proceeds to ST120 and if NO then processing proceeds to ST123.

ST119: It is determined whether or not the flag F=1, and if YES then processing proceeds to ST123 and if NO then processing returns via the out-connector B1 and the in-connector B1 of FIG. 39 to ST102.

ST120: The elapsed time TC of the updating timer 256 is reset.

ST121: The updating timer 256 is started.

ST122: The flag F is set to '1'.

ST123: It is determined whether or not the elapsed time TC from when the updating timer 256 started has not reached a reference time TH, and if YES then processing proceeds to ST124 and if NO then processing proceeds to ST126.

ST124: It is determined whether or not the deformation rate VB is larger than a previous maximum deformation rate VM detected earlier, and if YES then processing proceeds to ST125 and if NO then processing proceeds to ST127.

ST125: The deformation rate VB is set as the maximum deformation rate VM and processing proceeds to ST127.

ST126: The updating timer 256 is stopped and processing proceeds to ST127.

ST127: A reference rate Vt0 is set in correspondence with the maximum deformation rate VM. Specifically, a value obtained by multiplying the maximum deformation rate VM by a preset rate constant CV smaller than 1.0 is set as the reference rate Vt0 (Vt0=VM×CV). The rate constant CV is for example set to 0.3.

ST128: A first reference deformation St11 is set in correspondence with the maximum deformation rate VM. Specifically, a value obtained by multiplying the maximum deformation rate VM by a preset first deformation constant Cs11 is set as the first reference deformation St11 (St11=VM×Cs11).

ST129: A second reference deformation St12 is set in correspondence with the maximum deformation rate VM. Specifically, a value obtained by multiplying the maximum deformation rate VM by a preset second deformation constant Cs12 larger than the first deformation constant Cs11 is set as the second reference deformation St12 (St12=VM×Cs12). Processing then proceeds to the out-connector B3.

When the units of the deformation rate VB are km/h and the units of the deformation SB are mm, the first deformation constant Cs11 is set to for example 1.0 and the second deformation constant Cs12 is set to for example 1.5.

Figure 41:
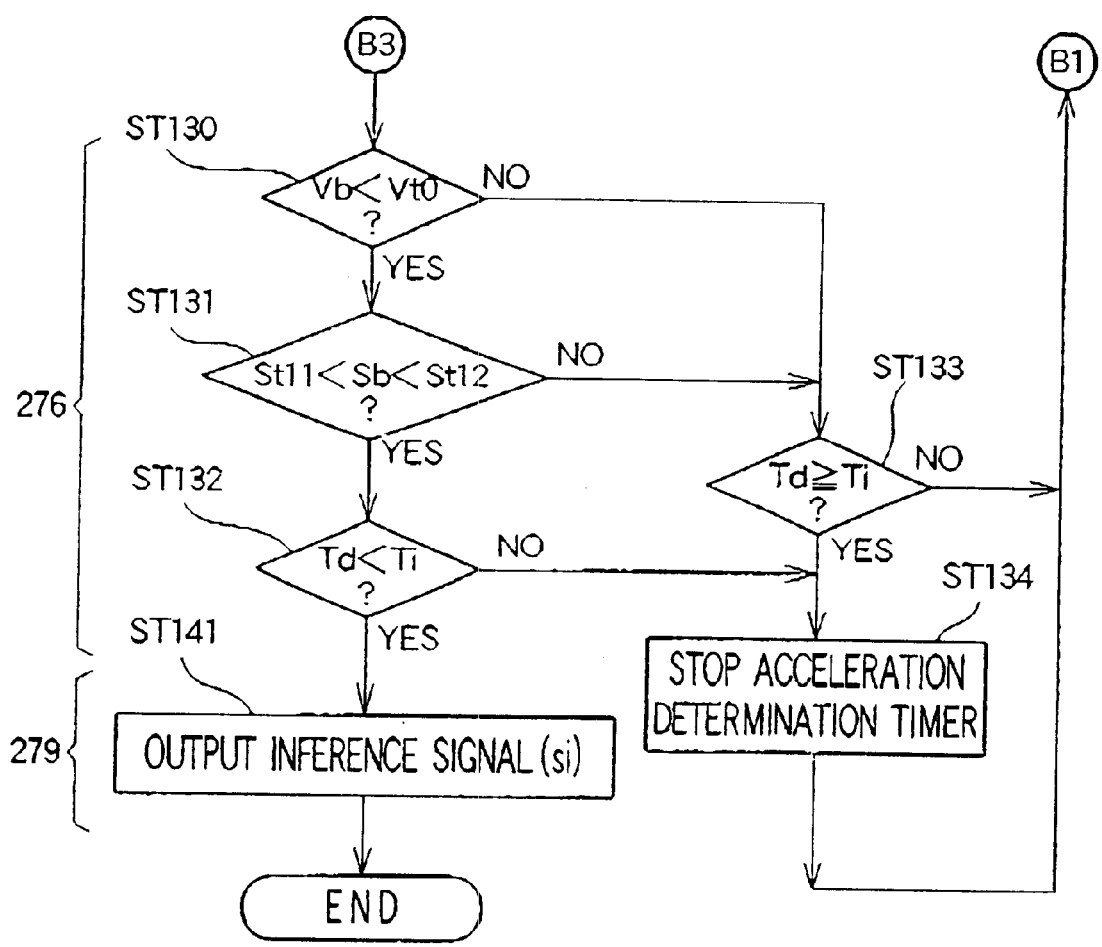
FIG. 41 is a control flow chart of a control part of the fourth preferred embodiment of the invention.

FIG. 41 is a control flow chart (3) of the control part of the fourth preferred embodiment and shows processing having proceeded from ST129 of FIG. 40 via the out-connector B3 and the in-connector B3 of this figure to ST130.

ST130: It is determined whether or not the deformation rate VB is smaller than the preset reference rate Vt0, and if YES then processing proceeds to ST131 and if NO then processing proceeds to ST133.

ST131: It is determined whether or not the deformation SB is within the range of from the first reference deformation St11 to the second reference deformation St12, and if YES then processing proceeds to ST132 and if NO then processing proceeds to ST133.

ST132: It is determined whether or not the elapsed time Td from when the acceleration determination timer 275 started has not reached a predetermined reference time Ti, and if YES then processing proceeds to ST141 and if NO then processing proceeds to ST134.

ST133: It is determined whether or not the elapsed time Td from when the acceleration determination timer 275 started has reached the predetermined reference time Ti, and if YES then processing proceeds to ST134 and if NO then processing returns via the out-connector B1 and the in-connector B1 of FIG. 39 to ST102.

ST134: The acceleration determination timer 275 is stopped, and processing returns via the out-connector B1 and the in-connector B1 of FIG. 39 to ST102.

ST141: It is inferred that the obstruction S1 shown in FIG. 4 which the vehicle 11 has hit is a specified obstruction; an inference signal si (for example, an actuator drive command signal si) is produced, and control ends.

With the combination of ST117, ST119 and ST122, inferring of the type of the obstruction S1 (see FIG. 4) is started when the deformation rate VB first reaches the preset inference start reference rate VS. When the deformation rate VB once reaches the inference start reference rate VS, inferring of the type of the obstruction S1 can be continued irrespective of the size of the deformation rate VB thereafter.

With the combination of steps ST117 through ST126, in the time between the deformation rate VB reaching the inference start reference rate VS and the reference time TH being reached, by the maximum deformation rate VM being updated to the largest value as the deformation rate VB increases, it is possible to set a maximum deformation rate VM which corresponds with the type of the obstruction S1.

The reference time TH is a time set to remove any setting of the maximum deformation rate VM based on a noisy deformation acceleration GB caused by vibration during travel or an excessive deformation acceleration GB which affects the proper control of the control part 44, and is for example 500 ms.

Here, the relationships between the constituent elements of the obstruction inference apparatus for a vehicle 40 shown in FIG. 35 and the steps of the control part 44 shown in FIG. 39 through FIG. 41 will be explained.

ST102 and ST107 correspond to the deformation rate calculating means 253. ST104 corresponds to the acceleration determining means 274. The combination of ST103, ST105 and ST106 corresponds to the acceleration determination timer 275. ST112 corresponds to the deformation calculating means 254. The combination of ST117 through ST126 corresponds to the maximum deformation rate updating means 255 and the updating timer 256. ST127 corresponds to the reference rate generating means 271. ST128 corresponds to the first reference deformation generating means 272. ST129 corresponds to the second reference deformation generating means 273. The combination of ST130 through ST134 corresponds to the inferring means 276. And ST141 corresponds to the inference signal generating means 279.

In ST127 through ST129, Vt0, St1 and St2 can alternatively be set by referring to the maps shown in FIGS. 42A and 42B and FIGS. 43A and 43B in correspondence with the maximum deformation rate VM.

Figures 42A, 42B:
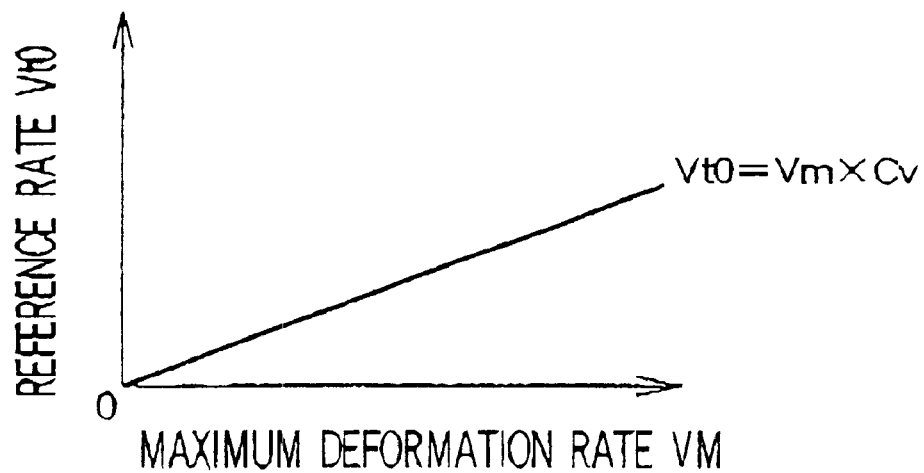
FIGS. 42A and 42B are views illustrating the setting of a reference rate of a control part of the fourth preferred embodiment of the invention.

FIG. 42A is a maximum deformation rate VM—reference rate Vt0 correspondence map with the maximum deformation rate VM on the horizontal axis and a reference rate Vt0 on the vertical axis, and shows a reference rate Vt0 which changes in correspondence with the maximum deformation rate VM. The line Vt0 is based on the formula 'reference rate Vt0=VM×CV'.

FIG. 42B is a map in the form of a table prepared on the basis of FIG. FIG. 42A, and again shows a reference rate Vt0 which changes in correspondence with the maximum deformation rate VM.

The reference rate Vt0 can be set by providing a map in memory of the control part 44 (see FIG. 35) in advance like this and referring to the map in correspondence with the maximum deformation rate VM in the above-mentioned step ST127. The reference rate Vt0 set by referring to a map is a value equivalent to a value obtained using the formula of FIG. 42A.

Figures 43A, 43B:
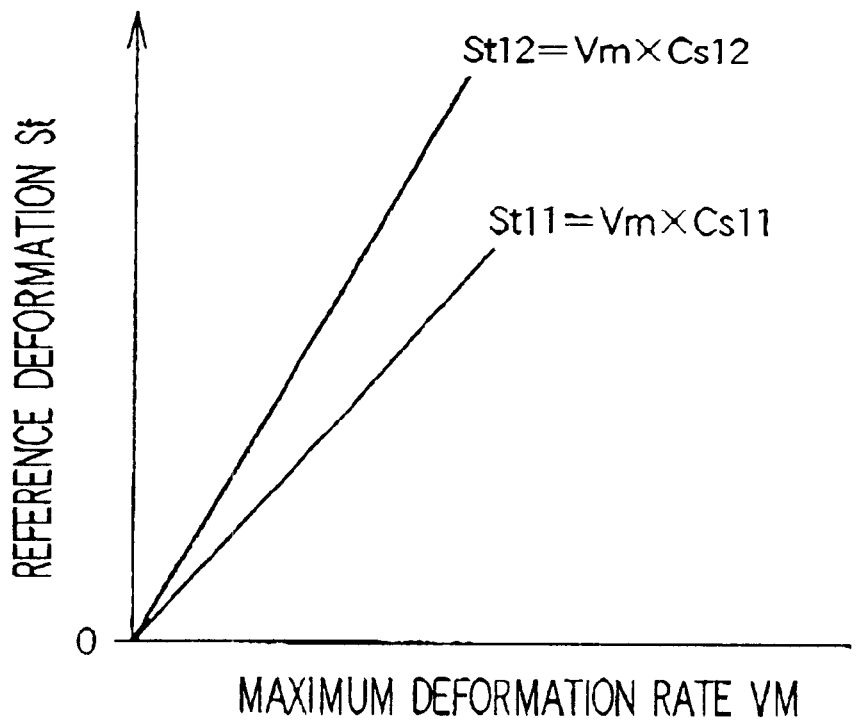
FIGS. 43A and 43B are views illustrating the setting of a reference deformation of a control part of the fourth preferred embodiment of the invention.

FIG. 43A is a maximum deformation rate VM—reference deformation St correspondence map with the maximum deformation rate VM on the horizontal axis and a reference deformation St on the vertical axis, and shows first and second reference deformations St11, St12 which change in correspondence with the maximum deformation rate VM. The line St11 is based on the formula 'reference deformation St11=VM×Cs11', and the line St12 is based on the formula 'second reference deformation St12=VM×Cs12'.

FIG. 43B is a map in the form of a table prepared on the basis of FIG. 43A, and again shows first and second reference deformations St11, St12 which change in correspondence with the maximum deformation rate VM.

The first and second reference deformations St11, St12 can be set by providing a map in memory of the control part 44 (see FIG. 35) in advance like this and referring to the map in correspondence with the maximum deformation rate VM in the above-mentioned steps ST128 and ST129. The first and second reference deformations St11, St12 set by referring to a map are values equivalent to values obtained using the formulas of FIG. 43A.

The foregoing description will now be summarized.

As is clear also from FIG. 36A through FIG. 37F, generally, the lighter the obstruction is the shorter is the time taken for the deformation rate VB to return to zero after reaching a peak, from the collision start time. And the lighter the obstruction is, because the shorter is the time taken for the deformation rate VB to reach zero, the shorter the deformation time is also. As a result, the ratio of the maximum value of the deformation SB to the maximum value VM of the deformation rate VB, compared to the case of a specified obstruction such as a pedestrian, is smaller with a lighter obstruction.

The obstruction inference apparatus for a vehicle 40 of the fourth preferred embodiment shown in FIG. 35 utilizes this characteristic: it detects the deformation rate VB and the deformation SB of the bumper face 42 when the vehicle has hit an obstruction S1; obtains the maximum deformation rate VM, of when the deformation rate VB reaches its peak; sets a reference rate Vt0 and a range of from a first reference deformation St11 to a second reference deformation St12 on the basis of this maximum deformation rate VM; and when within a preset inference time Td from when the vehicle hit the obstruction the deformation rate VB is smaller than the reference rate Vt0 and also the deformation SB is within the range of from the first reference deformation St11 to the second reference deformation St12, infers that the obstruction S1 which has been hit is a specified obstruction. Accordingly, a light object is not erroneously inferred to be a specified obstruction. And thus the type of the obstruction S1 can be inferred more exactly.

As shown in FIG. 5, when the vehicle 11 hits a low-center-of-gravity obstruction S2 such as a small animal which gets caught in the underside of the vehicle 11, the bumper face 42 deforms so as to be pulled to the lower side of the vehicle 11 and rearward. As shown in FIG. 38B, in this case the time taken from the time of impact for the deformation rate VB of the bumper face 42 to reach a peak and then return to zero is long compared to a case in which the obstruction is a specified obstruction such as a pedestrian. This can be understood by contrasting FIG. 36B with FIG. 38B.

It is in view of this point that in this fourth preferred embodiment the condition of the deformation rate VB being smaller than a reference rate Vt0 and the deformation SB being within the range between a first reference deformation St11 and a second reference deformation St12 is set. And when this condition is satisfied, it is inferred that the obstruction which has been hit is a specified obstruction. Accordingly, a low-center-of-gravity obstruction S2 is not erroneously inferred to be a specified obstruction.

The inference time Td from when the vehicle hits the obstruction S1 should be set to an optimal value which makes it possible to distinguish between a case of hitting a specified obstruction such as a pedestrian and a case of hitting a low-center-of-gravity obstruction S2.

In this way it is possible to infer the type of an obstruction S1 more exactly.

And because values equivalent to values obtained by multiplying the maximum deformation rate VM, which differs according to the type of the obstruction S1, by predetermined constants are set as the reference deformation St0 and the first and second reference deformations St11 and St12, the type of the obstruction S1 can be inferred still more exactly, irrespective of the impact speed at which the obstruction S1 is hit.

Next, a variation of this fourth preferred embodiment of an obstruction inference apparatus for a vehicle according to the invention will be described, on the basis of FIG. 44 through FIG. 50.

Figure 44:
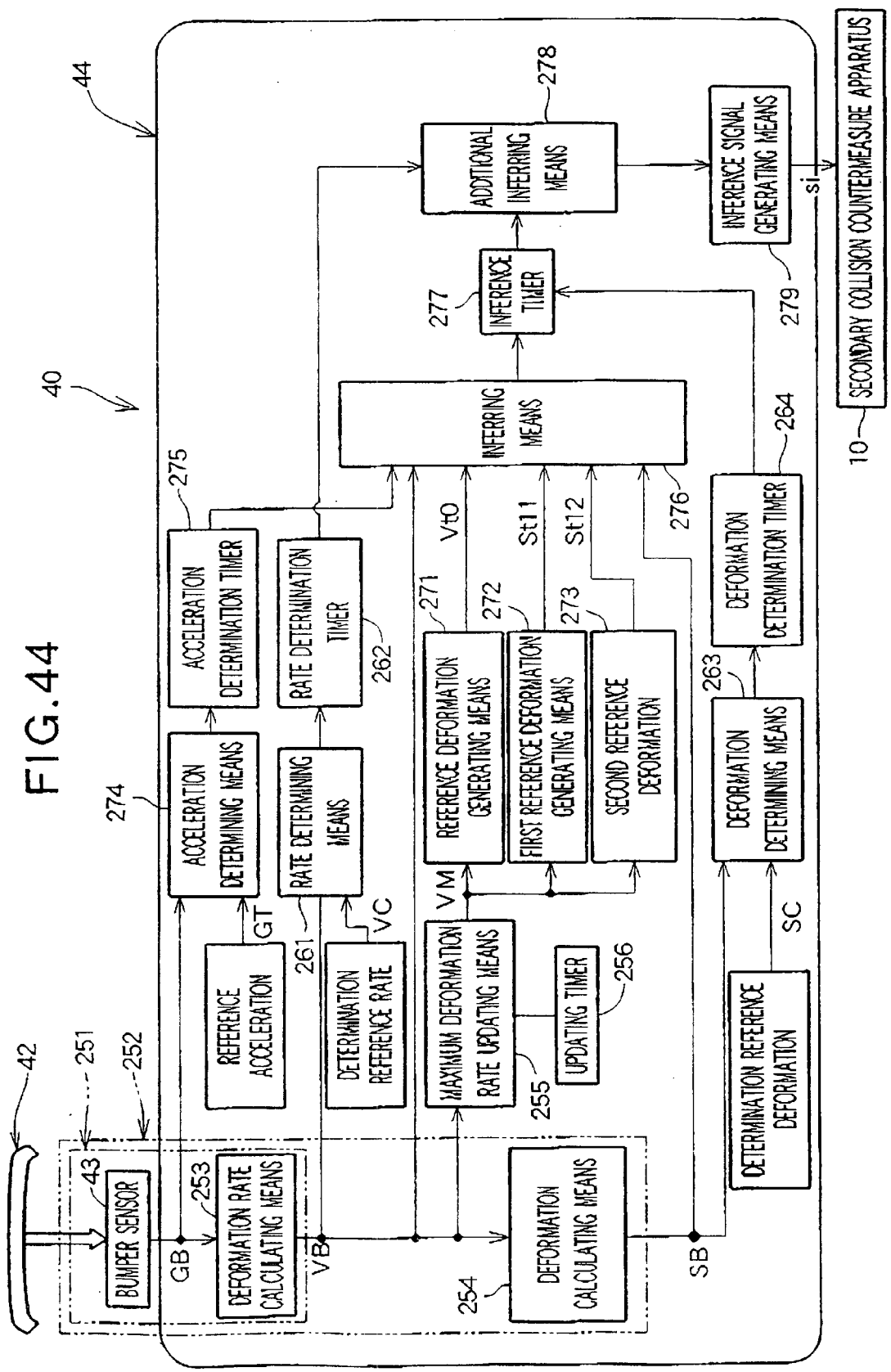
FIG. 44 is a block diagram of an obstruction inference apparatus for a vehicle constituting a variation of the fourth preferred embodiment of the invention.
Figure 45:
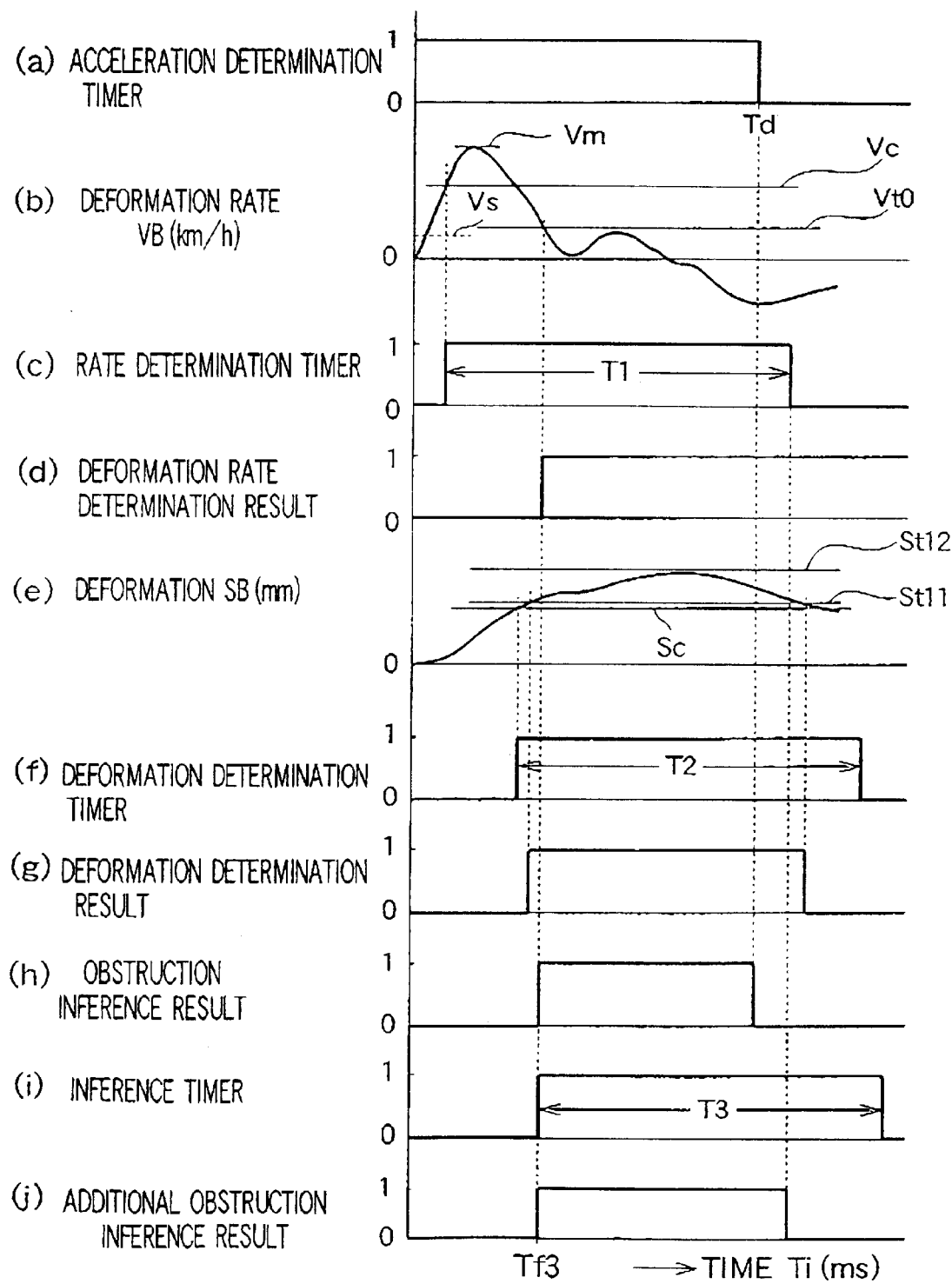
FIGS. 45A through 45J are bumper face deformation rate and deformation graphs pertaining to the variation of the fourth preferred embodiment of the invention.
Figure 46:
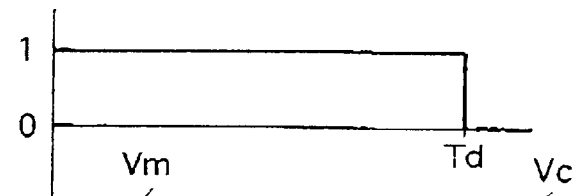
FIGS. 46A through 46J are bumper face deformation rate and deformation graphs pertaining to the variation of the fourth preferred embodiment of the invention.
Figure 46:
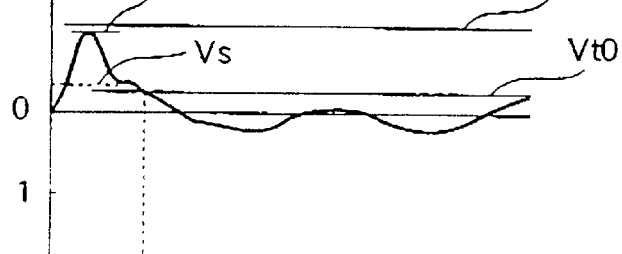
Figure 46:
Figure 46:
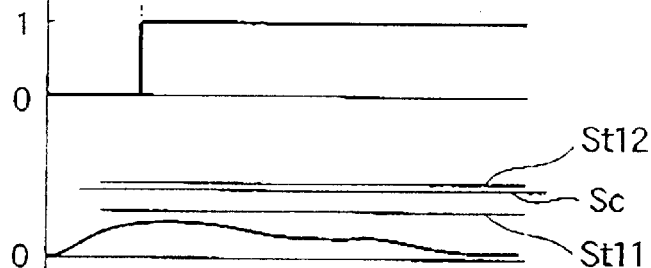
Figure 46:
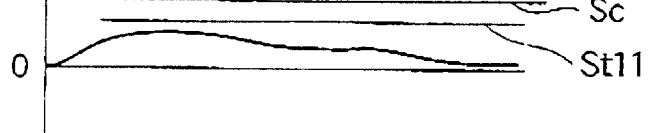
Figure 46:
Figure 46:
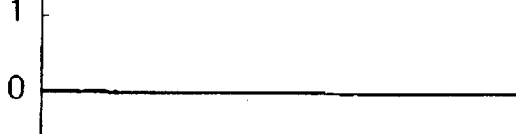
Figure 46:
Figure 46:
Figure 46:
Figure 47:
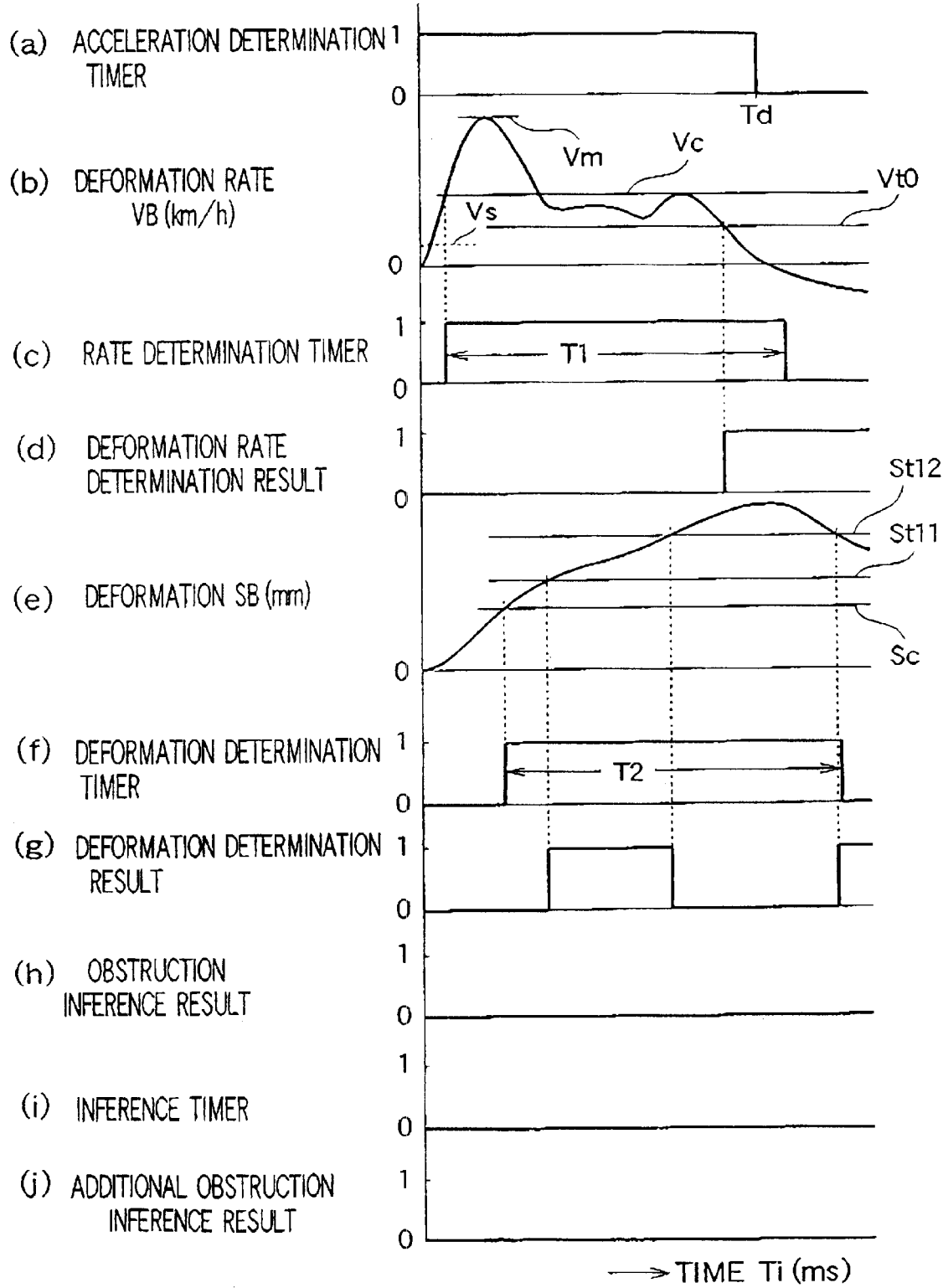
FIGS. 47A through 47J are bumper face deformation rate and deformation graphs pertaining to the variation of the fourth preferred embodiment of the invention.

FIG. 44 is a block diagram of an obstruction inference apparatus for a vehicle pertaining to a variation of the fourth preferred embodiment. The obstruction inference apparatus for a vehicle 40 of this variation of the fourth preferred embodiment has the construction of the obstruction inference apparatus for a vehicle of the fourth preferred embodiment shown in FIG. 35 with the following elements (1) through (6) added.

(1) Rate determining means 261 (the same as the rate determining means 261 of the variation of the third preferred embodiment shown in FIG. 29).

(2) A rate determination timer 262 (the same as the rate determination timer 262 of the variation of the third preferred embodiment shown in FIG. 29).

(3) Deformation determining means 263, for determining that the deformation SB has risen above a preset determination reference deformation SC different from the first and second reference deformations St11 and St12 (similar to the deformation determining means 263 of the variation of the third preferred embodiment shown in FIG. 29).

(4) A deformation determination timer 264 (the same as the deformation determination timer 264 of the variation of the third preferred embodiment shown in FIG. 29).

(5) An inference timer 277, for holding an inference signal from the inferring means 276 for a preset time.

(6) Additional inferring means 278, for additionally inferring that the obstruction S1 is a specified obstruction (for example a pedestrian) when receiving signals from all of the rate determination timer 262, the deformation determination timer 264 and the inference timer 277.

As is clear from the foregoing description, the obstruction inference apparatus for a vehicle 40 of this variation of the fourth preferred embodiment holds the determination/inference signals from the means 261, 263 and 276 for a fixed time with the timers 262, 264 and 277. That is, the signals from the timers 262, 264 and 277 are mustered for a fixed time. This makes it possible for the additional inference of the additional inferring means 278 to be carried out more certainly.

When the additional inference of the additional inferring means 278 can be carried out certainly even if the determination/inference signals from the means 261, 263 and 276 are transmitted to the additional inferring means 278 directly, the timers 262, 264 and 277 are unnecessary.

The inference signal generating means 279 of this variation of the fourth preferred embodiment produces an inference signal si on the basis of the additional inference of the additional inferring means 278. The control part 44 of this variation of the fourth preferred embodiment has the above-mentioned means 253 through 256, 261 through 264 and 271 through 279.

FIGS. 45A through 45J are bumper face deformation rate and deformation graphs (1) pertaining to the obstruction inference apparatus for a vehicle of this variation of the fourth preferred embodiment and showing a case in which the obstruction is a specified obstruction such as a pedestrian. The graphs are to be viewed in the same way as FIGS. 36A through 36F, and the reference numerals have the same definitions. Reference will be made to FIG. 44 in the following explanation.

FIG. 45A shows the operation of the acceleration determination timer 275. The acceleration determination timer 275 holds the determination result '1' for a predetermined elapsed time Td (a time equivalent to the reference time Ti, which will be further discussed later) from when the deformation acceleration GB rises above a preset reference acceleration GT.

FIG. 45B shows change of the deformation rate VB of the bumper face having hit the specified obstruction. It can be seen that the deformation rate VB rises above the determination reference rate VC in the course of increasing to the maximum deformation rate VM. For example with the case of the obstruction being a specified obstruction as a reference, the determination reference rate VC is in the relationship Vt0<VC.

FIG. 45C shows the operation of the rate determination timer 262. The rate determination timer 262 holds the determination result '1' for an elapsed time T1 (a time equivalent to a reference time Ts1, which will be further discussed later) from when the deformation rate VB rose above the determination reference rate VC.

FIG. 45D shows the result of determining whether or not the deformation rate VB is smaller than the reference rate Vt0. The determination result is '1' only when the deformation rate VB is smaller than the reference rate Vt0.

FIG. 45E shows change of the deformation of the FIG. 4 having hit the specified obstruction. It can be seen that the deformation SB rises above the determination reference deformation SC in the course of increasing. For example with the case of the obstruction being a specified obstruction as a reference, the determination reference deformation SC is in the relationship SC<St11.

FIG. 45F shows the operation of the deformation determination timer 264. The deformation determination timer 264 holds the determination result '1' for an elapsed time T2 (a time equivalent to a reference time Ts2, which will be further discussed later) from when the deformation SB rose above the determination reference deformation SC.

FIG. 45G shows a deformation determination result. The determination result is '1' only when the deformation SB is within the range between St1 and St2.

FIG. 45H shows an obstruction inference result based on the logical product of the determination results of FIG. 45A, FIG. 45D and FIG. 45G. When the determination results of FIG. 45A, FIG. 45D and FIG. 45G are all '1', the obstruction inference result is '1' and it is inferred that the obstruction is a specified obstruction.

FIG. 45I shows the operation of the inference timer 259. The inference timer 259 holds the inference result '1' for an elapsed time T3 (a time equivalent to a reference time Ts3, which will be further discussed later) from when the obstruction inference result becomes '1' in FIG. 45H.

FIG. 45J shows the additional obstruction inference result of the additional inferring means 278. When the determination results of FIG. 45C, FIG. 45F and FIG. 45I are all '1', the additional obstruction inference result is '1' and it is additionally inferred that the obstruction is a specified obstruction.

FIGS. 46A through 46J are bumper face deformation rate and deformation graphs (2) pertaining to the obstruction inference apparatus for a vehicle of this variation of the fourth preferred embodiment and showing a case in which the obstruction is a light object. The graphs are to be viewed in the same way as FIGS. 45A through 45J, and the reference numerals have the same definitions. Reference will be made to FIG. 44 in the following explanation.

FIG. 46A shows the operation of the acceleration determination timer 275.

FIG. 46B shows change of the deformation rate VB of the bumper face having hit the light object.

FIG. 46C shows the operation of the rate determination timer 262. Because the deformation rate VB does not rise above the determination reference rate VC, the determination result is '0'.

FIG. 46D shows that when the deformation rate VB is smaller than the reference rate Vt0 the determination result is '1'.

FIG. 46E shows that the deformation SB does not rise above either of the first and second reference deformations St11, St12 or the determination reference deformation SC.

FIG. 46F shows the operation of the deformation determination timer 264. Because the deformation SB does not rise above the determination reference deformation SC, the determination result is '0'.

FIG. 46G shows that because the deformation SB is not within the range between St11 and St12, the determination result is '0'.

FIG. 46H shows the obstruction inference result. Because the determination result of FIG. 46G is '0', the obstruction inference result is '0' and it is inferred that the obstruction is not a specified obstruction.

FIG. 46I shows the operation of the inference timer 277. The determination result is '0'.

FIG. 46J shows the additional obstruction inference result of the additional inferring means 278. Because the determination results of FIGS. 46C, 46F and 46I are all '0', the additional obstruction inference result is '0' and it is additionally inferred that the obstruction is not a specified obstruction.

FIGS. 47A through 47J are bumper face deformation rate and deformation graphs (3) pertaining to the obstruction inference apparatus for a vehicle of this variation of the fourth preferred embodiment and showing a case in which the obstruction is a low-center-of-gravity obstruction S2 as shown FIG. 5. The graphs are to be viewed in the same way as FIGS. 45A through 45J, and the reference numerals have the same definitions. Reference will be made to FIG. 44 in the following explanation.

FIG. 47A shows the operation of the acceleration determination timer 275.

FIG. 47B shows change of the deformation rate VB of the bumper face having hit the low-center-of-gravity obstruction S2. It can be seen that the deformation rate VB rises above the determination reference rate VC in the course of increasing to the maximum deformation rate VM.

FIG. 47C shows the operation of the rate determination timer 262. The rate determination timer 262 holds the determination result '1' for the elapsed time T1 from when the deformation rate VB rises above the determination reference rate VC.

FIG. 47D shows that the determination result is '1' only when the deformation rate VB is smaller than the reference rate Vt0.

FIG. 47E shows that the deformation SB rises above the determination reference deformation SC in the course of increasing.

FIG. 47F shows the operation of the deformation determination timer 264. The deformation determination timer 264 holds the determination result '1' for the elapsed time T2 from when the deformation SB rises above the determination reference deformation SC.

FIG. 47G shows that the determination result is '1' only when the deformation SB is within the range between St11 and St12.

FIG. 47H shows the obstruction inference result. Because when the determination results of FIGS. 47A and 47D are both '1' the determination result of FIG. 47G is '0', the obstruction inference result is '0' and it is inferred that the obstruction is not a specified obstruction.

FIG. 47I shows the operation of the inference timer 259. The determination result is '0'.

FIG. 47J shows the additional obstruction inference result of the additional inferring means 278. Because the determination result of FIG. 47I is '0', the additional obstruction inference result is '0' and it is additionally inferred that the obstruction is not a specified obstruction.

Next, the control flow of the control part 44 of this variation of the fourth preferred embodiment will be described, on the basis of FIG. 44 and FIGS. 48 through 50.

Figure 48:
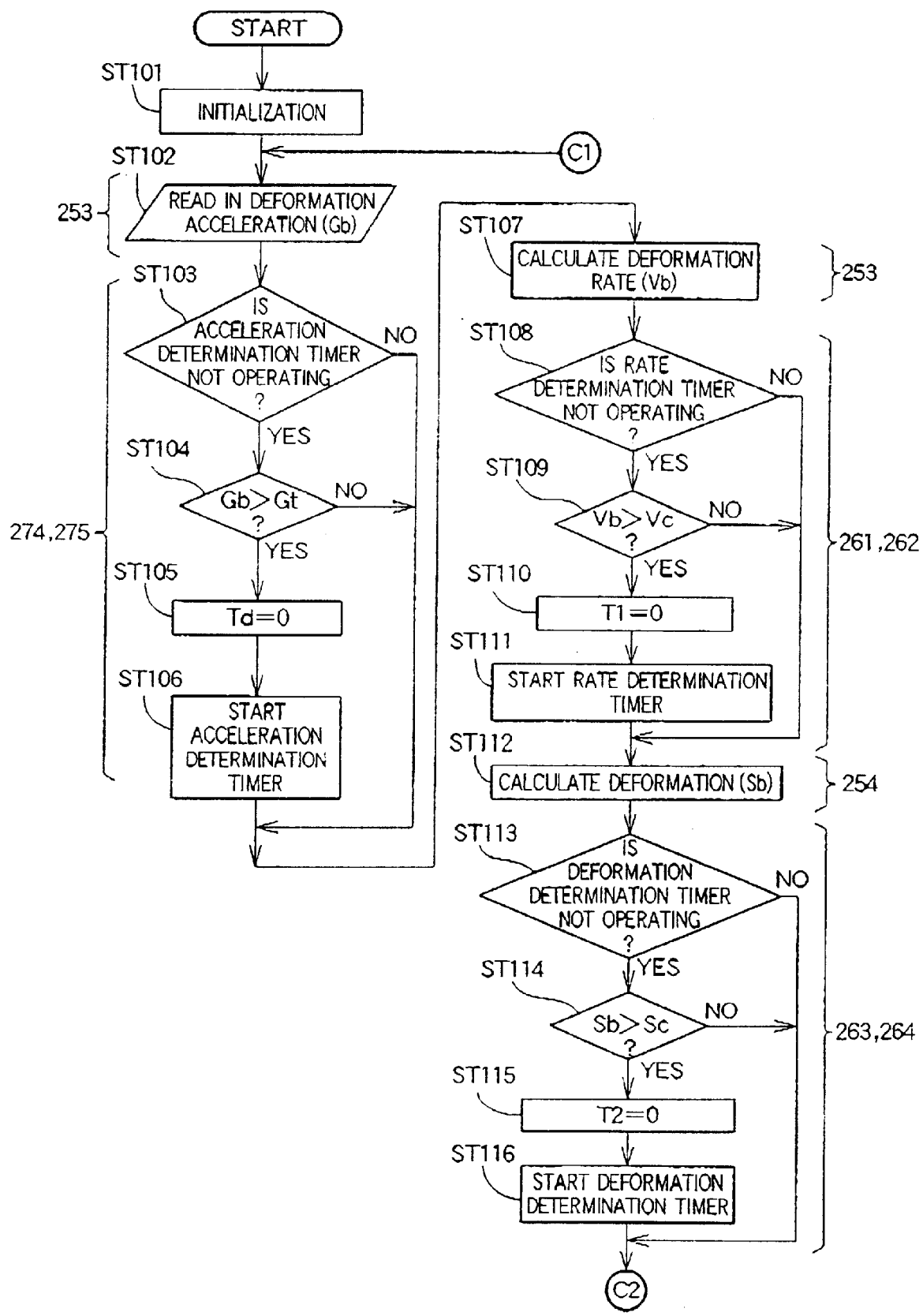
FIG. 48 is a control flow chart of a control part of the variation of the fourth preferred embodiment of the invention.

FIG. 48 is a control flow chart (1) of the control part of this variation of the fourth preferred embodiment.

ST101 through ST107: Respectively the same as ST101 through ST107 in FIG. 39.

ST108: It is determined whether or not the rate determination timer 262 is non-operating, and if YES then processing proceeds to ST109 and if NO then processing proceeds to ST112.

ST109: It is determined whether or not the deformation rate VB has risen above the determination reference rate VC, and if YES then processing proceeds to ST110 and if NO then processing proceeds to ST112.

ST110: The elapsed time T1 of the rate determination timer 262 is reset.

ST111: The rate determination timer 262 is started.

ST112: The deformation SB is calculated. The same as ST112 in FIG. 39.

ST113: It is determined whether or not the deformation determination timer 264 is non-operating, and if YES then processing proceeds to ST114 and if NO then processing proceeds to the out-connector C2.

ST114: It is determined whether or not the deformation SB has risen above the determination reference deformation SC, and if YES then processing proceeds to ST115 and if NO then processing proceeds to the out-connector C2.

ST115: The elapsed time T2 of the deformation determination timer 264 is reset.

ST116: The deformation determination timer 264 is started, and processing proceeds to the out-connector C2.

Figure 49:
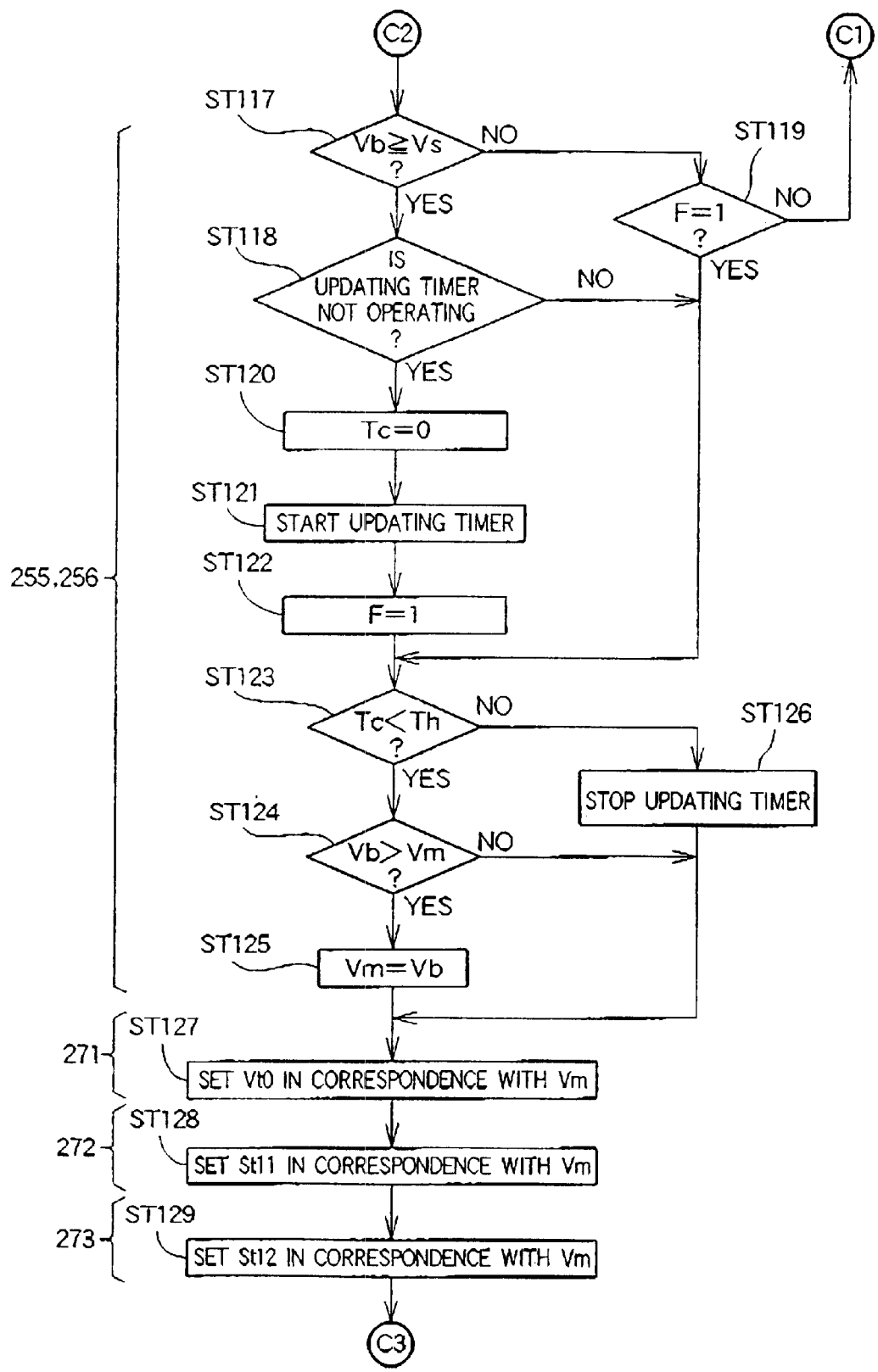
FIG. 49 is a control flow chart of a control part of the variation of the fourth preferred embodiment of the invention.

FIG. 49 is a control flow chart (2) of the control part of this variation of the fourth preferred embodiment, and shows processing having proceeded from ST116 of FIG. 48 via the out-connector C2 and the in-connector C2 of this figure to ST117.

ST117 through ST129: Respectively the same as ST117 through ST129 in FIG. 40.

When the determination of ST119 is NO, processing returns via the out-connector C1 and the in-connector C1 of FIG. 48 to ST102. From ST129, processing proceeds to the out-connector C3.

Figure 50:
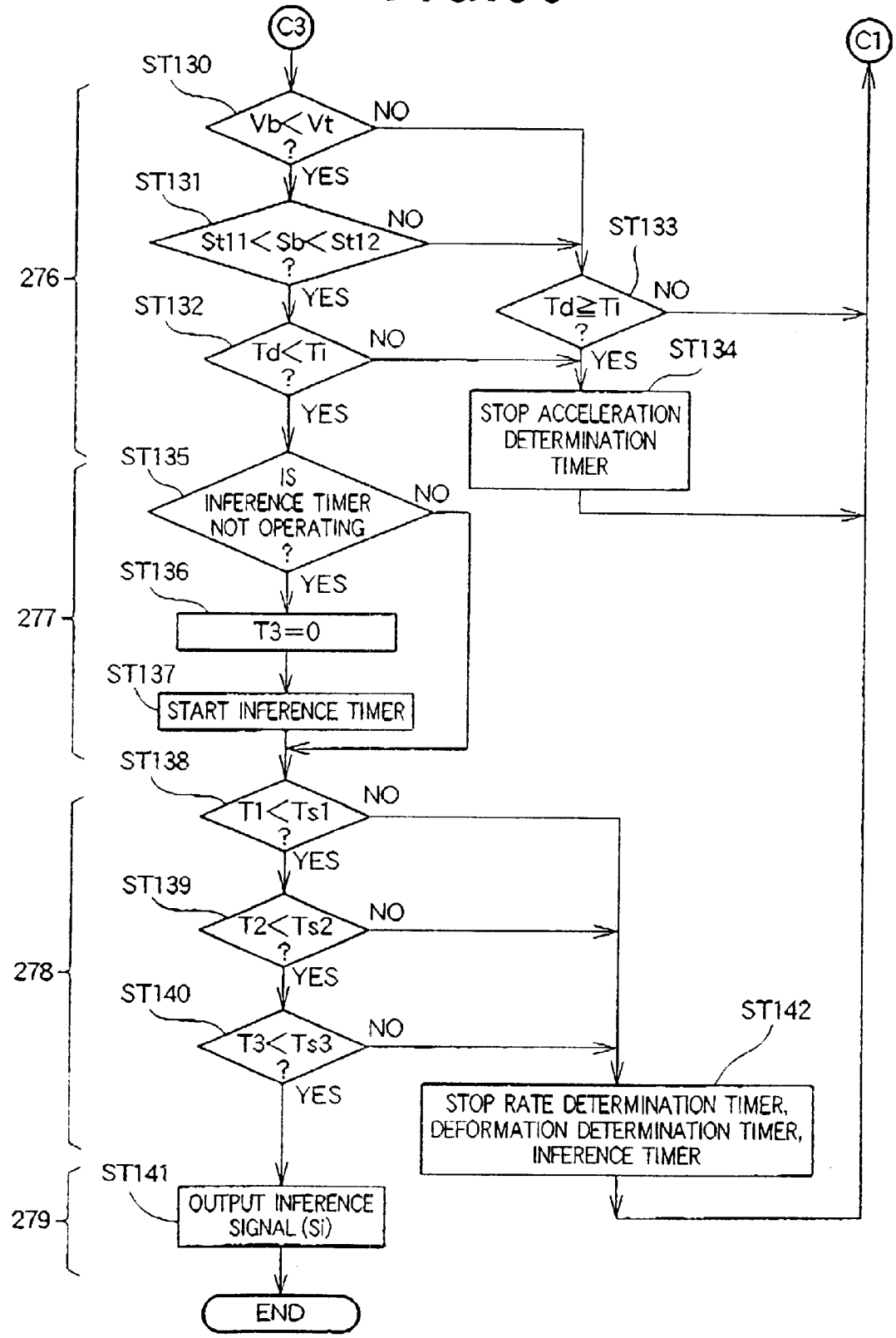
FIG. 50 is a control flow chart of a control part of the variation of the fourth preferred embodiment of the invention.

FIG. 50 is a control flow chart (3) of the control part of this variation of the fourth preferred embodiment, and shows processing having proceeded from ST129 of FIG. 49 via the out-connector C3 and the in-connector C3 of this figure to ST130.

ST130 through ST134: Respectively the same as ST130 through ST134 in FIG. 41. When the determination of ST133 is NO, processing returns via the out-connector C1 and the in-connector C1 of FIG. 48 to ST102. From ST134, processing proceeds via the out-connector C1 and the in-connector C1 of FIG. 48 to ST102.

ST135: It is determined whether or not the inference timer 277 is non-operating, and if YES then processing proceeds to ST136 and if NO then processing proceeds to ST138.

ST136: The elapsed time T3 of the inference timer 277 is reset.

ST137: The inference timer 277 is started.

ST138: It is determined whether or not the elapsed time T1 from when the rate determination timer 262 started has not reached a predetermined reference time Ts1, and if YES then processing proceeds to ST139 and if NO then processing proceeds to ST142.

ST139: It is determined whether or not the elapsed time T2 from when the deformation determination timer 264 started has not reached a predetermined reference time Ts2, and if YES then processing proceeds to ST140 and if NO then processing proceeds to ST142.

ST140: It is determined whether or not the elapsed time T3 from when the inference timer 277 started has not reached a predetermined reference time Ts3, and if YES then processing proceeds to ST141 and if NO then processing proceeds to ST142.

ST141: The same as ST141 in FIG. 41.

ST142: The rate determination timer 262, the deformation determination timer 264 and the inference timer 277 are stopped, and processing returns via the out-connector C1 and the in-connector C1 of FIG. 48 to ST102.

Here, the relationships between the constituent elements of the obstruction inference apparatus for a vehicle 40 shown in FIG. 44 and the steps of the control part 44 shown in FIGS. 48 through 50 will be explained.

ST109 corresponds to the rate determining means 261. The combination of ST108, ST110 and ST111 corresponds to the rate determination timer 262. ST114 corresponds to the deformation determining means 263. The combination of ST113, ST115 and ST116 corresponds to the deformation determination timer 264. The combination of ST135 through ST137 corresponds to the inference timer 277. The combination of ST138 through ST140 corresponds to the additional inferring means 278.

To summarize the foregoing description, the obstruction inference apparatus for a vehicle 40 of this variation of the fourth preferred embodiment has (1) the rate determining means 261 and the rate determination timer 262, and also has (2) the deformation determining means 263 and the deformation determination timer 264.

As is clear also from FIGS. 45A through 46J, generally, the deformation rate VB and the deformation SB of the bumper face 42 have the characteristic that they become larger the heavier the obstruction is that is hit. For example, when a specified obstruction such as a pedestrian is hit, compared to a case where a lighter object than this is hit, the deformation rate VB and the deformation SB are larger.

To utilize this characteristic, this variation of the fourth preferred embodiment has the rate determining means 261 and the deformation determining means 263. The values of the determination reference rate VC and the determination reference deformation SC should be set to optimal values which make it possible to distinguish between a case of hitting a specified obstruction such as a pedestrian and a case of hitting a lighter obstruction than this.

Because the type of the obstruction S1 is additionally inferred by the additional inferring means 278 on the basis of the inference result of the inferring means 276 and the determination result of the rate determining means 261, compared to the fourth preferred embodiment itself it is possible to infer the type of an obstruction more exactly.

And also because the type of the obstruction S1 is additionally inferred by the additional inferring means 278 on the basis of the inference result of the inferring means 276 and the determination result of the deformation determining means 263, compared to the fourth preferred embodiment itself it is possible to infer the type of an obstruction more exactly.

And also because the type of the obstruction S1 is additionally inferred by the additional inferring means 278 on the basis of the inference result of the inferring means 276, the determination result of the rate determining means 261 and the determination result of the deformation determining means 263, compared to the fourth preferred embodiment itself it is possible to infer the type of an obstruction still more exactly.

Next, a fifth preferred embodiment of an obstruction inference apparatus for a vehicle according to the invention will be described, on the basis of FIGS. 51 through 57 and FIGS. 58A and 58B.

Figure 51:
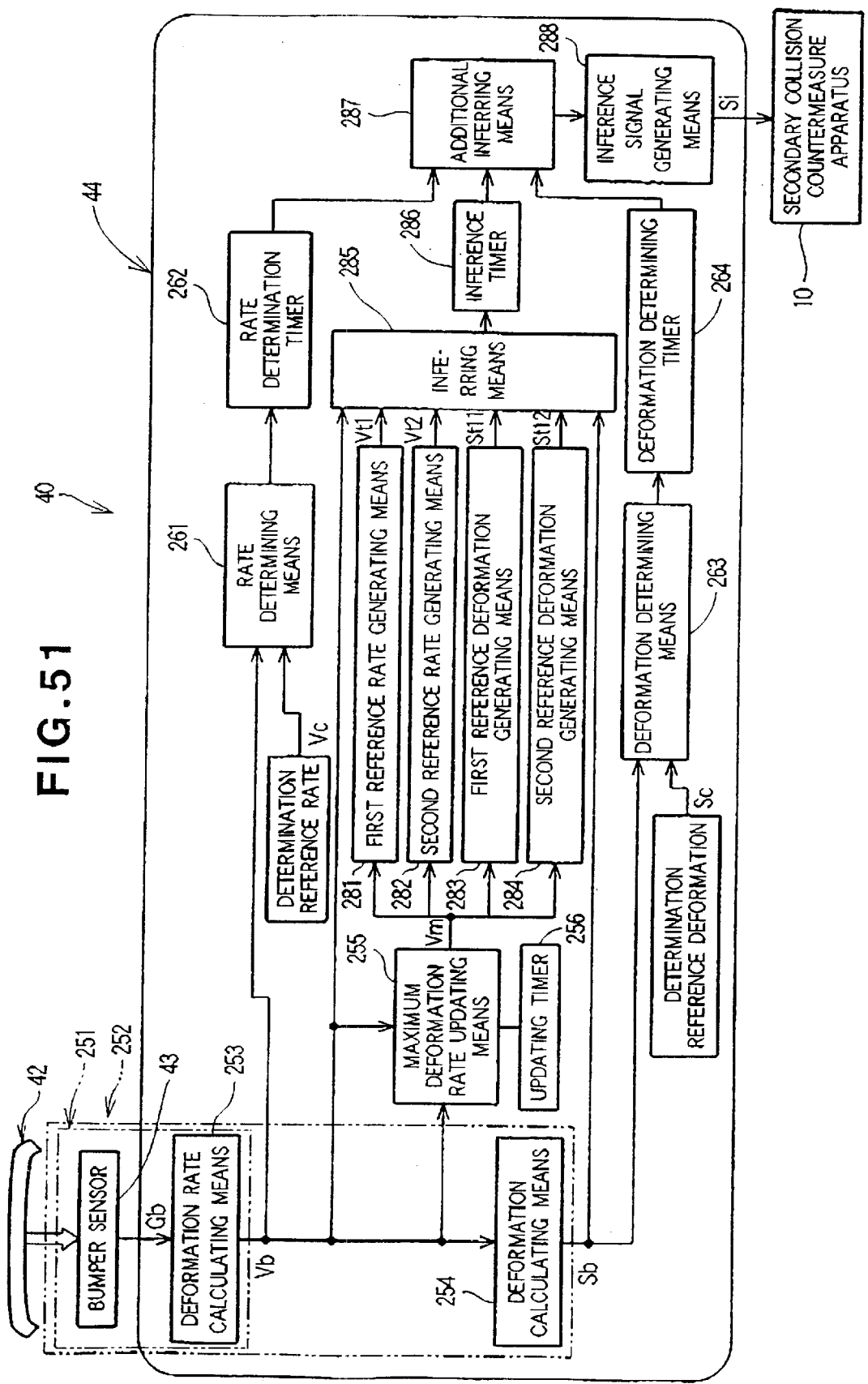
FIG. 51 is a block diagram of an obstruction inference apparatus for a vehicle constituting a fifth preferred embodiment of the invention.
Figure 52:
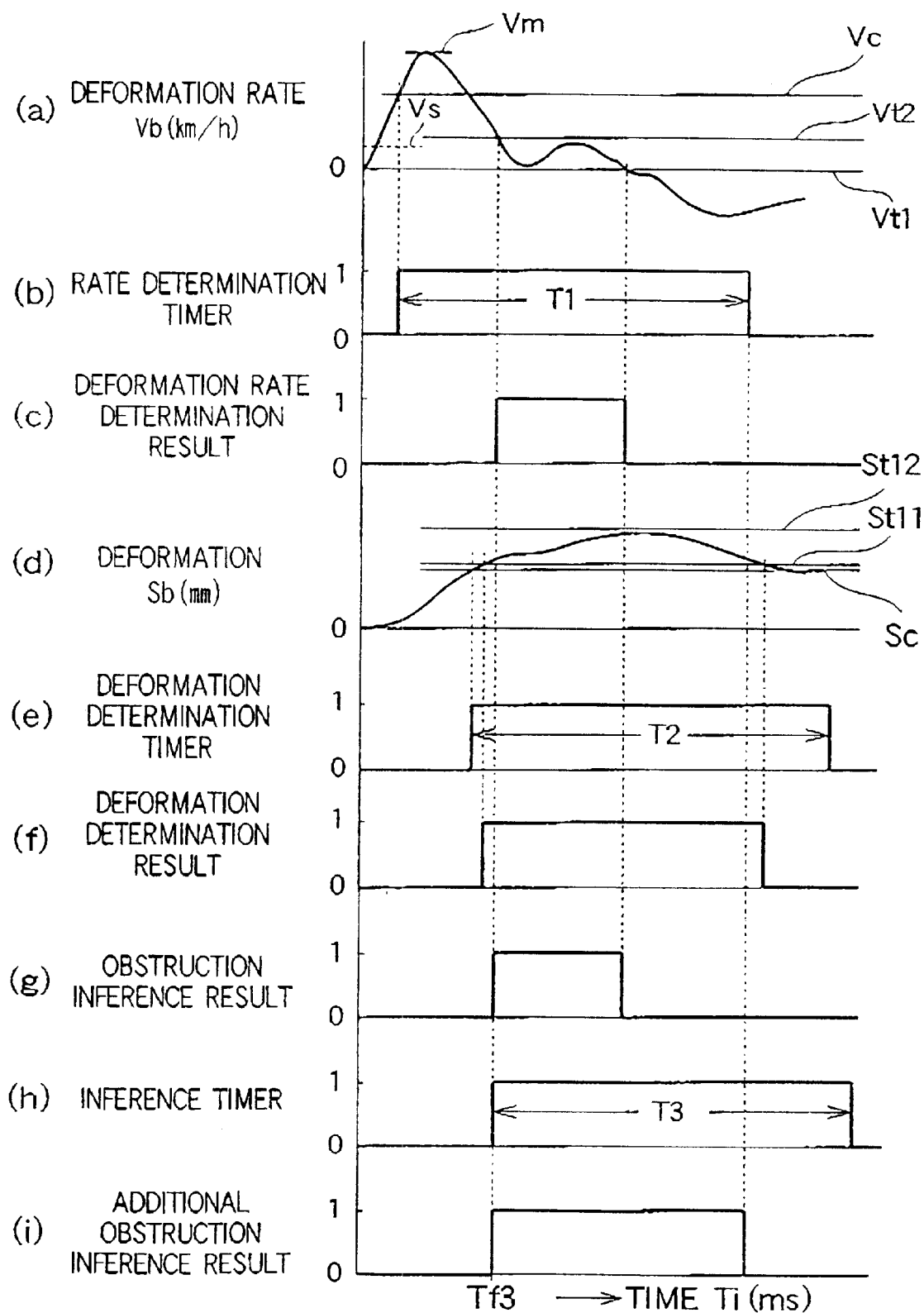
FIGS. 52A through 52I are bumper face deformation rate and deformation graphs pertaining to the fifth preferred embodiment of the invention.
Figure 53:
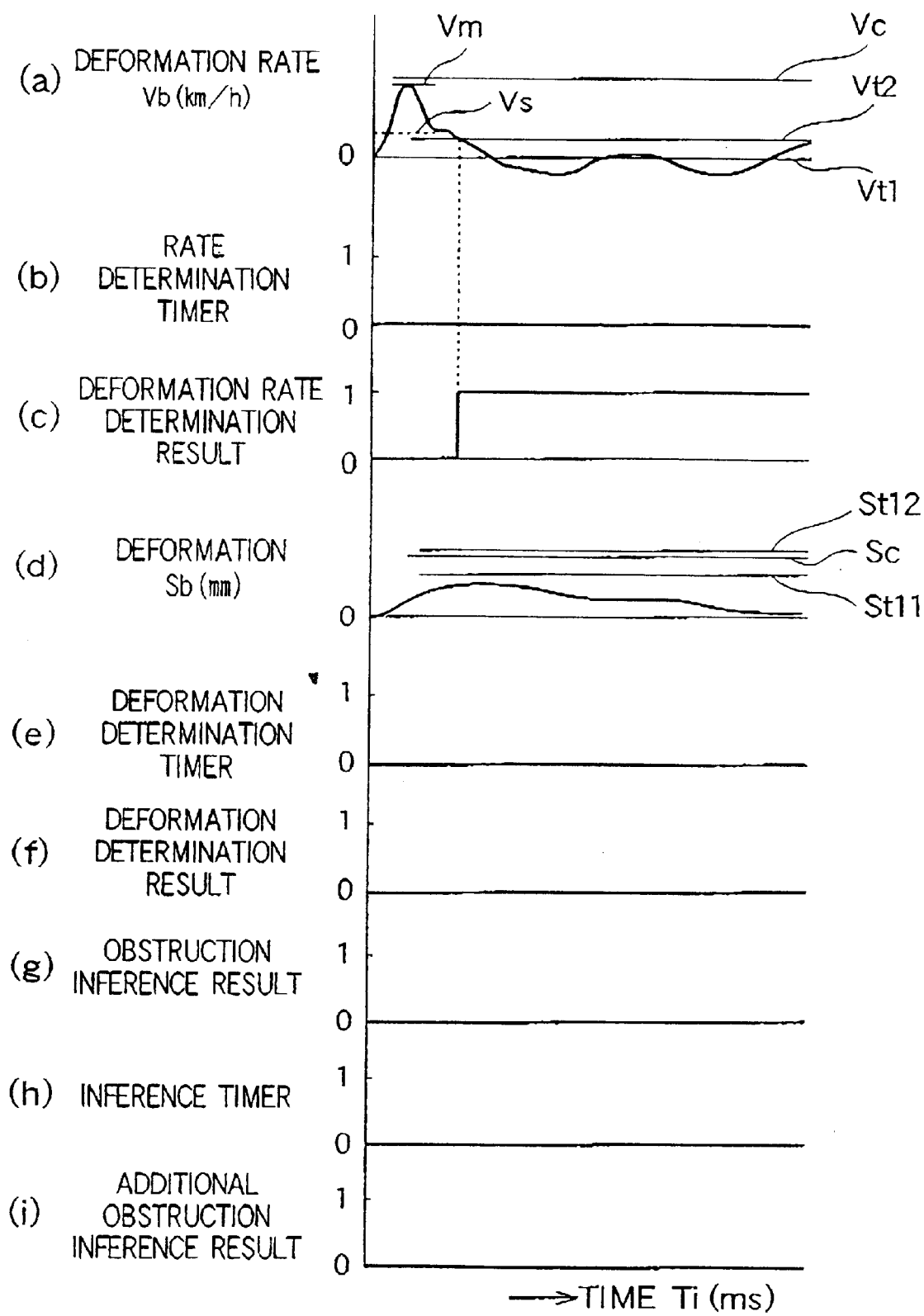
FIGS. 53A through 53I are bumper face deformation rate and deformation graphs pertaining to the fifth preferred embodiment of the invention.
Figure 54:
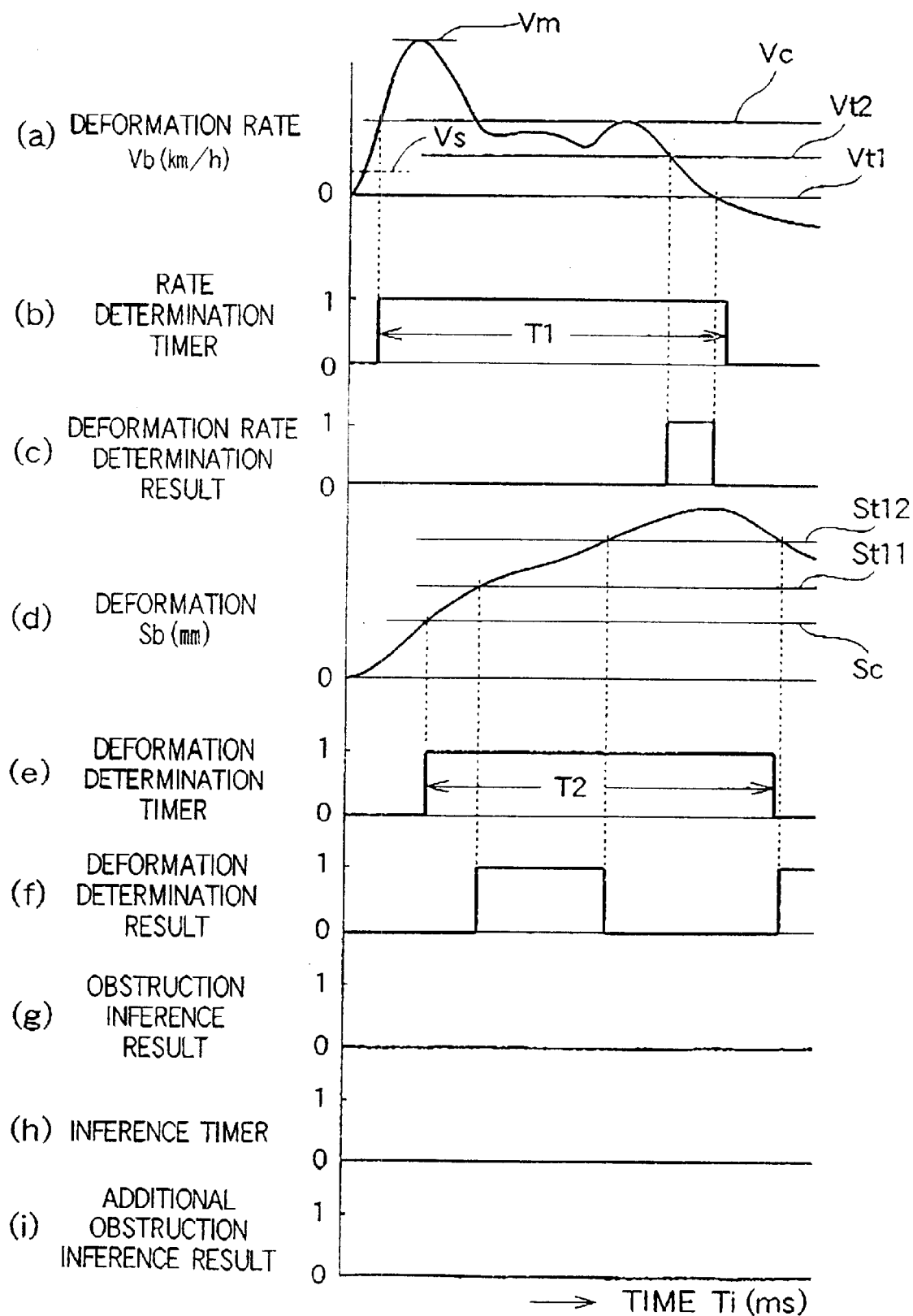
FIGS. 54A through 54I are bumper face deformation rate and deformation graphs pertaining to the fifth preferred embodiment of the invention.

FIG. 51 is a block diagram of an obstruction inference apparatus for a vehicle according to a fifth preferred embodiment.

The specific construction of the obstruction inference apparatus for a vehicle 40 of this fifth preferred embodiment differs from that of the variation of the fourth preferred embodiment shown in FIG. 44 in that the reference rate generating means 271 has been changed to two reference rate generating means 281, 282 and the acceleration determining means 274 and the acceleration determination timer 275 have been dispensed with; otherwise, the construction is substantially the same.

Specifically, the obstruction inference apparatus for a vehicle 40 of this fifth preferred embodiment has the following elements (1) through (16).

(1) A bumper face 42, constituting a deformable member.
(2) Deformation rate detecting means 251 (the same as the deformation rate detecting means 251 of the variation of the fourth preferred embodiment shown in FIG. 44).
(3) Deformation detecting means 252 (the same as the deformation detecting means 252 of the variation of the fourth preferred embodiment shown in FIG. 44).
(4) Maximum deformation rate updating means 255 (the same as the maximum deformation rate updating means 255 of the variation of the fourth preferred embodiment shown in FIG. 44; equipped with an updating timer 256).
(5) Rate determining means 261 (the same as the rate determining means 261 of the variation of the fourth preferred embodiment shown in FIG. 44) for determining that the deformation rate VB has exceeded a pre-set determination reference rate VC (third reference rate VC) different from the first and second reference rates VT1, VT2.
(6) A rate determination timer 262 (the same as the rate determination timer 262 of the variation of the fourth preferred embodiment shown in FIG. 44).
(7) Deformation determining means 263 (the same as the deformation determining means 263 of the variation of the fourth preferred embodiment shown in FIG. 44) for determining that the deformation SB has exceeded a pre-set determination reference deformation SC (third reference deformation SC) different from the first and second reference deformations St11, St12.
(8) A deformation determination timer 264 (the same as the deformation determination timer 264 of the variation of the fourth preferred embodiment shown in FIG. 44).
(9) First reference rate generating means 281, for setting as a first reference rate VT1 a value equivalent to a value obtained by multiplying the maximum deformation rate VM by a preset first rate constant smaller than 1.0.
(10) Second reference rate generating means 282, for setting as a second reference rate VT2 a value equivalent to a value obtained by multiplying the maximum deformation rate VM by a preset second rate constant smaller than 1.0 and larger than the first rate constant.
(11) First reference deformation generating means 283 (the same as the first reference deformation generating means 272 of the variation of the fourth preferred embodiment shown in FIG. 44).
(12) Second reference deformation generating means 284 (the same as the second reference deformation generating means 273 of the variation of the fourth preferred embodiment shown in FIG. 44).
(13) Inferring means 285, for inferring that an obstruction is a specified obstruction (for example a pedestrian) when the deformation rate VB is within the range of from the first reference rate VT1 to the second reference rate VT2 and the deformation SB is within the range of from the first reference deformation St11 to the second reference deformation St12.
(14) An inference timer 286, for holding an inference signal from the inferring means 285 for a preset time (the same as the inference timer 277 of the variation of the fourth preferred embodiment shown in FIG. 44).
(15) Additional inferring means 287, for additionally inferring that an obstruction (for example a pedestrian) is a specified obstruction when receiving signals from all of the rate determination timer 262, the deformation determination timer 264 and the inference timer 286 (the same as the additional inferring means 278 of the variation of the fourth preferred embodiment shown in FIG. 44).
(16) Inference signal generating means 288, for producing an inference signal si on the basis of an additional inference of the additional inferring means 287 (the same as the inference signal generating means 279 of the variation of the fourth preferred embodiment shown in FIG. 44).

As is clear from the foregoing description, the obstruction inference apparatus for a vehicle 40 of this fifth preferred embodiment holds the determination/inference signals from the means 261, 263 and 285 for a fixed time with the timers 262, 264 and 286. That is, the signals from the timers 262, 264 and 286 are mustered for a fixed time. This makes it possible for the additional inference of the additional inferring means 287 to be carried out more certainly.

When the additional inference of the additional inferring means 287 can be carried out certainly even if the determination/inference signals from the means 261, 263 and 285 are transmitted to the additional inferring means 287 directly, the timers 262, 264 and 286 are unnecessary.

The inference signal generating means 288 of this fifth preferred embodiment produces an inference signal si on the basis of the additional inference of the additional inferring means 287. The control part 44 of this fifth preferred embodiment has the above-mentioned means 253 through 256, 261 through 264 and 281 through 288.

FIGS. 52A through 52I are bumper face deformation rate and deformation graphs (1) pertaining to the obstruction inference apparatus for a vehicle of this fifth preferred embodiment and showing a case in which the obstruction is a specified obstruction such as a pedestrian. Reference will be made to FIG. 51 in the following explanation.

FIG. 52A shows change of the deformation rate VB of the bumper face having hit the specified obstruction, with time Ti (ms) on the horizontal axis and the deformation rate VB (km/h) of the bumper face on the vertical axis. VS, VM, VT1, and Vc Vt2 are defined as follows:

VS: inference start reference rate of VB (a value of almost immediately after impact, e.g. a value slightly above zero)

VM: maximum deformation rate value of VB

| | |
|---|---|
| Vt1 | first reference rate of VB (Vt0 = 0.0 × VM) |
| Vt2 | second reference rate of VB (Vt0 = 0.3 × VM) |

VC: determination reference rate

Here, 0.0 is a first rate constant and 0.3 is a second rate constant. And for example with the case of the obstruction being a specified obstruction as a reference, VC is in the relationship Vt2<VC<VM.

From FIG. 52A it can be seen that the deformation rate VB has the characteristic that it increases through the inference start reference rate VS and then rises above the determination reference rate VC and peaks at a maximum deformation rate VM before decreasing again to below the first reference rate VT1.

FIG. 52B shows the operation of the rate determination timer 262. The rate determination timer 262 holds the determination result '1' for an elapsed time T1 (a time equivalent to a reference time Ts1, which will be further discussed later) from when the deformation rate VB rises above the determination reference rate VC.

FIG. 52C shows a deformation rate determination result. The determination result is '1' only when the deformation rate VB is within the range between Vt1 and Vt2.

FIG. 52D shows change of the deformation of the bumper face having hit the specified obstruction, with time Ti (ms) on the horizontal axis and the deformation SB (mm) on the vertical axis. The deformation of the bumper face is a value calculated on the basis of the deformation rate VB shown in FIG. 52B. St11, St12 and SC are defined as follows:

| St11 | first reference deformation of SB (St11 = 1.0 × VM) |
| St12 | second reference deformation of SB (St12 = 1.5 × VM) |

SC: determination reference deformation

Here, 1.0 and 1.5 are first and second deformation constants for when the units of the deformation rate VB are km/h and the units of the deformation SB are mm. And for example with the case of the obstruction being a specified obstruction as a reference, SC is in the relationship SC<St11.

From FIG. 52D it can be seen that the deformation SB rises above the determination reference deformation SC in the course of increasing.

FIG. 52E shows the operation of the deformation determination timer 264. The deformation determination timer 264 holds the determination result '1' for an elapsed time T2 (a time equivalent to a reference time Ts2, which will be further discussed later) from when the deformation SB rises above the determination reference deformation SC.

FIG. 52F shows a deformation determination result. The determination result is '1' only when the deformation SB is within the range of from St11 to St12.

FIG. 52G shows an obstruction inference result based on the logical product of the determination result of FIG. 52C and the determination result of FIG. 52F. When the determination results of FIG. 52C and FIG. 52F are both '1' the obstruction inference result is '1' and it is inferred that the obstruction is a specified obstruction.

FIG. 52H shows the operation of the inference timer 286. The inference timer 286 holds the inference result '1' for an elapsed time T3 (a time equivalent to a reference time Ts3 which will be further discussed later) from when in FIG. 52G the obstruction inference result becomes '1'.

FIG. 52I shows the additional obstruction inference result of the additional inferring means 287. When the determination results of FIGS. 52B, 52E and 52H are all '1', the additional obstruction inference result is '1' and it is additionally inferred that the obstruction is a specified obstruction. That is, it can be inferred at the time Tf3 that the obstruction is a specified obstruction.

As mentioned above, the determination reference rate VC is an absolute value for setting the operation start time of the rate determination timer 262 in FIG. 52B. This determination reference rate VC is a value smaller than the maximum deformation rate VM of when the obstruction is a specified obstruction and larger than the maximum deformation rate VM of when the obstruction is a light object.

The determination reference deformation SC of FIG. 52D is an absolute value for setting the operation start time of the deformation determination timer 264 in FIG. 52E. This determination reference deformation SC is a value smaller than the first reference deformation St11 of when the obstruction is a specified obstruction and larger than the first reference deformation St11 of when the obstruction is a light object.

By VC and SC being set like this, the rate determination timer 262 and the deformation determination timer 264 are made to operate when the obstruction is a specified obstruction and to not operate when the obstruction is a light object.

FIGS. 53A through 53I are bumper face deformation rate and deformation graphs (2) pertaining to the obstruction inference apparatus for a vehicle of this fifth preferred embodiment and showing a case in which the obstruction is a light object. The graphs are to be viewed in the same way as FIGS. 52A through 52I, and the reference numerals have the same definitions. Reference will be made to FIG. 51 in the following explanation.

FIG. 53A shows change of the deformation rate VB of the bumper face having hit the light object.

FIG. 53B shows the operation of the rate determination timer 262. Because the deformation rate VB does not rise above the determination reference rate VC, the determination result is '0'.

FIG. 53C shows a deformation rate determination result. The determination result is '1' only when the deformation rate VB is within the range of from VT1 to Vt2.

FIG. 53D shows change of the deformation of the bumper face having hit the light object. It can be seen that the deformation SB does not rise above either of the first and second reference deformations St11, St12 or the determination reference deformation SC.

FIG. 53E shows the operation of the deformation determination timer 264. Because the deformation SB does not rise above the determination reference deformation SC, the determination result is '0'.

FIG. 53F shows a deformation determination result. Because the deformation SB is not within the range between St11 and St12, the determination result is '0'.

FIG. 53G shows the obstruction inference result. Because the determination result of FIG. 53F is '0', the obstruction inference result is '0' and it is inferred that the obstruction is not a specified obstruction.

FIG. 53H shows the operation of the inference timer 286. The determination result is '0'.

FIG. 53I shows the additional obstruction inference result of the additional inferring means 287. Because the determination results of FIGS. 53B, 53E and 53H are all '0', the additional obstruction inference result is '0' and it is additionally inferred that the obstruction is not a specified obstruction.

FIGS. 54A through 54I are bumper face deformation rate and deformation graphs (3) pertaining to the obstruction inference apparatus for a vehicle of this fifth preferred embodiment and showing a case in which the obstruction is a low-center-of-gravity obstruction S2. The graphs are to be viewed in the same way as FIGS. 52A through 52I, and the reference numerals have the same definitions. Reference will be made to FIG. 51 in the following explanation.

FIG. 54A shows change of the deformation rate VB of the bumper face having hit the low-center-of-gravity obstruction S2. It can be seen that the deformation rate VB rises above the determination reference rate VC in the course of increasing to the maximum deformation rate VM.

FIG. 54B shows the operation of the rate determination timer 262. The rate determination timer 262 holds the determination result '1' for an elapsed time T1 from when the deformation rate VB rises above the determination reference rate VC.

FIG. 54C shows a deformation rate determination result. The determination result is '1' only when the deformation rate VB is within the range between VT1 and Vt2.

FIG. 54D shows change of the deformation of the bumper face having hit the low-center-of-gravity obstruction S2. It can be seen that the deformation SB rises above the determination reference deformation SC in the course of increasing.

FIG. 54E shows the operation of the deformation determination timer 264. The deformation determination timer 264 holds the determination result '1' for an elapsed time T2 from when the deformation SB rises above the determination reference deformation SC.

FIG. 54F shows a deformation determination result. The determination result is '1' only when the deformation SB is within the range between St11 and St12.

FIG. 54G shows the obstruction inference result. Because when the determination result of FIG. 54C is '1' the determination result of FIG. 54F is '0', the obstruction inference result is '0' and it is inferred that the obstruction is not a specified obstruction.

FIG. 54H shows the operation of the inference timer 286. The determination result is '0'.

FIG. 54I shows the additional obstruction inference result of the additional inferring means 287. Because the determination result of FIG. 54H is '0', the additional obstruction inference result is '0' and it is inferred that the obstruction is not a specified obstruction.

Next, the control flow of the control part 44 of the fifth preferred embodiment will be described, on the basis of FIGS. 55 through 57 and with reference to FIG. 51.

Figure 55:
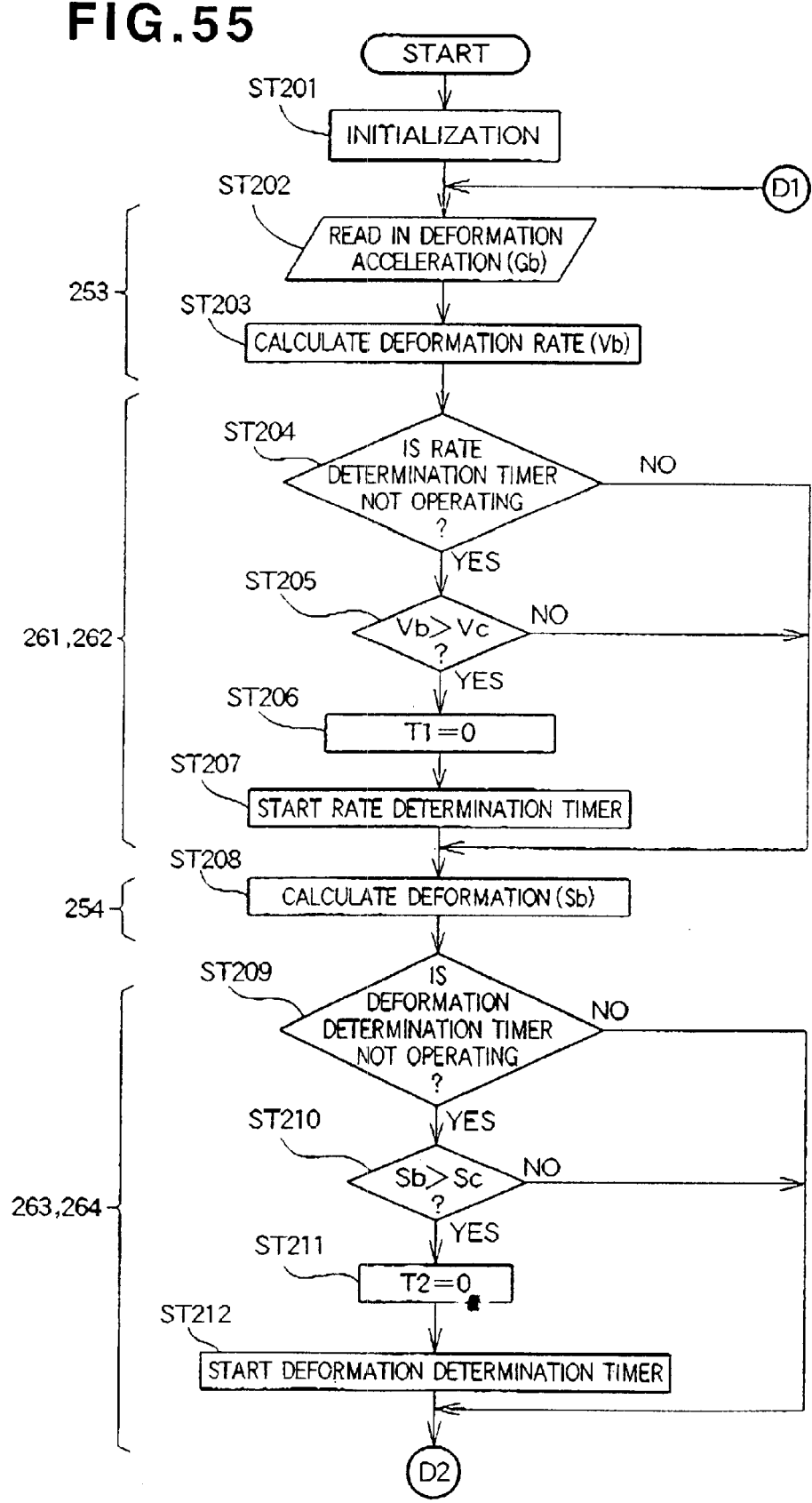
FIG. 55 is a control flow chart of a control part of the fifth preferred embodiment of the invention.

FIG. 55 is a control flow chart (1) of the control part of the fifth preferred embodiment.

ST201: All values are initialized (maximum deformation rate VM=0, F=0).

ST202: The deformation acceleration GB of the bumper face 42 detected by the bumper sensor 43 is read in.

ST203: The deformation rate VP of the bumper face 42 is calculated from the deformation acceleration GB. For example, the deformation rate VB is obtained by integrating the deformation acceleration GB.

ST204: It is determined whether or not the rate determination timer 262 is non-operating, and if YES then processing proceeds to ST205 and if NO then processing proceeds to ST208.

ST205: It is determined whether or not the deformation rate VB has risen above the determination reference rate VC, and if YES then processing proceeds to ST206 and if NO then processing proceeds to ST208.

ST206: The elapsed time T1 of the rate determination timer 262 is reset.

ST207: The rate determination timer 262 is started.

ST208: The deformation SB of the bumper face 42 is calculated for example by integration from the deformation rate VB. For example, the deformation SB is obtained by multiplying the deformation rate VB by a time interval over which it is detected by the bumper sensor 43 and integrating this product.

ST209: It is determined whether or not the deformation determination timer 264 is non-operating, and if YES then processing proceeds to ST210 and if NO then processing proceeds to the out-connector D2.

ST210: It is determined whether or not the deformation SB has risen above the determination reference deformation SC, and if YES then processing proceeds to ST211 and if NO then processing proceeds to the out-connector D2.

ST211: The elapsed time T2 of the deformation determination timer 264 is reset.

ST212: The deformation determination timer 264 is started and processing proceeds to the out-connector D2.

Figure 56:
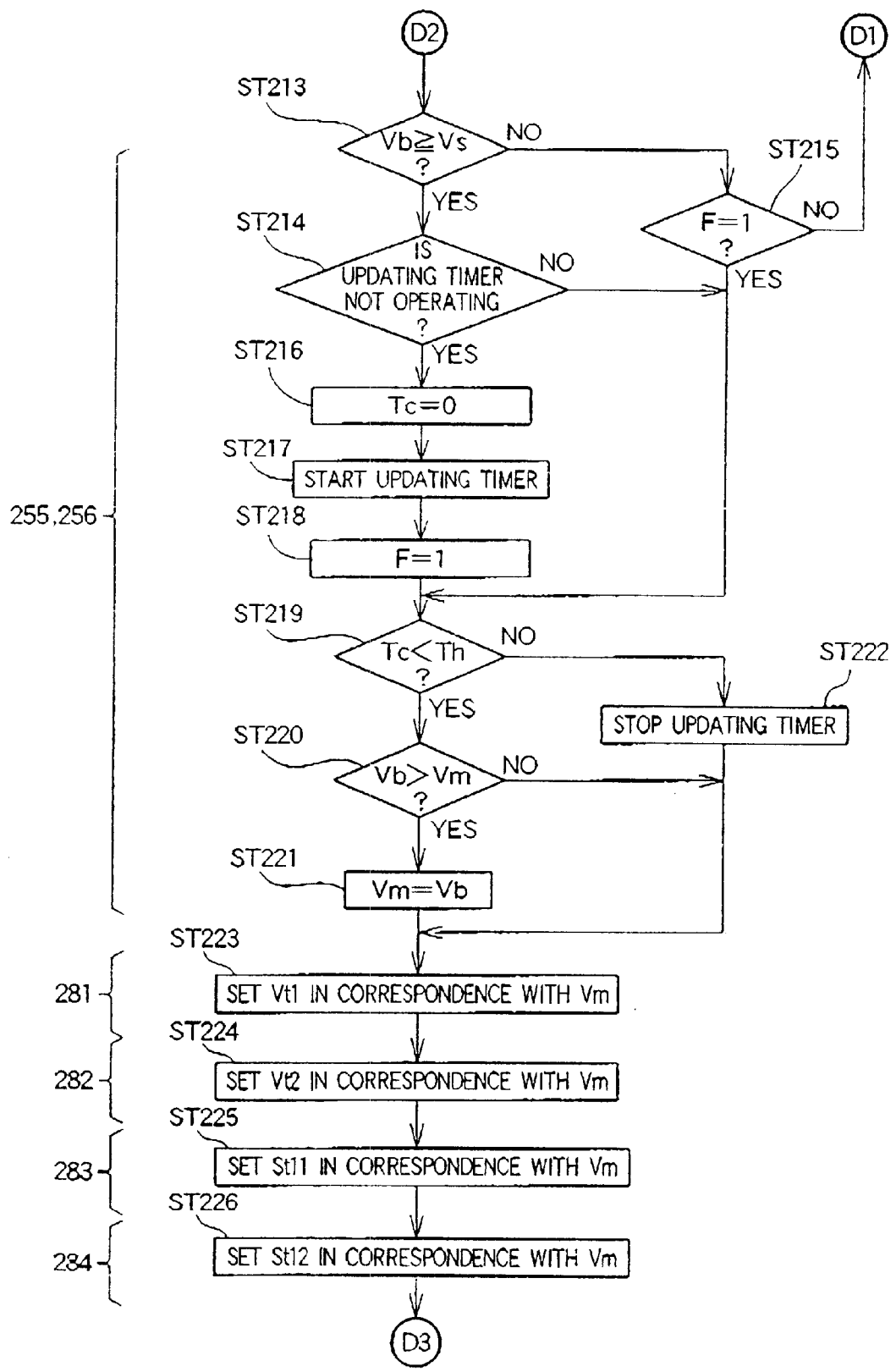
FIG. 56 is a control flow chart of a control part of the fifth preferred embodiment of the invention.

FIG. 56 is a control flow chart (2) of the control part of the fifth preferred embodiment, and shows processing having proceeded from ST212 of FIG. 55 via the out-connector D2 and the in-connector D2 of this figure to ST213.

ST213: It is determined whether or not the deformation rate VB has reached a preset small inference start reference rate VS, and if YES then processing proceeds to ST214 and if NO then processing proceeds to ST215.

ST214: It is determined whether or not the updating timer 256 is non-operating, and if YES then processing proceeds to ST216 and if NO processing proceeds to ST219.

ST215: It is determined whether or not the flag F=1, and if YES then processing proceeds to ST219 and if NO then processing proceeds via the out-connector D1 and the in-connector D1 of FIG. 55 to ST202.

ST216: The elapsed time TC of the updating timer 256 is reset.

ST217: The updating timer 256 is started.

ST218: The flag F is set to '1'.

ST219: It is determined whether or not the elapsed time TC from when the updating timer 256 started has not reached a predetermined reference time TH, and if YES then processing proceeds to ST220 and if NO then processing proceeds to ST222.

ST220: It is determined whether or not the deformation rate VB is larger than a previous maximum deformation rate VM detected earlier, and if YES then processing proceeds to ST221 and if NO then processing proceeds to ST223.

ST221: The deformation rate VB is set as the maximum deformation rate VM and processing proceeds to ST223.

ST222: The updating timer 256 is stopped and processing proceeds to ST223.

ST223: A first reference rate VT1 is set in correspondence with the maximum deformation rate VM. Specifically, a value obtained by multiplying the maximum deformation rate VM by a preset first rate constant CV1 smaller than 1.0 is set as the first reference rate VT1 (VT1=VM×CV1). The first reference rate CV1 is set for example to 0.0.

ST224: A second reference rate VT2 is set in correspondence with the maximum deformation rate VM. Specifically, a value obtained by multiplying the maximum deformation rate VM by a preset second rate constant CV2 smaller than 1.0 but larger than the first rate constant CV1 is set as the second reference rate VT2 (VT2=VM×CV2) The second reference rate CV2 is set for example to 0.3.

ST225: A first reference deformation St11 is set in correspondence with the maximum deformation rate VM. Specifically, a value obtained by multiplying the maximum deformation rate VM by a preset first deformation constant CS11 is set as the first reference deformation St11 (St11=VM×CS11).

ST226: A second reference deformation St12 is set in correspondence with the maximum deformation rate VM. Specifically, a value obtained by multiplying the maximum deformation rate VM by a preset second deformation constant CS12 larger than the first deformation constant CS11 is set as the second reference deformation St12 (St12=VM×CS12). Processing then proceeds to the out-connector D3.

When the units of the deformation rate VB are km/h and the units of the deformation SB are mm, the first deformation constant CS11 is set for example to 1.0 and the second deformation constant CS12 is set for example to 1.5.

Figure 57:
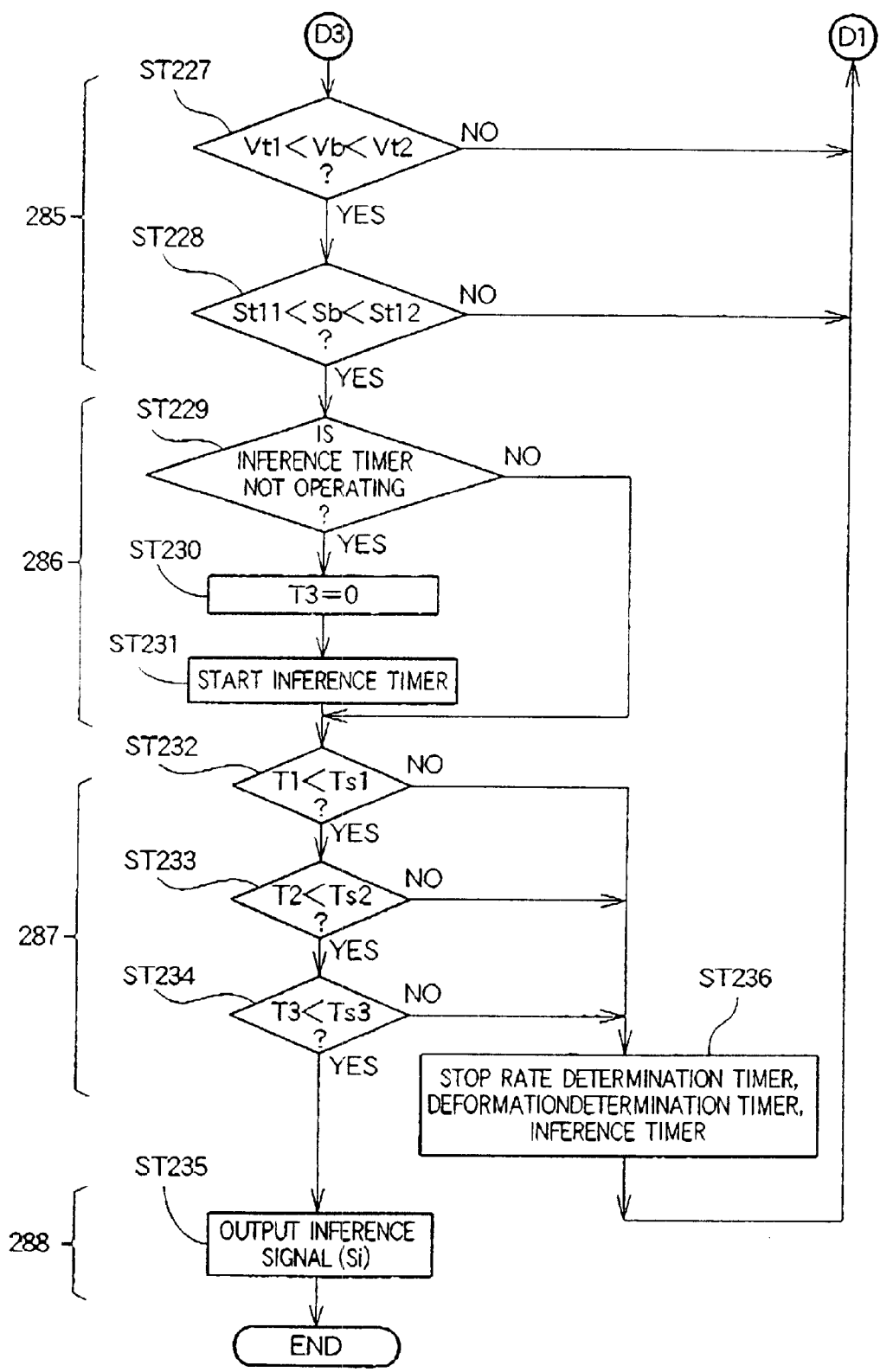
FIG. 57 is a control flow chart of a control part of the fifth preferred embodiment of the invention.

FIG. 57 is a control flow chart (3) of the control part of the fifth preferred embodiment, and shows processing having proceeded from ST226 of FIG. 56 via the out-connector D3 and the in-connector D3 of this figure to ST227.

ST227: It is determined whether or not the deformation rate VB is within the range of from the first reference rate VT1 to the second reference rate VT2, and if YES then processing proceeds to ST228 and if NO then processing returns via the out-connector D1 and the in-connector D1 of FIG. 55 to ST202.

ST228: It is determined whether or not the deformation SB is within the range of from the first reference deformation St11 to the second reference deformation St12, and if YES then processing proceeds to ST229 and if NO then processing returns via the out-connector D1 and the in-connector D1 of FIG. 55 to ST202.

ST229: It is determined whether or not the inference timer 286 is non-operating, and if YES then processing proceeds to ST230 and if NO then processing proceeds to ST232.

ST230: The elapsed time T3 of the inference timer 286 is reset.

ST231: The inference timer 286 is started.

ST232: It is determined whether or not the elapsed time T1 from when the rate determination timer 262 started has not reached a predetermined reference time Ts1, and if YES then processing proceeds to ST233 and if NO then processing proceeds to ST236.

ST233: It is determined whether or not the elapsed time T2 from when the deformation determination timer 264 started has not reached a predetermined reference time Ts2, and if YES then processing proceeds to ST234 and if NO then processing proceeds to ST236.

ST234: It is determined whether or not the elapsed time T3 from when the inference timer 286 started has not reached a predetermined reference time Ts3, and if YES then processing proceeds to ST235 and if NO then processing proceeds to ST236.

ST235: It is inferred that the obstruction S1 which the vehicle 11 has hit shown in FIG. 4 is a specified obstruction; an inference signal si (for example, an actuator drive command signal si) is produced, and control ends.

ST236: The rate determination timer 262, the deformation determination timer 264 and the inference timer 286 are stopped and processing returns via the out-connector D1 and the in-connector D1 of FIG. 55 to ST202.

With the combination of ST213, ST215 and ST218, inferring of the type of the obstruction S1 (see FIG. 4) is started when the deformation rate VB first reaches the preset inference start reference rate VS. When the deformation rate VB once reaches the inference start reference rate VS, inferring of the type of the obstruction S1 can be continued irrespective of the size of the deformation rate VB thereafter.

With the combination of steps ST213 through ST222, in the time between the deformation rate VB reaching the inference start reference rate VS and the reference time TH being reached, by the maximum deformation rate VM being updated to the largest value as the deformation rate VB increases, it is possible to set a maximum deformation rate VM which corresponds with the type of the obstruction S1.

The reference time TH is a time set to remove any setting of the maximum deformation rate VM based on a noisy deformation acceleration GB caused by vibration during travel or an excessive deformation acceleration GB which affects the proper control of the control part 44, and is for example 500 ms.

Here, the relationships between the constituent elements of the obstruction inference apparatus for a vehicle 40 shown in FIG. 51 and the steps of the control part 44 shown in FIG. 55 trough FIG. 57 will be explained.

ST202 and ST203 correspond to the deformation rate calculating means 253. ST205 corresponds to the rate determining means 261. The combination of ST204, ST206 and ST207 corresponds to the rate determination timer 262. ST208 corresponds to the deformation calculating means 254. ST210 corresponds to the deformation determining means 263. The combination of ST209, ST211 and ST212 corresponds to the deformation determining timer 264. The combination of ST213 through ST222 corresponds to the maximum deformation rate updating means 255 and the updating timer 256. ST223 corresponds to the first reference rate generating means 281. ST224 corresponds to the second reference rate generating means 282. ST225 corresponds to the first reference deformation generating means 283. ST226 corresponds to the second reference deformation generating means 284. The combination of ST227 and ST228 corresponds to the inferring means 285. The combination of ST229 through ST231 corresponds to the inference timer 286. The combination of ST232 through ST234 corresponds to the additional inferring means 287. ST235 corresponds to the inference signal generating means 288.

The foregoing explanation will now be summarized.

As is clear also from FIGS. 52A through 53I, generally, the deformation rate VB and the deformation SB of the bumper face 42 have the characteristic that they become larger the heavier the obstruction is that is hit. For example, when a specified obstruction such as a pedestrian is hit, compared to a case where a lighter object than this is hit, the deformation rate VB and the deformation SB are larger.

In other words, generally, the lighter the obstruction is the shorter is the time taken for the deformation rate VB to return to zero after reaching a peak, from the collision start time. And the lighter the obstruction is, because the shorter is the time taken for the deformation rate VB to reach zero, the shorter the deformation time is also. As a result, the ratio of the maximum value of the deformation SB to the maximum value VM of the deformation rate VB, compared to the case of a specified obstruction such as a pedestrian, is smaller with a lighter obstruction.

As shown in FIG. 5, when the vehicle 11 hits a low-center-of-gravity obstruction S2 such as a small animal which gets caught in the underside of the vehicle 11, the bumper face 42 deforms so as to be pulled to the lower side of the vehicle 11 and rearward. As shown in FIG. 54A, in this case the time taken from the time of impact for the deformation rate VB of the bumper face 42 to reach a peak and then return to zero is long compared to a case in which the obstruction is a specified obstruction such as a pedestrian. This can be understood by contrasting FIG. 52A with FIG. 54A.

As is clear from the foregoing description, when the deformation rate VB is in the course of decreasing after reaching its peak, the characteristic of the deformation SB differs in correspondence with the type of the obstruction.

The obstruction inference apparatus for a vehicle 40 of the fifth preferred embodiment shown in FIG. 51 utilizes this characteristic: it detects the deformation rate VB and the deformation SB of the bumper face 42 when the vehicle has hit an obstruction S1; obtains the maximum deformation rate VM, of when the deformation rate VB reaches its peak; sets a range of from a first reference rate Vt1 to a second reference rate Vt2 and a range of from a first reference deformation St11 to a second reference deformation St12 on the basis of this maximum deformation rate VM; and when the deformation rate VB is within the range between the first reference rate VT1 and the second reference rate VT2 and also the deformation SB is within the range between the first reference deformation St11 and the second reference deformation St12, infers that the obstruction S1 which has been hit is a specified obstruction.

Accordingly, a light object or a low-center-of-gravity obstruction S2 is not erroneously inferred to be a specified obstruction. And thus the type of the obstruction S1 can be inferred more exactly. Furthermore, the time needed for inferring the type of the obstruction S1 is extremely short.

And, because values equivalent to values obtained by multiplying the maximum deformation rate VM, which differs according to the type of the obstruction S1, with predetermined constants are set as the first and second reference rates VT1, VT2 and the first and second reference deformations St11, St12, the type of the obstruction can be inferred exactly, irrespective of the impact speed at which the obstruction is hit.

And this obstruction inference apparatus for a vehicle 40 has the rate determining means 261 and the deformation determining means 263. The values of the determination reference rate VC and the determination reference deformation SC should be set to optimal values which make it possible to distinguish between a case of hitting a specified obstruction S1 such as a pedestrian and a case of hitting a lighter obstruction than this.

Because the type of the obstruction S1 is additionally inferred by the additional inferring means 287 on the basis of the inference result of the inferring means 285 and the determination result of the rate determining means 261, it is possible to infer the type of an obstruction more exactly.

And also because the type of the obstruction S1 is further additionally inferred by the additional inferring means 287 on the basis of the inference result of the inferring means 285 and the determination result of the deformation determining means 263, it is possible to infer the type of an obstruction S1 more exactly.

And also because the type of the obstruction S1 is further additionally inferred by the additional inferring means 287 on the basis of the inference result of the inferring means 285, the determination result of the rate determining means 261 and the determination result of the deformation determining means 263, it is possible to infer the type of an obstruction S1 still more exactly.

Figures 58A, 58B:
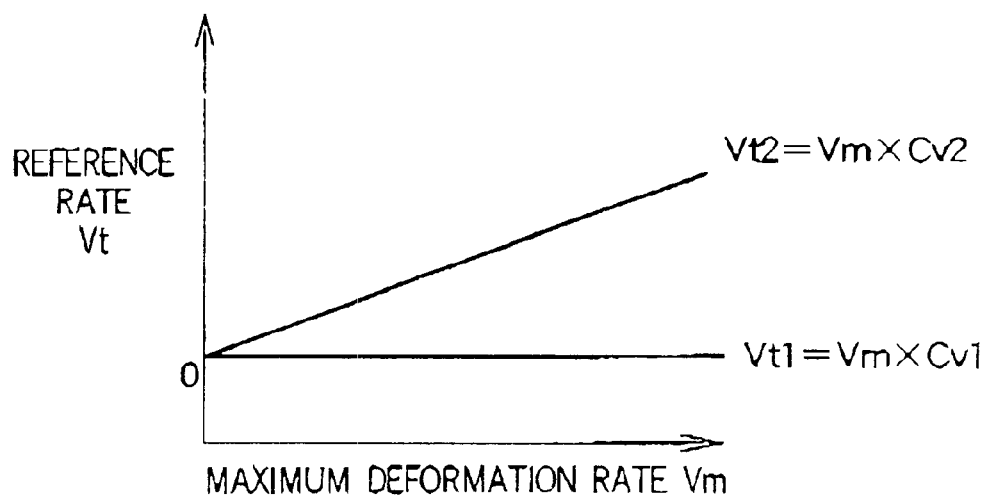
FIGS. 58A and 58B are views illustrating the setting of a reference rate of a control part of the fifth preferred embodiment of the invention.

In ST223 and ST224, VT1 and Vt2 can be set by referring to a map shown in FIG. 58A or FIG. 58B in correspondence with the maximum deformation rate VM.

And in ST225 and ST226, a map of the fourth preferred embodiment shown in FIG. 43B can be used. The first and second reference deformations St11 and St12 can be set by providing the map of FIG. 43A or FIG. 43B in memory of the control part 44 in advance and referring to the map in correspondence with the maximum deformation rate VM in steps ST225 and ST226.

FIG. 58A is a maximum deformation rate VM—reference rate VT correspondence map with the maximum deformation rate VM on the horizontal axis and a reference rate VT on the vertical axis, and shows first and second reference rates VT1, VT2 which change in correspondence with the maximum deformation rate VM. The line VT1 is based on the formula 'first reference rate VT1=VM×CV1', and the line VT2 is based on the formula 'second reference rate VT2=VM×CV2'.

FIG. 58B is a map in the form of a table prepared on the basis of FIG. 58A, and again shows first and second reference rates VT1, VT2 which change in correspondence with the maximum deformation rate VM.

The first and second reference rates VT1, VT2 can be set by providing a map in memory of the control part 44 (see FIG. 51) in advance like this and referring to the map in correspondence with the maximum deformation rate VM in the above-mentioned steps ST223 and ST224. The first and second reference rates VT1, VT2 set by referring to a map are values equivalent to values obtained using the formulas of FIG. 58A.

Next, the operation of a secondary collision countermeasure apparatus 10 equipped with an obstruction inference apparatus for a vehicle 40 according to any of the foregoing preferred embodiments will be described, on the basis of FIGS. 59 through 62.

Figure 59:
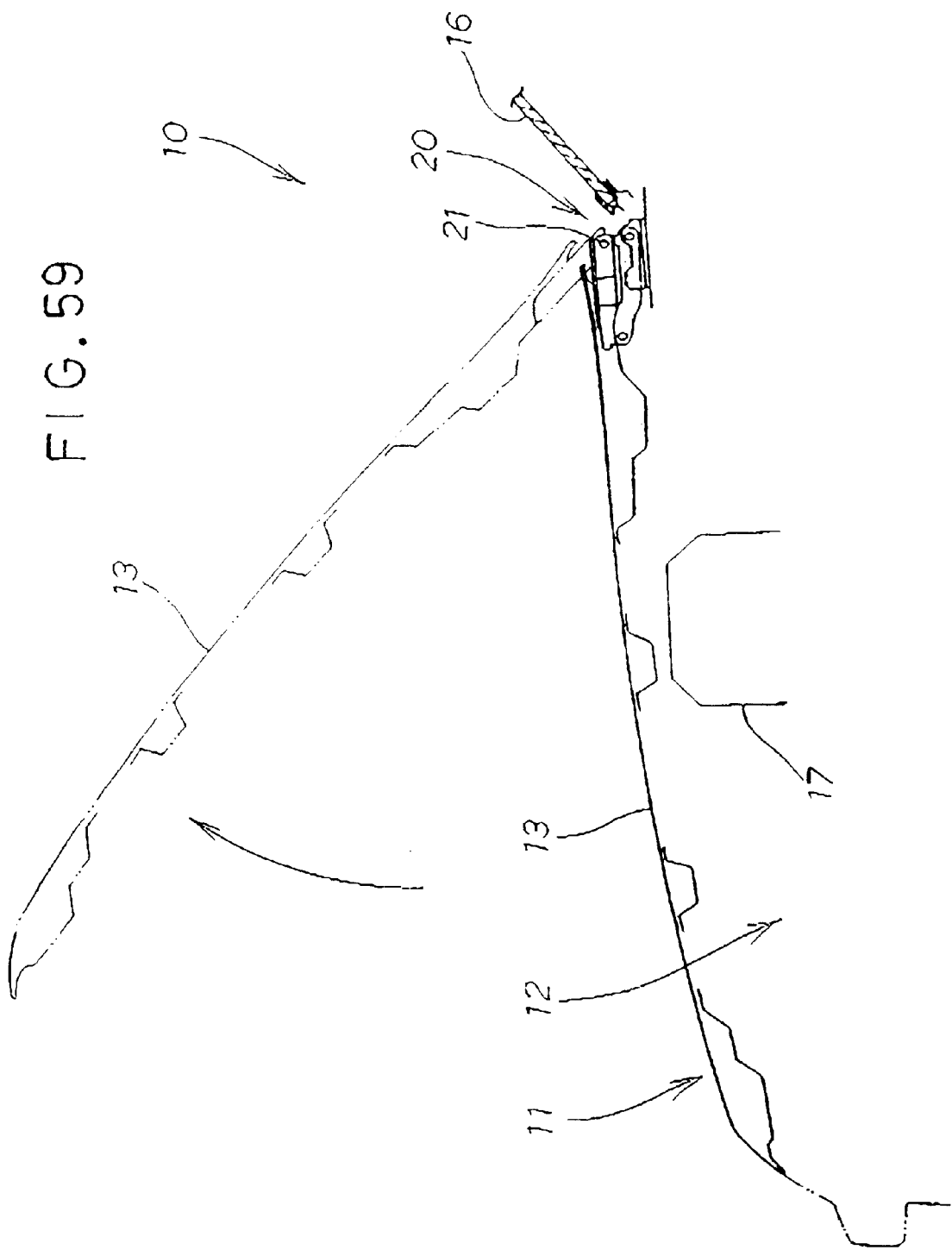
FIG. 59 is a view showing the normal, closed state of a hood of an engine compartment of the invention.

FIG. 59 shows a normal state wherein the hood 13 has been lowered to close the engine compartment 12 and the hood holding mechanisms 20 are folded.

The hood 13 pivots to open and close on pins 21. The hood 13 can be opened as shown by the broken lines for maintenance and inspection of devices 17 housed in the engine compartment 12.

Figure 60:
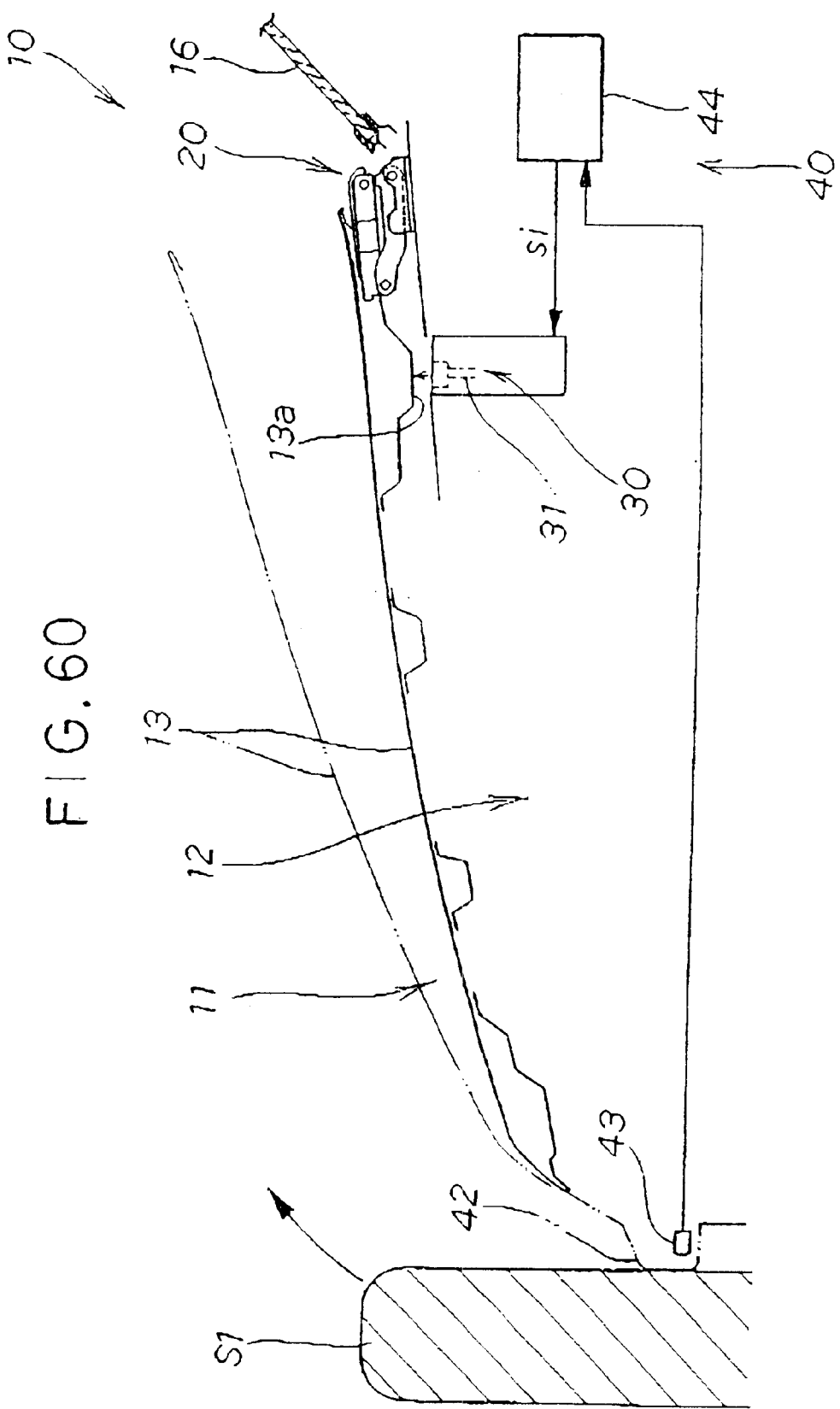
FIG. 60 is a view illustrating the operation of a secondary collision countermeasure apparatus when the vehicle has hit an obstruction.

FIG. 60 illustrates the operation of the secondary collision countermeasure apparatus 10 when the vehicle 11 hits an obstruction S1.

When the vehicle 11 hits an obstruction S1, when the control part 44 infers that the obstruction S1 is a specified obstruction, it outputs an inference signal si (an actuator drive command signal) to the actuators 30. The actuators 30 commence a lifting action, and by protruding the pistons 31 at high speed they spring up the rear end 13a of the hood 13.

Figure 61:
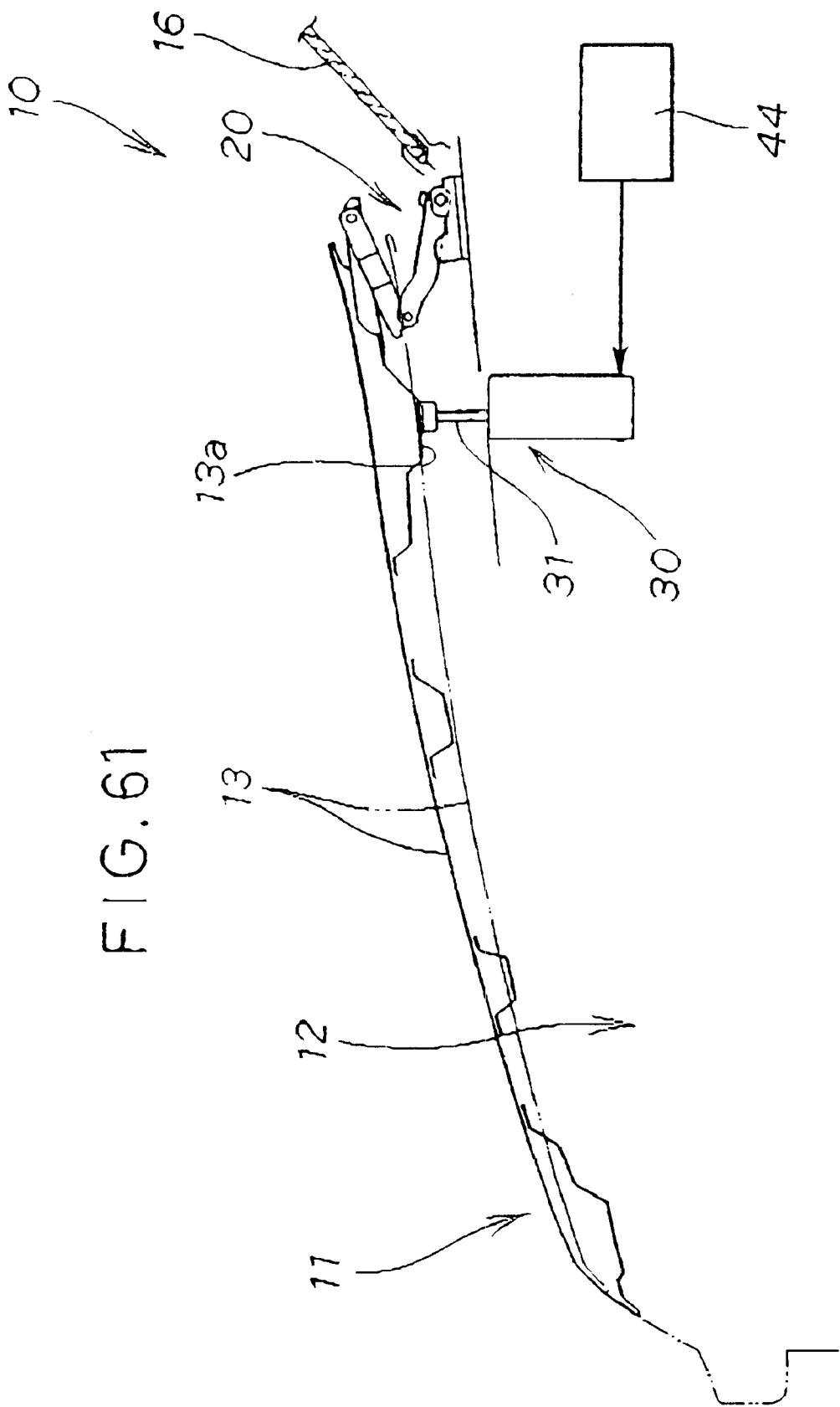
FIG. 61 is a view showing the state of a hood having been thrown up by a piston projecting at high speed to a predetermined maximum height.

FIG. 61 shows the hood 13 having been sprung up from its original height, shown with broken lines, to a height shown with solid lines, by the pistons 31 being protruded at high speed to a predetermined maximum height. The hood 13 rises further under its own momentum. As the hood 13 rises, the hood holding mechanisms 20 also stand up.

Figure 62:
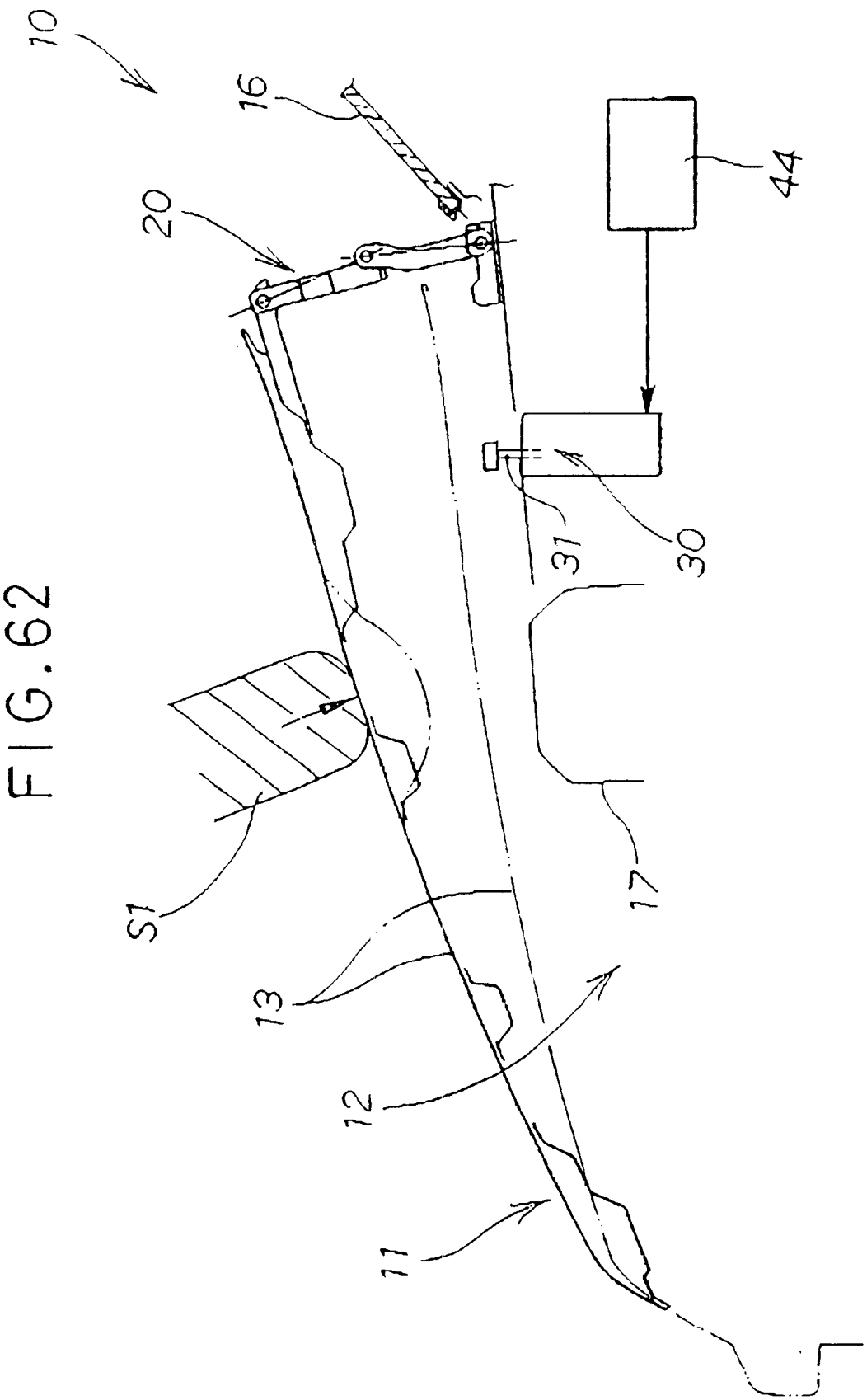
FIG. 62 is a view showing the state of a hood holding mechanism holding the hood at a fully-open angle.

FIG. 62 shows the hood holding mechanisms 20 having reached their fully-open positions and stopped further swinging-up of the hood 13. The hood 13 cannot rise any further than this. As a result, the rear part of the hood 13 has been lifted by a predetermined amount (100 to 200 mm) from the position shown with broken lines to the position shown with solid lines. The hood holding mechanisms 20 hold the hood 13 in this raised position.

The distance from the hood 13 thus raised by a predetermined amount to the engine and other devices 17 housed in the engine compartment 12 is large. As a result, the amount by which the hood 13 can deform downward is increased. Because of this, when the obstruction S1 which the vehicle 11 has hit strikes the hood 13, the force of the impact is absorbed well by the raised hood 13 deforming greatly as shown by a broken line. Consequently, the devices 17 are protected from the obstruction S1 and the impact on the obstruction S1 is also well moderated.

To summarize the foregoing description, the obstruction inference apparatus for a vehicle 40, when it infers that an obstruction S1 which has been hit by the vehicle 11 is a specified obstruction, outputs an inference signal si from its control part 44 to the secondary collision countermeasure apparatus 10. On receiving the inference signal si, the secondary collision countermeasure apparatus 10 accurately and rapidly deploys a secondary collision countermeasure by raising the hood 13. The hood 13 absorbs impact forces to the devices 17 and the obstruction S1.

Next, a vehicle 11 equipped with an obstruction inference apparatus for a vehicle 300 pertaining to a modified application of the invention will be described, on the basis of FIG. 63. Parts the same as in the first preferred embodiment of FIGS. 1 through 5 have been given the same reference numerals in FIG. 63 and will not be described again here.

Figure 63:
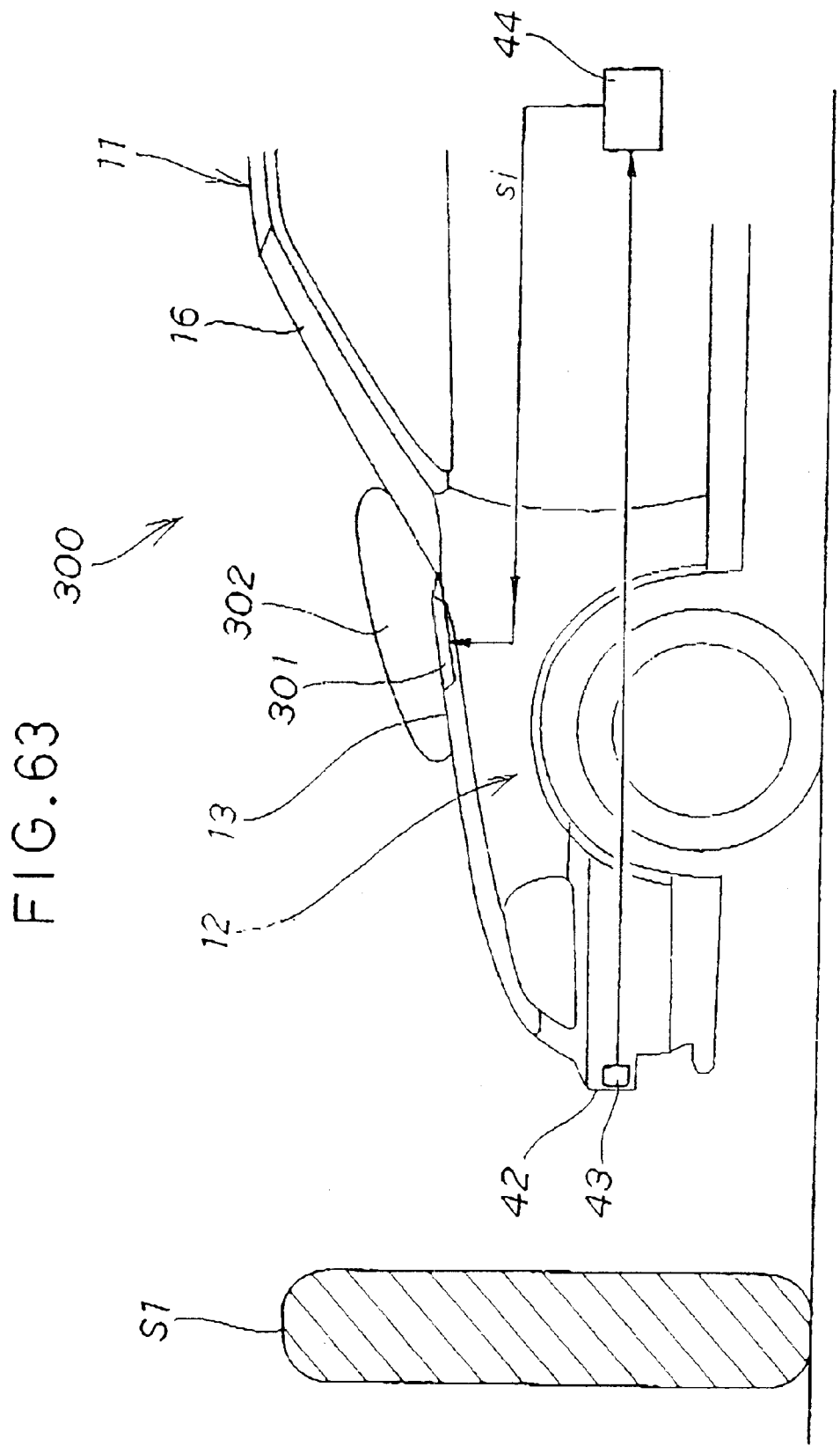
FIG. 63 is a system diagram of a secondary collision countermeasure apparatus pertaining to an alternative application example of the invention.
Figure 64:
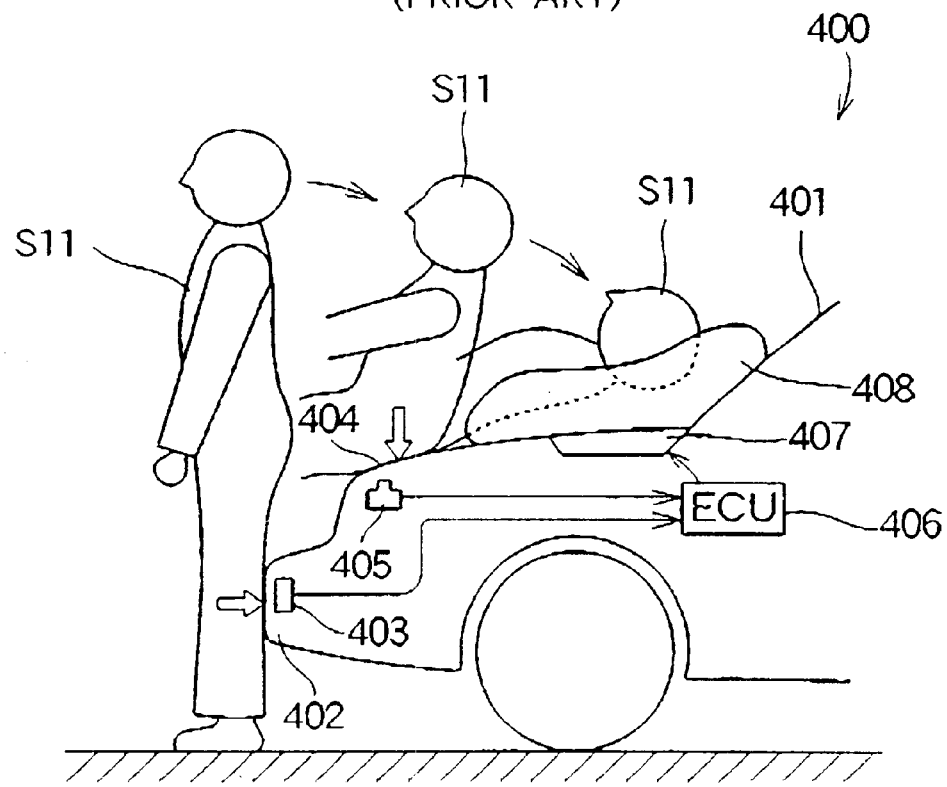
FIG. 64 is a side view of a conventional vehicle equipped with a hood air bag sensor system.
Figure 65:
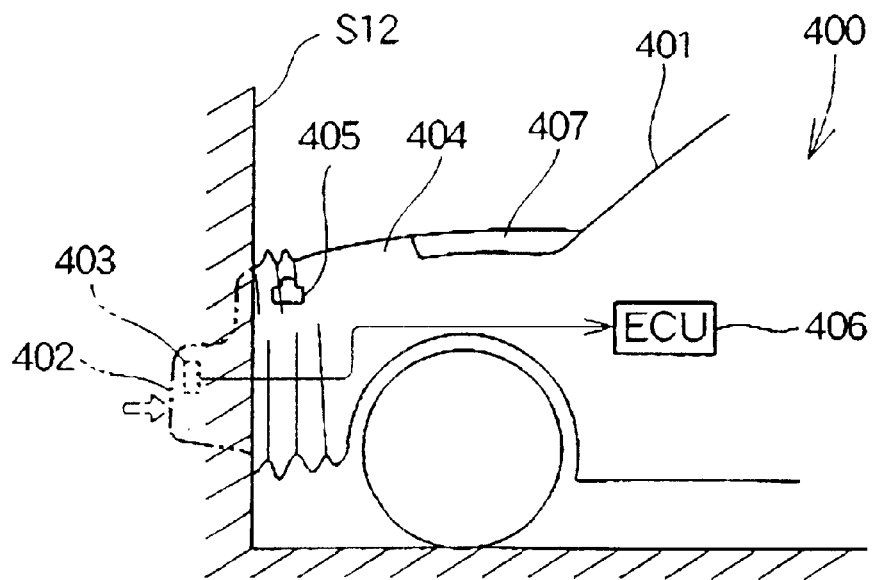
FIG. 65 is a side view showing the conventional vehicle having hit an obstruction.
Figure 66:
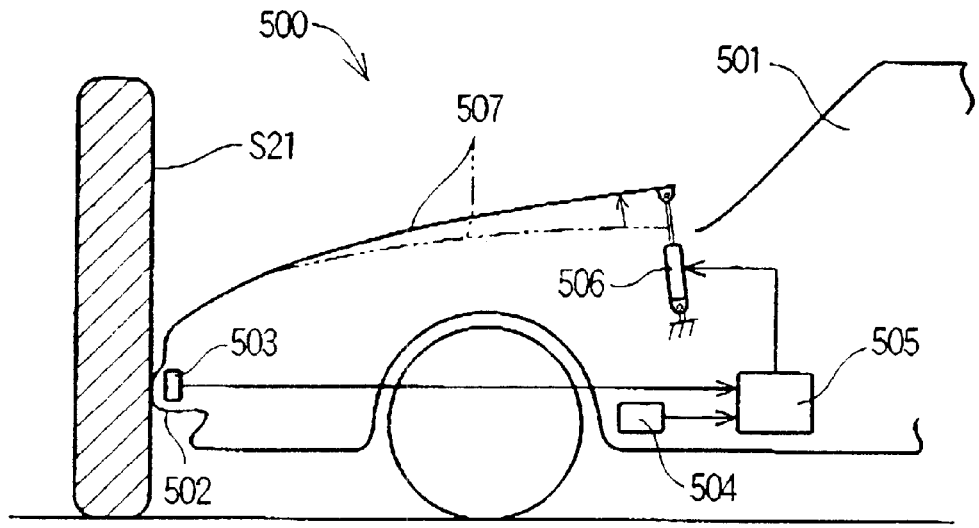
FIG. 66 is a side view of a conventional vehicle equipped with a pedestrian protection sensor system.
Figure 67:
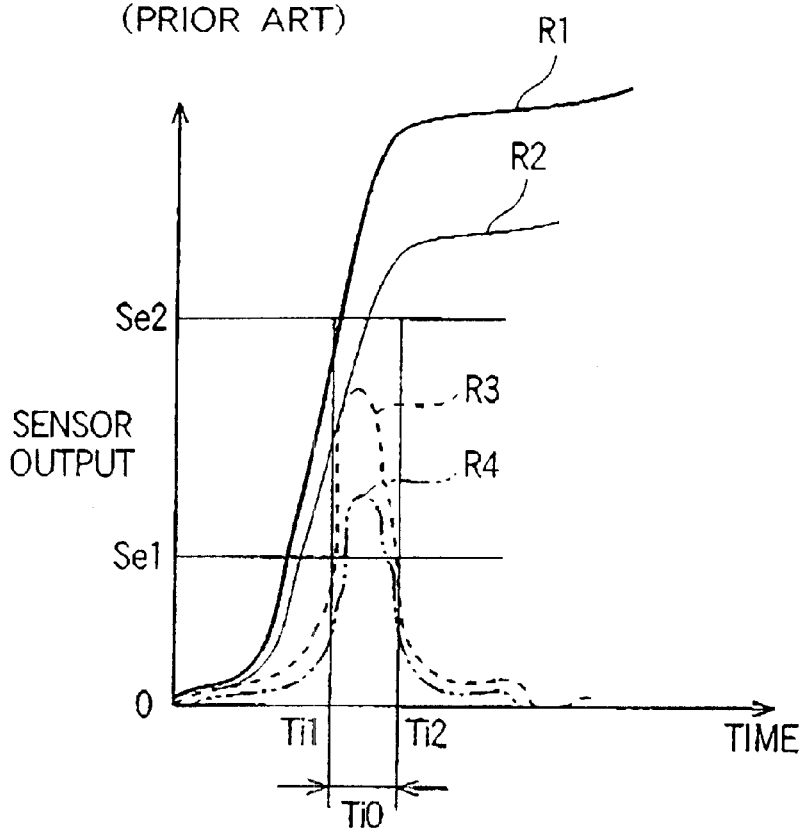
FIG. 67 is a graph showing a load sensor output characteristic pertaining to the conventional vehicle.

FIG. 63 shows a vehicle 11 equipped with an obstruction inference apparatus for a vehicle 300 constituting a modified application of the invention.

This obstruction inference apparatus for a vehicle 300 deploys a secondary collision countermeasure by operating an air bag 302 provided in the vicinity of the hood 13 when the vehicle 11 hits an obstruction S1. When the obstruction inference apparatus for a vehicle 40 infers that the obstruction S1 is a specified obstruction, it causes the air bag 302 to inflate by outputting a inference signal si from the control part 44 to an air bag module 301. And as a result of this air bag 302 being inflated as a secondary collision countermeasure, impact forces to the devices 17 (see FIG. 62) housed in the engine compartment 12 and to the obstruction S1 are well absorbed by the air bag 302.

The invention is not limited to the preferred embodiments and variations of preferred embodiments described above.

For example, the constants and reference values used by the obstruction inference apparatus for a vehicle 40 can be set freely, and can be determined by suitable setting of a specified obstruction reference.

The deformable member is not limited to the bumper face 42, and may be any member so provided on the vehicle 11 that it will deform in correspondence with an impact force with which the vehicle 11 hits an obstruction S1.

The deformation rate detecting means 51, 151 and 251 may be any means which detect the deformation rate VB of the bumper face 42 or other deformable member.

The steps ST33 through ST38 surrounded by a broken line in FIG. 20 may be added to the control flow chart shown in FIG. 21.

Obviously, various minor changes and modification of the present invention are possible in the light of the above teaching. It is therefore to be understood that within the scope of the appended claims, the invention may be practiced otherwise than as specifically described.

What is claimed is:

1. An obstruction inference apparatus for a vehicle, for inferring the type of an obstruction which the vehicle has hit, the apparatus comprising:
   a deformable member which deforms in correspondence with an impact force with which the vehicle hits the obstruction;
   deformation rate detecting means for detecting a deformation rate of the deformable member;
   timer starting means for starting a timer when the deformation rate detected by the deformation rate detecting means reaches a preset first reference rate in the course of increasing;
   maximum deformation rate updating means for comparing the deformation rate with a previous maximum deformation rate value detected earlier and setting the larger of the two as a maximum deformation rate;
   second reference rate generating means for setting as a second reference rate a value equivalent to a value obtained by multiplying the maximum deformation rate by a preset constant smaller than 1.0;
   elapsed time calculating means for stopping the timer when the deformation rate reaches the second reference rate and obtaining the elapsed time from the timer being started to the timer being stopped; and
   inference signal generating means for, when said elapsed time is within a preset time range, inferring that the obstruction is a specified obstruction and producing an inference signal.

2. An obstruction inference apparatus for a vehicle, according to claim 1, wherein the inference signal generating means outputs the inference signal to a secondary collision countermeasure apparatus for deploying a secondary collision countermeasure such as raising a hood of the vehicle or operating an air bag in the hood vicinity.

3. An obstruction inference apparatus for a vehicle, for inferring the type of an obstruction which the vehicle has hit, the apparatus comprising:
   a deformable member which deforms in correspondence with an impact force with which the vehicle hits the obstruction;
   deformation rate detecting means for detecting a deformation rate of the deformable member;
   deformation calculating means for obtaining a deformation of the deformable member on the basis of the deformation rate detected by the deformation rate detecting means;
   maximum deformation rate updating means for comparing the deformation rate with a previous maximum deformation rate value detected earlier and setting the larger of the two as a maximum deformation rate;
   first reference rate generating means for setting as a first reference rate a value equivalent to a value obtained by multiplying the maximum deformation rate by a preset first rate constant smaller than 1.0;
   second reference rate generating means for setting as a second reference rate a value equivalent to a value obtained by multiplying the maximum deformation rate by a second rate constant smaller than 1.0 but larger than the first rate constant;
   first reference deformation generating means for setting as a first reference deformation a value equivalent to a value obtained by multiplying the maximum deformation rate by a preset first deformation constant;
   second reference deformation generating means for setting as a second reference deformation a value equivalent to a value obtained by multiplying the maximum deformation rate by a preset second deformation constant larger than the first deformation constant; and
   inference signal generating means for, when the deformation rate is within the range of from the first reference rate to the second reference rate and also the deformation is within the range of from the first reference deformation to the second reference deformation, inferring that the obstruction is a specified obstruction and producing an inference signal.

4. An obstruction inference apparatus for a vehicle, according to claim 3, further comprising:
   third reference rate generating means for setting as a third reference rate a value equivalent to a value obtained by multiplying the maximum deformation rate by a preset third rate constant smaller than 1.0 but different from the first and second rate constants; and
   third reference deformation generating means for setting as a third reference deformation a value equivalent to a value obtained by multiplying the maximum deformation rate by a preset third deformation constant different from the first and second deformation constants,
   wherein when the range of deformation rate and deformation which is both within the range of from the first reference rate to the second reference rate and within the range of from the first reference deformation to the second reference deformation is written as a first reference range,
   a range of deformation rate and deformation which is both within a range based on a combination of the first, second and third reference rates and within a range based on a combination of the first, second and third reference deformations is set as a second reference range different from the first reference range, and
   when the deformation rate and the deformation are within either the first reference range or the second reference range it is inferred that the obstruction is a specified obstruction and an inference signal is outputted by the inference signal generating means.

5. An obstruction inference apparatus for a vehicle, according to claim 3, wherein the inference signal generating means outputs the inference signal to a secondary collision countermeasure apparatus for deploying a secondary collision countermeasure such as raising a hood of the vehicle or operating an air bag in the hood vicinity.

6. An obstruction inference apparatus for a vehicle, for inferring the type of an obstruction which the vehicle has hit, the apparatus comprising:

a deformable member which deforms in correspondence with an impact force with which the vehicle hits the obstruction;

deformation rate detecting means for detecting a deformation rate of the deformable member;

deformation detecting means for detecting a deformation of the deformable member;

maximum deformation rate updating means for comparing the deformation rate with a previous maximum deformation rate value detected earlier and setting the larger of the two as a maximum deformation rate;

reference deformation generating means for setting as a reference deformation a value equivalent to a value obtained by multiplying the maximum deformation rate by a preset deformation constant;

inferring means for inferring that the obstruction is a specified obstruction when the deformation has risen above the reference deformation;

and inference signal generating means for producing an inference signal on the basis of an inference of the inferring means.

7. An obstruction inference apparatus for a vehicle, according to claim 6, wherein the inference signal generating means outputs the inference signal to a secondary collision countermeasure apparatus for deploying a secondary collision countermeasure such as raising a hood of the vehicle or operating an air bag in the hood vicinity.

8. An obstruction inference apparatus for a vehicle, for inferring the type of an obstruction which the vehicle has hit, the apparatus comprising:

a deformable member which deforms in correspondence with an impact force with which the vehicle hits the obstruction;

deformation rate detecting means for detecting a deformation rate of the deformable member;

deformation detecting means for detecting a deformation of the deformable member;

maximum deformation rate updating means for comparing the deformation rate with a previous maximum deformation rate value detected earlier and setting the larger of the two as a maximum deformation rate;

reference rate generating means for setting as a reference rate a value equivalent to a value obtained by multiplying the maximum deformation rate by a preset rate constant smaller than 1.0;

first reference deformation generating means for setting as a first reference deformation a value equivalent to a value obtained by multiplying the maximum deformation rate by a preset first deformation constant;

second reference deformation generating means for setting as a second reference deformation a value equivalent to a value obtained by multiplying the maximum deformation rate by a preset second deformation constant larger than the first deformation constant;

inferring means for inferring that the obstruction is a specified obstruction when within a preset inference time from when the vehicle hit the obstruction the deformation rate is smaller than the reference rate and also the deformation is in the range of from the first reference deformation to the second reference deformation; and inference signal generating means for producing an inference signal on the basis an inference of the inferring means.

9. An obstruction inference apparatus for a vehicle, according to claim 8, wherein the inference signal generating means outputs the inference signal to a secondary collision countermeasure apparatus for deploying a secondary collision countermeasure such as raising a hood of the vehicle or operating an air bag in the hood vicinity.

10. An obstruction inference apparatus for a vehicle, for inferring the type of an obstruction which the vehicle has hit, the apparatus comprising:

a deformable member which deforms in correspondence with an impact force with which the vehicle hits the obstruction;

deformation rate detecting means for detecting a deformation rate of the deformable member;

deformation detecting means for detecting a deformation of the deformable member;

maximum deformation rate updating means for comparing the deformation rate with a previous maximum deformation rate value detected earlier and setting the larger of the two as a maximum deformation rate;

first reference rate generating means for setting as a first reference rate a value equivalent to a value obtained by multiplying the maximum deformation rate by a preset first rate constant smaller than 1.0;

second reference rate generating means for setting as a second reference rate a value equivalent to a value obtained by multiplying the maximum deformation rate by a preset second rate constant smaller than 1.0 but larger than the first rate constant;

first reference deformation generating means for setting as a first reference deformation a value equivalent to a value obtained by multiplying the maximum deformation rate by a preset first deformation constant;

second reference deformation generating means for setting as a second reference deformation a value equivalent to a value obtained by multiplying the maximum deformation rate by a preset second deformation constant larger than the first deformation constant;

inferring means for inferring that the obstruction is a specified obstruction when the deformation rate is in the range of from the first reference rate to the second reference rate and also the deformation is in the range of from the first reference deformation to the second reference deformation;

deformation rate determining means for determining that the deformation rate has risen above a preset third reference rate different from the first and second reference rates;

deformation determining means for determining that the deformation has risen above a preset third reference deformation different from the first and second reference deformations;

additional inferring means for additionally inferring that the obstruction is a specified obstruction when receiving an inference signal from the inferring means, a determination signal from the deformation rate determining means, and a determination signal from the deformation determining means; and inference signal generating means for producing an inference signal on the basis of an additional inference of the additional inferring means.

11. An obstruction inference apparatus for a vehicle, according to claim 10, wherein the inference signal generating means outputs the inference signal to a secondary collision countermeasure apparatus for deploying a secondary collision countermeasure such as raising a hood of the vehicle or operating an air bag in the hood vicinity.

* * * * *